United States Patent
Kopatsch et al.

(10) Patent No.: US 12,257,779 B2
(45) Date of Patent: Mar. 25, 2025

(54) CONTROLLING IRRADIATION PARAMETERS OF AN ADDITIVE MANUFACTURING MACHINE

(71) Applicant: Concept Laser GmbH, Lichtenfels (DE)

(72) Inventors: René Kopatsch, Lichtenfels (DE); Martin Proebstle, Lichtenfels (DE); Dominic Graf, Weitramsdorf (DE)

(73) Assignee: Concept Laser GmbH, Lichtenfels (DE)

( * ) Notice: Subject to any disclaimer, the term of this patent is extended or adjusted under 35 U.S.C. 154(b) by 826 days.

(21) Appl. No.: 17/459,040

(22) Filed: Aug. 27, 2021

(65) Prior Publication Data
US 2022/0080661 A1    Mar. 17, 2022

Related U.S. Application Data

(60) Provisional application No. 63/079,545, filed on Sep. 17, 2020.

(51) Int. Cl.
*B29C 64/268* (2017.01)
*B29C 64/153* (2017.01)
(Continued)

(52) U.S. Cl.
CPC .......... *B29C 64/268* (2017.08); *B29C 64/153* (2017.08); *B29C 64/393* (2017.08);
(Continued)

(58) Field of Classification Search
CPC ... B29C 64/268; B29C 64/153; B29C 64/393; B33Y 10/00; B33Y 30/00; B33Y 50/02;
(Continued)

(56) References Cited

U.S. PATENT DOCUMENTS

| | | |
|---|---|---|
| 5,825,522 A | 10/1998 | Takano et al. |
| 10,399,146 B2 | 9/2019 | Giulietti |

(Continued)

FOREIGN PATENT DOCUMENTS

| | | |
|---|---|---|
| CN | 109434107 A | 3/2019 |
| DE | 102013019180 A1 | 5/2015 |

(Continued)

*Primary Examiner* — Michael J Brown
(74) *Attorney, Agent, or Firm* — Dority & Manning, P.A.

(57) ABSTRACT

A method may of additively manufacturing a three-dimensional object includes determining a plurality of scanning segments for a build plane and/or for one or more object layers respectively corresponding to one or more regions of a powder bed defining the build plane, and determining an irradiation vector for irradiating the scanning segments with an energy beam. The irradiation vector determined for the respective scanning segments may include a hatching vector and/or a plurality of scanning vectors defining the hatching vector. The hatching vector and/or the scanning vectors defining the hatching vector may be oriented away from a normal point on the build plane. The method may include outputting an irradiation control command to an energy beam system based on the scanning segments and/or the irradiation vector for irradiating the scanning segments.

19 Claims, 27 Drawing Sheets

(51) Int. Cl.
   *B29C 64/393* (2017.01)
   *B33Y 10/00* (2015.01)
   *B22F 10/28* (2021.01)
   *B22F 10/366* (2021.01)
   *B33Y 30/00* (2015.01)
   *B33Y 50/02* (2015.01)

(52) U.S. Cl.
   CPC ............... *B33Y 10/00* (2014.12); *B33Y 30/00* (2014.12); *B33Y 50/02* (2014.12)

(58) Field of Classification Search
   CPC ........ Y02P 10/25; B22F 10/366; B22F 10/85; B22F 10/28
   USPC .......................................................... 700/98
   See application file for complete search history.

(56) References Cited

U.S. PATENT DOCUMENTS

| | | | |
|---|---|---|---|
| 11,267,052 | B2 | 3/2022 | McClelland et al. |
| 11,565,346 | B2 | 1/2023 | Dimter et al. |
| 11,822,310 | B2 | 11/2023 | Hümmeler et al. |
| 11,981,082 | B2 | 5/2024 | Schade et al. |
| 2016/0052087 | A1* | 2/2016 | O'Neill ................ B22F 10/366 219/76.12 |
| 2016/0288209 | A1 | 10/2016 | Jakimov et al. |
| 2016/0332379 | A1 | 11/2016 | Paternoster et al. |
| 2017/0001243 | A1 | 1/2017 | Hayano |
| 2017/0136696 | A1 | 5/2017 | Jakimov et al. |
| 2017/0173736 | A1 | 6/2017 | Gray |
| 2017/0173883 | A1 | 6/2017 | Gray et al. |
| 2018/0093416 | A1 | 4/2018 | Prexler et al. |
| 2018/0272611 | A1 | 9/2018 | Cantzler et al. |
| 2019/0299291 | A1 | 10/2019 | Domrose et al. |
| 2020/0061710 | A1 | 2/2020 | Nassar et al. |
| 2020/0198010 | A1 | 6/2020 | Edelhäuser et al. |
| 2020/0261977 | A1 | 8/2020 | Mamrak et al. |
| 2021/0129226 | A1 | 5/2021 | Ploshikhin |
| 2022/0193769 | A1 | 6/2022 | Hoppe et al. |
| 2022/0250152 | A1* | 8/2022 | Wang ................... B23K 26/342 |

FOREIGN PATENT DOCUMENTS

| | | |
|---|---|---|
| DE | 102015220577 | 4/2017 |
| EP | 3406370 A1 | 11/2018 |
| WO | WO2019/002325 A1 | 1/2019 |
| WO | WO2020/249619 A1 | 12/2020 |
| WO | WO2021/165305 A1 | 8/2021 |

\* cited by examiner

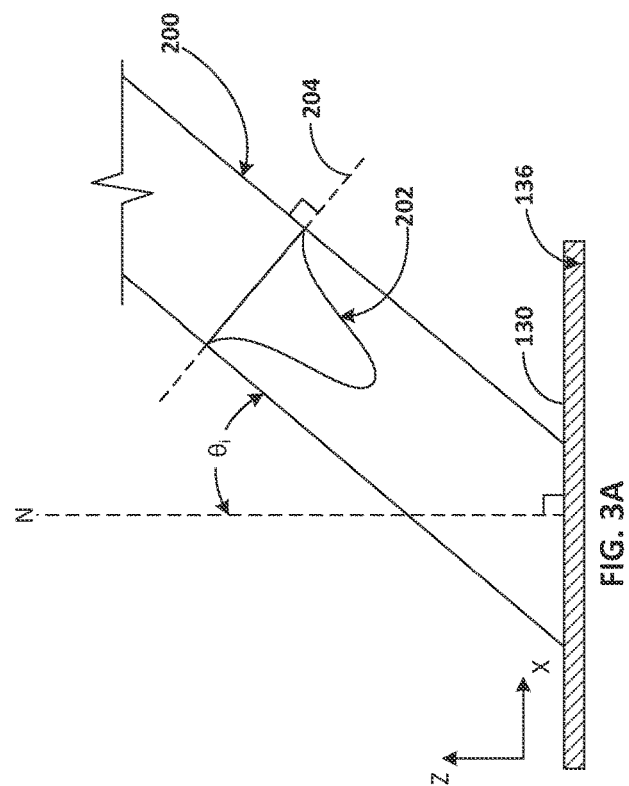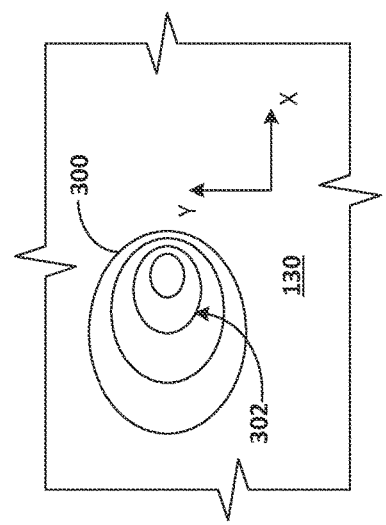
FIG. 3A
FIG. 3B
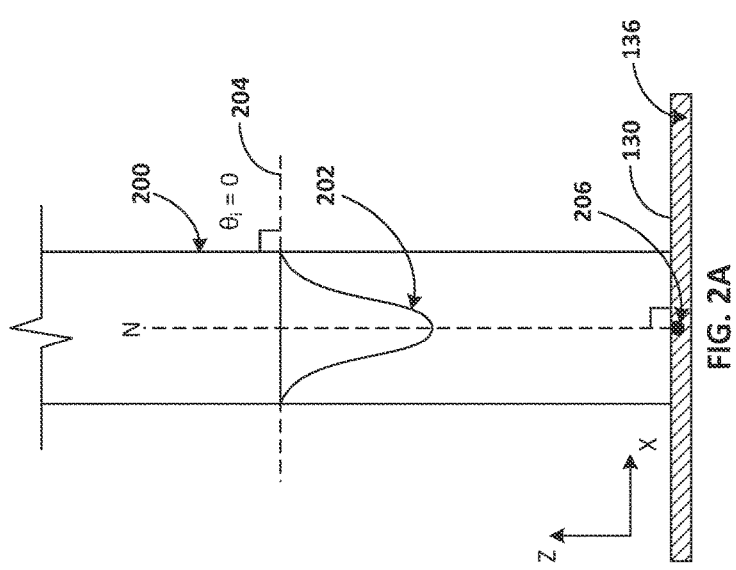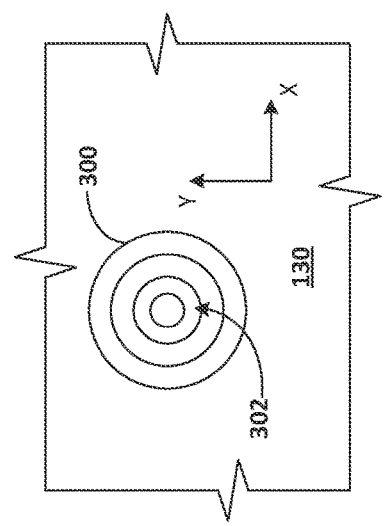
FIG. 2A
FIG. 2B

CONTROLLING IRRADIATION PARAMETERS OF AN ADDITIVE MANUFACTURING MACHINE

CROSS-REFERENCE TO RELATED APPLICATION

This application claims priority to U.S. Provisional App. Ser. No. 63/079,545, filed Sep. 17, 2020, the contents of which is incorporated herein by reference in its entirety as if set forth verbatim.

FIELD

The present disclosure generally pertains to additive manufacturing of three-dimensional objects and systems and methods relating to operating an additive manufacturing machine.

BACKGROUND

Additive manufacturing machines used to perform powder bed fusion typically have an energy beam system configured to selectively scan an energy beam across a build plane to irradiate sequential layers of a powder bed. The energy beam causes the selectively irradiated portions of the powder bed and/or underlying layers of an object being additively manufactured to melt and/or sinter, thereby forming a three-dimensional object as the sequential layers become selectively melted and/or sintered to one another.

The melting and/or sintering behavior of the powder bed may depend on one or more irradiation parameters, including beam parameters pertaining to the energy beam and/or scanning parameters pertaining to the manner in which the energy beam is scanned across the powder bed. For example, the melting and/or sintering behavior of the powder bed may depend on the intensity profile of the energy beam and/or the power density profile of a beam spot from the energy beam incident upon the build plane. Such intensity profile of the energy beam and/or such power density profile of the beam spot may depend on the angle of incidence of the energy beam and/or the location of the beam spot relative to a normal point on the build plane. Additionally, the melting and/or sintering behavior of the powder bed may depend on an irradiation vector of the energy beam, including, for example, an orientation of an irradiation vector relative to the normal point on the build plane and/or relative to previously irradiated beam paths. Differences in melting and/or sintering behavior may impact the quality of an object being additively manufactured, including physical properties of the object.

Accordingly, there exists a need for improved additive manufacturing systems and methods of controlling irradiation parameters of an additive manufacturing machine.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 2A and 2B respectively schematically depict an energy beam incident upon the build plane and corresponding beam spot on the build plane, representing an energy beam that is normal to the build plane;

FIGS. 3A and 3B respectively schematically depict another energy beam incident upon the build plane and corresponding beam spot on the build plane, representing an energy beam that is oblique to the build plane;

Figure 1:
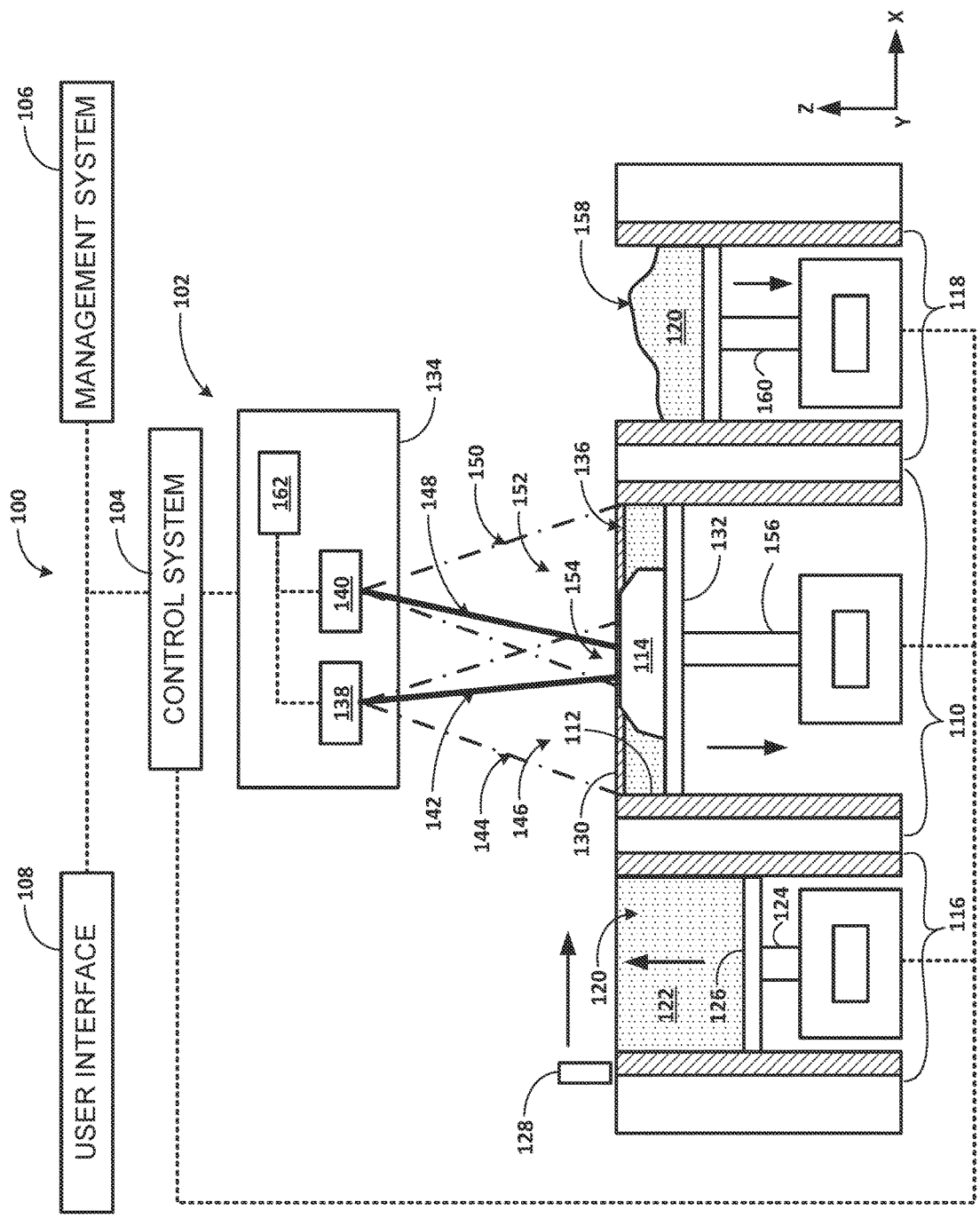
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As described herein, exemplary embodiments of the present subject matter involve the use of additive manufacturing machines or methods. As used herein, the term "additive manufacturing" refers generally to manufacturing technology in which components are manufactured in a layer-by-layer manner. An exemplary additive manufacturing machine may be configured to utilize any desired additive manufacturing technology. In an exemplary embodiment, the additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature, and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Sterolithography (SLA) technology, and other additive manufacturing technology that utilizes an energy beam.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 μm and 200 μm, although the thickness may be selected based on any number of parameters and may be any suitable size according to alternative embodiments.

The present disclosure generally provides systems and methods of controlling an additive manufacturing machine, including controlling energy beam systems used to additively manufacture three-dimensional objects. Exemplary systems and methods of controlling an additive manufacturing machine and/or an energy beam system may include providing an irradiation vector (e.g., a scanning vector, a hatching vector, and/or a contour vector) for irradiating one or more regions of a build plane. Exemplary systems and methods may include controlling one or more irradiation parameters that may influence melting and/or sintering behavior of the powder bed, including systems and methods of controlling beam parameters that pertain to an actual or potential influence on melting and/or sintering behavior. Such influence on melting and/or sintering behavior may be attributable at least in part to an intensity profile, to an angle of incidence, and/or to one or more irradiation vectors (e.g., a scanning vector, a hatching vector, and/or a contour vector) of an energy beam. Advantageously, the presently disclosed systems and methods may provide improved controllability of melting and/or sintering behavior, which, in turn, may improve quality, uniformity, and/or repeatability of additively manufactured objects, reduce object defects and/or aborted builds, and/or increase machine runnability.

As described herein, the energy imparted to the build plane by an energy beam may depend on a number of beam parameters, including, for example, the intensity or power of the energy beam, the intensity profile or power density profile of the energy beam, the spot size of the energy beam, the spot shape of the energy beam, the angle of incidence $\theta_i$ of the energy beam, and the scanning speed of the energy beam. These and/or other beam parameters can affect the melting and/or sintering behavior of the powder bed. Additionally, or in the alternative, the melting and/or sintering behavior of the powder bed may depend on an irradiation vector of the energy beam, such as in relation to the beam source and/or features of the build plane.

The angle of incidence $\theta_i$ of the energy beam may depend on the location on the build plane upon which the energy beam is directed. The power density profile of a resulting beam spot from the energy beam incident upon the build plane may depend on the angle of incidence $\theta_i$ of the energy beam and/or the location on the build plane upon which the energy beam is directed. For example, an exemplary energy beam may have a Gaussian intensity profile in the transverse plane that may be described by a Gaussian function. In the case of a circular Gaussian beam oriented normal to the build plane, the energy imparted to the build plane may similarly be described by a Gaussian function. The radially inward portion of a Gaussian beam spot may have a higher energy density than a radially outward portion of a Gaussian beam spot. The energy density may increase according to the Gaussian function in a radially inward direction. Likewise, the energy imparted to the build plane may be described by other nonlinear functions corresponding to respective beam intensity profiles.

In some embodiments, the surface area of a beam spot incident upon the build plane may depend on the angle of incidence $\theta_i$ of the energy beam. For example, energy imparted to the build plane from an energy beam with a Gaussian intensity profile and an oblique angle of incidence $\theta_i$ may have an elliptical Gaussian energy density profile. Consequently, in some embodiments, the energy density imparted to the build plane may depend upon the beam intensity profile in the transverse plane and/or the angle of incidence $\theta_i$ of the energy beam. Additionally, or in the alternative, in the case of a Gaussian beam that has an oblique angle of incidence $\theta_i$ to the build plane, the energy imparted to the build plane may be described by an elliptical Gaussian function, with the energy density skewed towards a normal point corresponding to a location on the build plane where the beam would be oriented normal to the build plane.

Thus, the melting and/or sintering behavior the powder bed may depend on the location of the build plane being irradiated by the energy beam, including the corresponding angle of incidence $\theta_i$ of the energy beam and/or the power density profile of a resulting beam spot from the energy beam. For example, the melting and/or sintering behavior of the powder bed may depend on the coordinates of the beam spot and resulting power density profile. Additionally, or in the alternative, the melting and/or sintering behavior of the powder bed may depend on the coordinates of the beam spot in relation to other features of the build plane, such as in relation to previously irradiated portions of the powder bed. The melting and/or sintering behavior of the powder bed may additionally or alternatively depend at least in part on the orientation of one or more irradiation vectors corresponding to one or more beam paths of an energy beam, such as in relation to the normal point and/or in relation to such other features of the build plane. For example, the melting and/or sintering behavior of the powder bed may depend at least in part on the orientation of one or more irradiation vectors (e.g., one or more scanning vectors, one or more hatching vectors, and/or one or more contour vectors), including the direction and/or magnitude of one or more of such irradiation vectors.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

As used herein, the term "normal point" refers to a location on the build plane corresponding to an energy beam where the energy beam, when incident upon the build plane, would be oriented normal to the build plane.

As used herein, the term "irradiation vector" or "irradiation vectors" refers individually or collectively, as the case may be, to one or more scanning vectors, one or more hatching vectors, and/or one or more contour vectors.

As used herein, the term "scanning vector" or "scanning vectors" refers individually or collectively, as the case may be, to a propagation entity of a beam path imparted by an energy beam across the build plane. A scanning vector has an orientation that includes both a magnitude component and a directional component. Generally, an additive manufacturing machine may form sequential layers of an object by directing an energy beam across the build plane, thereby defining a plurality of beam paths according to a corresponding plurality of scanning vectors that correspond to the regions of the build plane where the respective layers of the object are located.

In some embodiments, an energy beam may propagate across a build plane according to a plurality of scanning vectors corresponding to a series of beam paths that may be arranged in one or more groups of hatches that occupy a congruent region of the build plane. Additionally, or in the alternative, an energy beam may propagate across a build plane according to one or more scanning vectors corresponding to one or more beam paths a that may be arranged as a contour that respectively define at least a portion of a perimeter surrounding at least a portion of a congruent region of the build plane such as a congruent region of the build plane occupied by a plurality of hatches.

As used herein, the term "hatch" or "hatches" refers, individually, or in the plurality, as the case may be, to one or more beam paths from among a plurality of adjacent and/or partially overlapping beam paths that define a solidified congruent region of a build plane, such as a powder bed. By way of example, a layer of an object may be formed at least in part by a plurality of hatches that selectively solidify a corresponding congruent region of a powder bed.

As used herein, the term "hatching vector" refers to a propagation entity of a plurality of hatches imparted by a corresponding plurality of beam paths across the build plane. A hatching vector has an orientation that includes both a magnitude component and a directional component. Each individual hatch may be applied according to a respective scanning vector. By way of example, a series of hatches may be defined by a plurality of scanning vectors oriented with opposite directional components and such series of hatches may propagate across the build plane according to a hatching vector. Such hatching vector may have a directional component that is oblique to the corresponding plurality of scanning vectors, such as transverse or perpendicular to the corresponding plurality of scanning vectors.

As used herein, the term "contour" or "contours" refers, individually, or in the plurality, as the case may be, to one or more beam paths that define at least a portion of a perimeter region around at least a portion of a congruent region of a build plane, such as a perimeter of a congruent region defined by a plurality of hatches. A plurality of beam paths that respectively define a contour or contours may be adjacent or overlapping. By way of example, a perimeter region of an object may be formed at least in part by one or more contours that selectively solidify a corresponding perimeter region of a powder bed.

As used herein, the term "contour vector" refers to a propagation entity of one or more contours imparted by a corresponding one or more beam paths across the build plane. A contour vector has an orientation that includes both a magnitude component and a directional component. Each individual contour may be applied according to a respective scanning vector. By way of example, one or more contours may be defined by one or more scanning vectors and such one or more contours may propagate across the build plane according to a contour vector. Such contour vector may have a directional component that is parallel or oblique to the corresponding one or more scanning vectors. For example, a contour vector for a contour defined by a single beam path may be substantially equivalent to a scanning vector for such single beam path.

For purposes of convention, a component of an irradiation vector (e.g., a scanning vector, a hatching vector, and/or a contour vector) may be described in relation to X and Y coordinates. A directional component of an irradiation vector (e.g., a scanning vector, a hatching vector, and/or a contour vector) may include an X-directional component, a Y-directional component, or both an X-directional component and a Y-directional component. A magnitude component of an irradiation vector (e.g., a scanning vector, a hatching vector, and/or a contour vector) may include an X-magnitude component, a Y-magnitude component, or both an X-magnitude component and a Y-magnitude component. As used herein, the term "orientation" with respect to an irradiation vector (e.g., a scanning vector, a hatching vector, and/or a contour vector) is inclusive of the magnitude and direction of the vector.

In some embodiments, improvements to quality, uniformity, and/or repeatability of additively manufactured objects may be attributable at least in part to selectively irradiating sequential layers of an object with one or more irradiation vectors (e.g., scanning vectors, hatching vectors, and/or contour vectors) oriented away from a normal point of the build plane, as compared to the respective irradiation vectors being oriented towards the normal point. For example, in some embodiments, regions of an object irradiated with irradiation vectors (e.g., scanning vectors, hatching vectors, and/or contour vectors) oriented away from the normal point may exhibit improvements in material properties such as porosity, tensile strength, and/or elastic modulus, as compared to irradiation performed with such irradiation vectors oriented towards the normal point. Such improvements to quality, uniformity, and/or repeatability of additively manufactured objects may include improved absolute values and/or reduced variation. Exemplary embodiments may include least one directional component of such irradiation vectors (e.g., scanning vectors, hatching vectors, and/or contour vectors) may be oriented away from a normal point of the build plane. Additionally, or in the alternative, exemplary embodiments may include irradiation vectors (e.g., scanning vectors, hatching vectors, and/or contour vectors) propagating with increasing angle of incidence $\theta_i$.

Such material properties of an additively manufactured object may additionally or alternatively be attributed to selecting one or more irradiation vectors (e.g., scanning vectors, hatching vectors, and/or contour vectors) based at least in part on a location of the build plane where the object or portion of the object is located. The orientation of such irradiation vectors (e.g., scanning vectors, hatching vectors, and/or contour vectors), including respective directional components and/or magnitude components, corresponding to an object or a region of an object may be selected based at least in part on a location of the build plane where the object or portion of the object is located. An irradiation vector (e.g., a scanning vector, a hatching vector, and/or a contour vector) may be determined for a respective layer or for one or more respective layers of an object based at least in part on a location of the build plane being irradiated relative to the normal point. For example, one or more irradiation vectors (e.g., one or more scanning vectors, one or more hatching vectors, and/or one or more contour vectors) may be determined such that respective locations of the build plane are irradiated with one or more of such irradiation vectors respectively oriented away from the normal point. In some embodiments, a plurality of segments of the build plane may be defined and the respective scanning segments may be irradiated according to an irradiation vector or vectors (e.g., a plurality of scanning vectors, one or more hatching vector, and/or one or more contour vectors) respectively oriented away from the normal point. A directional component of the irradiation vectors for a respective region of the build plane, including a plurality of scanning vectors, one or more hatching vector, and/or one or more contour vectors, corresponding to the respective region, may depend at least in part on the location of the respective region on the build plane. In addition or in the alternative to a directional vector component, a respective magnitude component may be determined for one or more irradiation vectors (e.g., scanning vectors, hatching vectors, and/or contour vectors) based at least in part on a location of the build plane relative to the normal point.

In some embodiments, respective scanning segments of the build plane may be irradiated with a hatching vector oriented away from the normal point. The hatching vector may include at least one directional component oriented away from the normal point. The orientation of the hatching vector may be defined by a plurality of scanning vectors. In some embodiments, the plurality of scanning vectors that define the hatching vector may include at least one directional component oriented away from the normal point. Additionally, or in the alternative, the one or more scanning vectors that define the hatching vector may include at least one directional component oriented oblique to the hatching vector, such as transverse or perpendicular to the hatching vector.

Additionally, or in the alternative, respective scanning segments of the build plane may be irradiated with a contour vector oriented away from the normal point. The contour vector may include at least one directional component oriented away from the normal point. The orientation of the contour vector may be defined by one or more scanning vectors. In some embodiments, the one or more scanning vectors that define the contour vector may include a directional component oriented away from the normal point. Additionally, or in the alternative, the one or more scanning vectors that define the contour vector may include at least one directional component oriented oblique to the contour vector, such as transverse or perpendicular to the contour vector.

Additionally, or in the alternative, one or more irradiation vectors (e.g., scanning vectors, hatching vectors, and/or contour vectors) may be determined for a respective layer or for one or more respective layers of an object based at least in part on a location of the build plane being irradiated relative to one or more previously irradiated portions of the build plane. For example, one or more irradiation vectors (e.g., scanning vectors, hatching vectors, and/or contour vectors) may be determined such that respective locations of the build plane are irradiated with one or more irradiation vectors (e.g., scanning vectors, hatching vectors, and/or contour vectors) respectively oriented away from a previously irradiated portion of the build plane, such as a previously irradiated adjacent beam path and/or adjacently overlapped beam path. In some embodiments, a plurality of segments of the build plane may be defined and respective scanning segments may include a plurality of scanning vectors, one or more hatching vector, and/or one or more contour vectors, respectively oriented away from a previously irradiated portion of the build plane, such as a previously irradiated adjacent beam path and/or adjacently overlapped beam path.

In some embodiments, respective scanning segments of the build plane may be irradiated with a hatching vector that includes a directional component oriented away from the normal point, with the direction of the hatching vector defined by a plurality of scanning vectors that include a directional component oriented away from a previously irradiated portion of the build plane, such as a previously irradiated adjacent beam path and/or adjacently overlapped beam path. Additionally, or in the alternative, respective scanning segments of the build plane may be irradiated with a contour vector that includes a directional component oriented away from the normal point, with the direction of the contour vector defined by one or more scanning vectors that include a directional component oriented away from a previously irradiated portion of the build plane, such as a previously irradiated adjacent beam path and/or adjacently overlapped beam path.

In addition or in the alternative, one or more irradiation vectors (e.g., one or more scanning vectors, hatching vectors, and/or contour vectors) may be determined based at least in part on a location of the build plane being irradiated relative one or more previously irradiated portions of the build plane. For example, an irradiation vector (e.g., a scanning vector, a hatching vector, and/or a contour vector) may be determined such that respective locations of the build plane are irradiated with a directional component and/or a magnitude component of such irradiation vector (e.g., a scanning vector, a hatching vector, and/or a contour vector) determined based at least in part on such location of the build plane relative to the one or more previously irradiated portions of the build plane.

Exemplary embodiments of the present disclosure will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. In some embodiments, an additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130.

The additive manufacturing machine 102 includes an energy beam system 134 configured to generate a plurality of energy beams such as laser beams or electron beams, and to direct the respective energy beams onto the build plane 130 to selectively solidify respective portions of the powder bed 136 defining the build plane 130. As the respective energy beams selectively melt or fuse the sequential layers of powder material 120 that define the powder bed 136, the object 114 begins to take shape. Typically with a DMLM, EBM, or SLM system, the powder material 120 is fully melted, with respective layers being melted or re-melted with respective passes of the energy beams. Conversely, with DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. The irradiation devices may respectively have an energy beam source, a galvo-scanner, and optical componentry configured to direct the energy beam onto the build plane 130. For the embodiment shown in FIG. 1, the energy beam system 134 includes a first irradiation device 138 and a second irradiation device 140. In other embodiments, an energy beam system 134 may include three, four, six, eight, ten, or more irradiation devices. The plurality of irradiation devise may be configured to respectively generate one or more energy beams that are respectively scannable within a scan field incident upon at least a portion of the build plane 130. For example, the first irradiation device 138 may generate a first energy beam 142 that is scannable within a first scan field 144 incident upon at least a first build plane-region 146. The second irradiation device 140 may generate a second energy beam 148 that is scannable within a second scan field 150 incident upon at least a second build plane-region 152. The first scan field 144 and the second scan field 150 may overlap such that the first build plane-region 146 scannable by the first energy beam 142 overlaps with the second build plane-region 152 scannable by the second energy beam 148. The overlapping portion of the first build plane-region 146 and the second build plane-region 152 may sometimes be referred to as an interlace region 154. Portions of the powder bed 136 to be irradiated within the interlace region 154 may be irradiated by the first energy beam 142 and/or the second energy beam 148 in accordance with the present disclosure.

To irradiate a layer of the powder bed 136, the one or more irradiation devices (e.g., the first irradiation device 138 and the second irradiation device 140) respectively direct the plurality of energy beams (e.g., the first energy beam 142 and the second energy beam 148) across the respective portions of the build plane 130 (e.g., the first build plane-region 146 and the second build plane-region 152) to melt or fuse the portions of the powder material 120 that are to become part of the object 114. The first layer or series of layers of the powder bed 136 are typically melted or fused to the build platform 132, and then sequential layers of the powder bed 136 are melted or fused to one another to additively manufacture the object 114.

As sequential layers of the powder bed 136 are melted or fused to one another, a build piston 156 gradually lowers the build platform 132 to make room for the recoater 128 to distribute sequential layers of powder material 120. As the build piston 156 gradually lowers and sequential layers of powder material 120 are applied across the build plane 130, the next sequential layer of powder material 120 defines the surface of the powder bed 136 coinciding with the build plane 130. Sequential layers of the powder bed 136 may be selectively melted or fused until a completed object 114 has been additively manufactured.

In some embodiments, an additive manufacturing machine may utilize an overflow module 118 to capture excess powder material 120 in an overflow chamber 158. The overflow module 118 may include an overflow piston 160 that gradually lowers to make room within the overflow chamber 158 for additional excess powder material 120.

It will be appreciated that in some embodiments an additive manufacturing machine may not utilize a powder module 116 and/or an overflow module 118, and that other systems may be provided for handling powder material 120, including different powder supply systems and/or excess powder recapture systems. However, the subject matter of the present disclosure may be practiced with any suitable additive manufacturing machine without departing from the scope hereof.

Still referring to FIG. 1, in some embodiments, an additive manufacturing machine 102 may include a monitoring system 162. The monitoring system 162 may be configured to detect a monitoring beam (not shown) such as an infrared beam from a laser diode and/or a reflected portion of an energy beam, and to determine one or more parameters associated with irradiating the sequential layers of the powder bed 136 based at least in part on the detected monitoring beam. For example, the one or more parameters associated with irradiating the sequential layers of the powder bed 136 may include irradiation parameters and/or object parameters, such as melt pool monitoring parameters. The one or more parameters determined by the monitoring system 162 may be utilized, for example, by the control system 104, to control one or more operations of the additive manufacturing machine 102 and/or of the additive manufacturing system 100. The monitoring system 162 may be configured to project a monitoring beam (not shown) and to detect a portion of the monitoring beam reflected from the build plane 130. Additionally, and/or in the alternative, the monitoring system 162 may be configured to detect a monitoring beam that includes radiation emitted from the build plane, such as radiation from an energy beam reflected from the powder bed 136 and/or radiation emitted from a melt pool in the powder bed 136 generated by an energy beam and/or radiation emitted from a portion of the powder bed 136 adjacent to the melt pool.

The monitoring system 162 may include componentry integrated as part of the additive manufacturing machine 102 and/or componentry that is provided separately from the additive manufacturing machine 102. For example, the monitoring system 162 may include componentry integrated as part of the energy beam system 134. Additionally, or in the alternative, the monitoring system 162 may include separate componentry, such as in the form of an assembly, that can be installed as part of the energy beam system 134 and/or as part of the additive manufacturing machine 102.

Referring now to FIGS. 2A and 2B, and 3A and 3B, an exemplary energy beam intensity profile and a corresponding energy density profile imparted to a build plane 130 will be described. FIGS. 2A and 3A show an energy beam 200 incident upon a build plane 130. The energy beam shown in FIG. 2A is normal to the build plane 130. The energy beam shown in FIG. 3A is oblique to the build plane. The energy beam 200 may be an energy beam from an additive manufacturing machine 102 such as the first energy beam 142 or the second energy beam 148 emitted from the energy beam system 134 of the additive manufacturing machine 102 shown in FIG. 1. FIGS. 2B and 3B show an energy density profile of a beam spot 300 from the energy beam 200 imparted to the build plane 130. The beam spot 300 in FIG. 2B corresponds to the energy beam 200 in FIG. 2A, and the beam spot 300 in FIG. 3B corresponds to the energy beam 200 in FIG. 3A respect.

The energy beam 200 has an intensity profile 202 in a transverse plane 204 that may be described by a nonlinear function. As used herein, the term "transverse plane" refers to a plane perpendicular to the direction of propagation of the energy beam 200. By way of example, the energy beam 200 may have a Gaussian intensity profile in the transverse plane 204 that may be described by a Gaussian function. Other intensity profiles are also contemplated, including super-Gaussian intensity profiles, astigmatic intensity profiles, "top hat" intensity profiles, Laguerre-Gaussian intensity profiles, bimodal or multi-modal intensity profiles, and so forth, which may be respectively described by corresponding functions.

The energy beam 200 is incident upon the build plane 130 at an angle of incidence $\theta_i$, as determined relative to a normal line N perpendicular to the build plane 130. As shown in FIG. 2A, the energy beam 200 is perpendicular to the build plane 130, and thus has an angle of incidence $\theta_i$ of zero (0). As shown in FIG. 3A, the energy beam 200 is oblique to the normal line N, and thus has an oblique angle of incidence $\theta_i$. As the energy beam 200 is scanned across the build plane 130 by the energy beam system 134, the angle of incidence $\theta_i$ may change. For example, an energy beam 200 may be normal to the build plane 130 when the energy beam 200 is incident upon a point on the build plane 130 that aligns (e.g., in the X,Y plane) with the optical center of the optical componentry of the irradiation device (e.g., the first irradiation device 138 or the second irradiation device 140) generating the energy beam 200. Such point on the build plane 130 corresponding to an energy beam 200 being normal to the build plane 130 is sometimes referred to as a normal point 206. may be normal to the build plane 130 The energy beam 200 may have an increasing angle of incidence $\theta_i$ as the energy beam 200 is scanned across points on the build plane 130 that are increasingly offset (e.g., in the X, Y, plane) from the optical center of the optical componentry of the irradiation device generating the energy beam 200.

As shown in FIG. 3A, the energy beam 200 imparts a circular beam spot 300 on the build plane 130 when the energy beam is normal to the build plane 130, corresponding to the energy beam 200 having a circular cross-section in the transverse plane 204. It will be appreciated, however, that other beam cross-sections are contemplated, including elliptical cross-sections and polygonal cross-sections. As shown in FIG. 3B, the energy beam 200 imparts an elliptical beam spot 300 in the build plane 130 when the energy beam is oblique to the build plane 130. The energy density of the beam spot 300 has an energy density profile 302 across the build plane 130 that may be described by a nonlinear function. The beam spot 300 shown in FIG. 2B has a Gaussian energy density profile 302 that may be described by a Gaussian function. The energy density of the beam spot 300 shown in FIG. 2B has a substantially annular distribution according to a Gaussian function, with an increasing energy density at progressively inward annular regions of the beam spot 300 and a decreasing energy density at progressively outward annular regions of the beam spot 300.

When the energy beam 200 has an oblique angle of incidence $\theta_i$, as shown in FIG. 3A, the energy beam imparts an elliptical beam spot 300 as shown in FIG. 3B. The elliptical beam spot 300 shown in FIG. 3B has an elliptical Gaussian energy density profile 302 that may be described by an elliptical Gaussian function that is askew towards the normal point 206. The beam spot 300 shown in FIG. 3B has a substantially elliptical annular distribution skewed towards the beam source, with an increasing energy density at progressively inward askew annular regions of the beam spot 300 and a decreasing energy density at progressively outward askew annular regions of the beam spot 300. It will be appreciated that other energy density profiles 302 are also contemplated, including super-Gaussian energy density profiles, astigmatic energy density profiles, "top hat" energy density profiles, Laguerre-Gaussian energy density profiles, bimodal or multi-modal energy density profiles, and so forth, which may be respectively described by corresponding functions.

By way of comparison, with reference to FIGS. 2B and 3B it will be appreciated that the beam spot 300 from the circular energy beam 200 shown in FIGS. 2A and 3B may become increasingly larger and/or increasingly elliptical with progressively larger angles of incidence $\theta_i$. Additionally, or in the alternative, the energy density imparted to the build plane 130 from the circular energy beam 200 shown in FIGS. 2A and 3B may become decreasingly lower and increasingly askew with progressively larger angles of incidence $\theta_i$. Consequently, in some embodiments, the melting and/or sintering behavior of a powder bed 136 may depend on the angle of incidence $\theta_i$ of the energy beam 200. For example, the melting and/or sintering behavior of a powder bed 136 may depend on shape of the beam spot 300, such as the ellipticity of the beam spot 300, corresponding to the angle of incidence $\theta_i$ of the energy beam 200. Additionally, or in the alternative, the melting and/or sintering behavior of a powder bed 136 may depend on the energy density of the beam spot 300 and/or the energy density profile 302 of the beam spot 300, such as the ellipticity and/or skewness of the energy density profile 302.

Figure 4B:
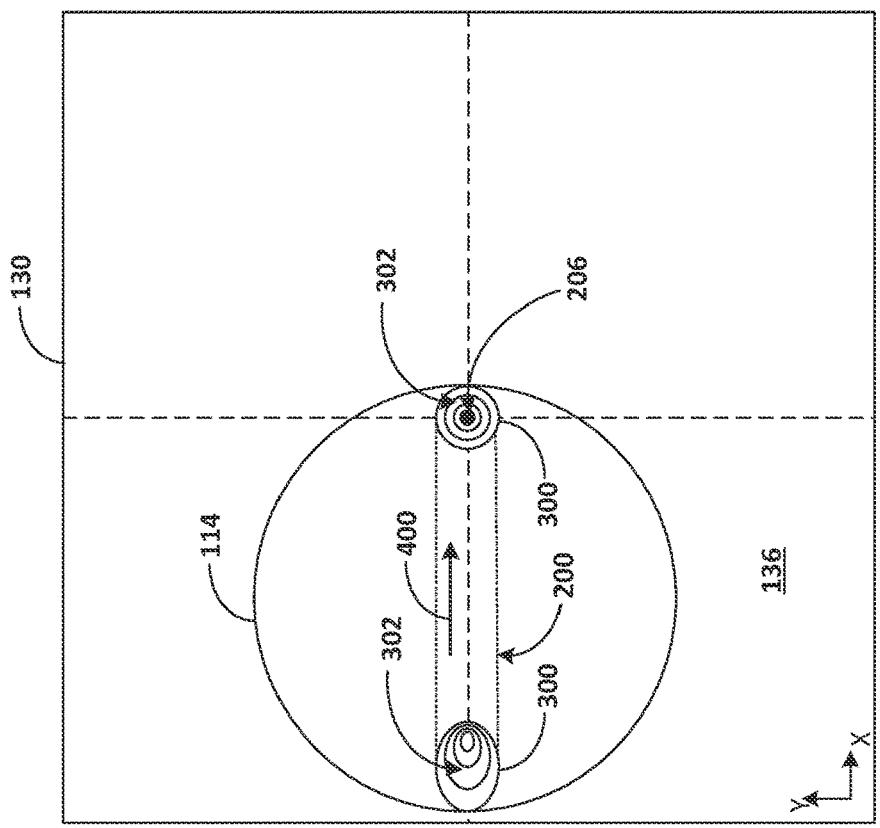
FIGS. 4A-4F schematically depicts exemplary scanning vectors of an energy beam across a build plane.
Figure 4A:
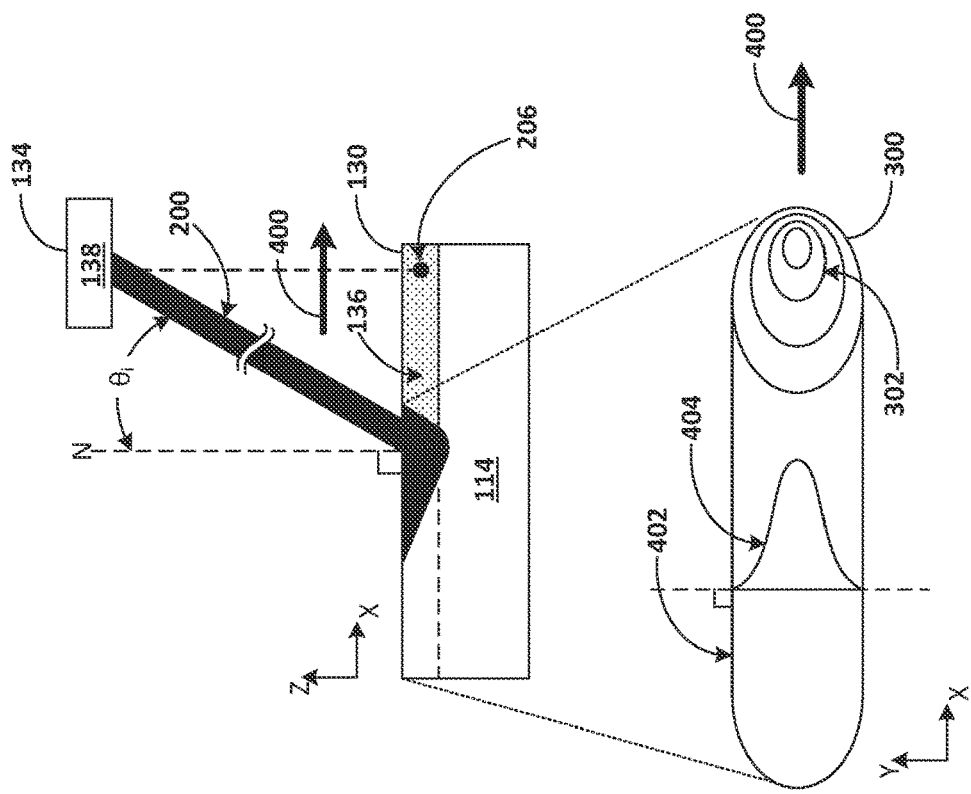
Figure 4D:
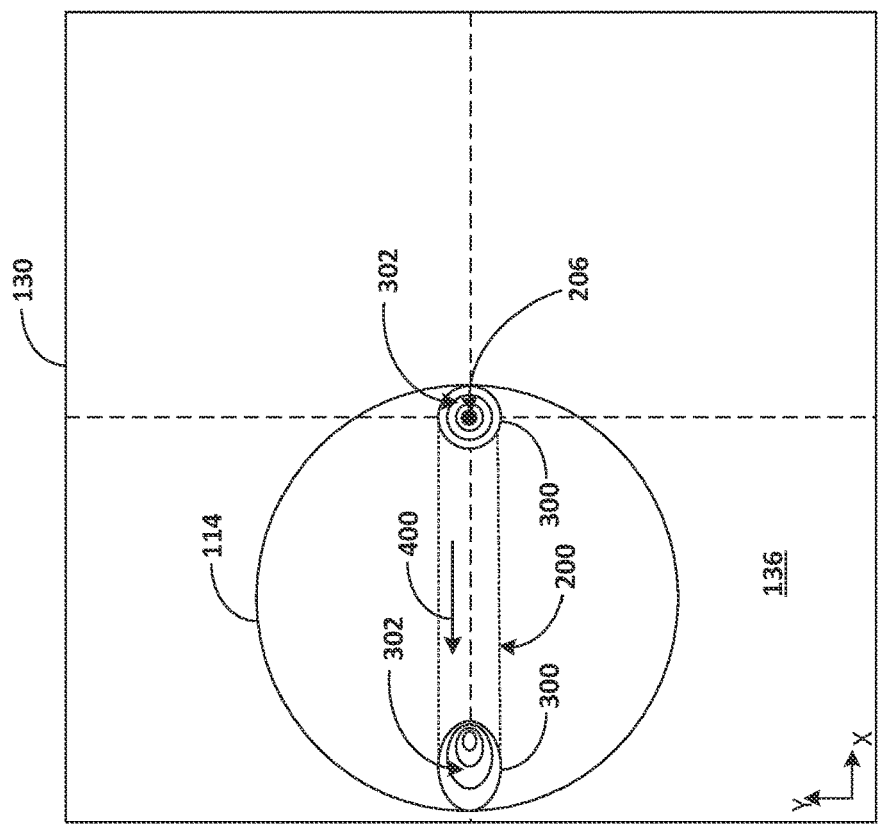
Figure 4C:
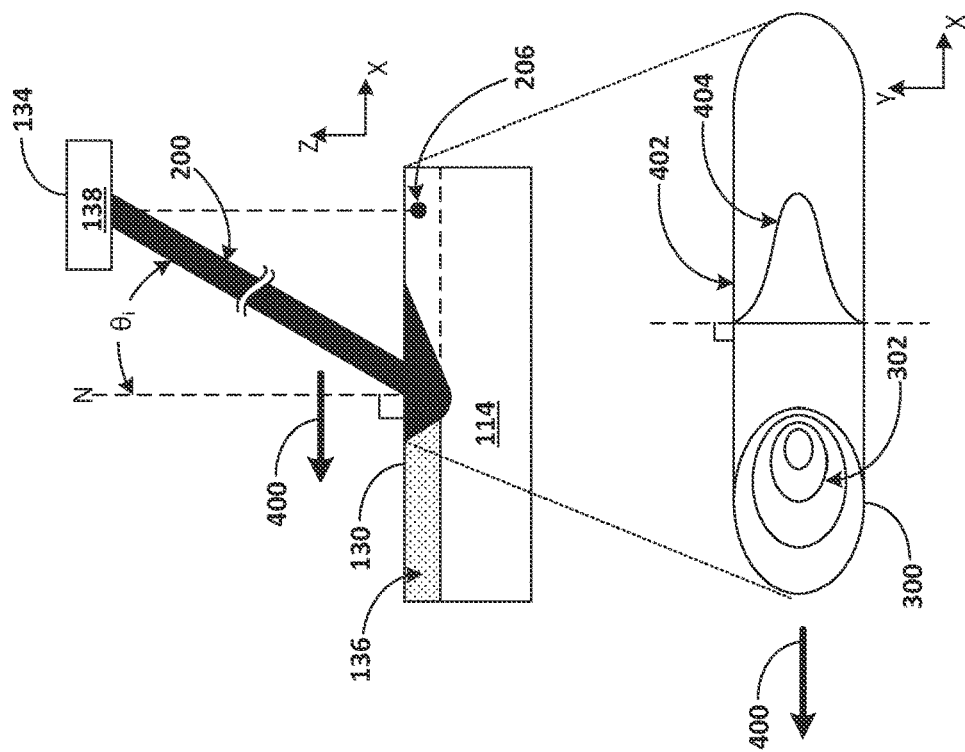
Figure 4F:
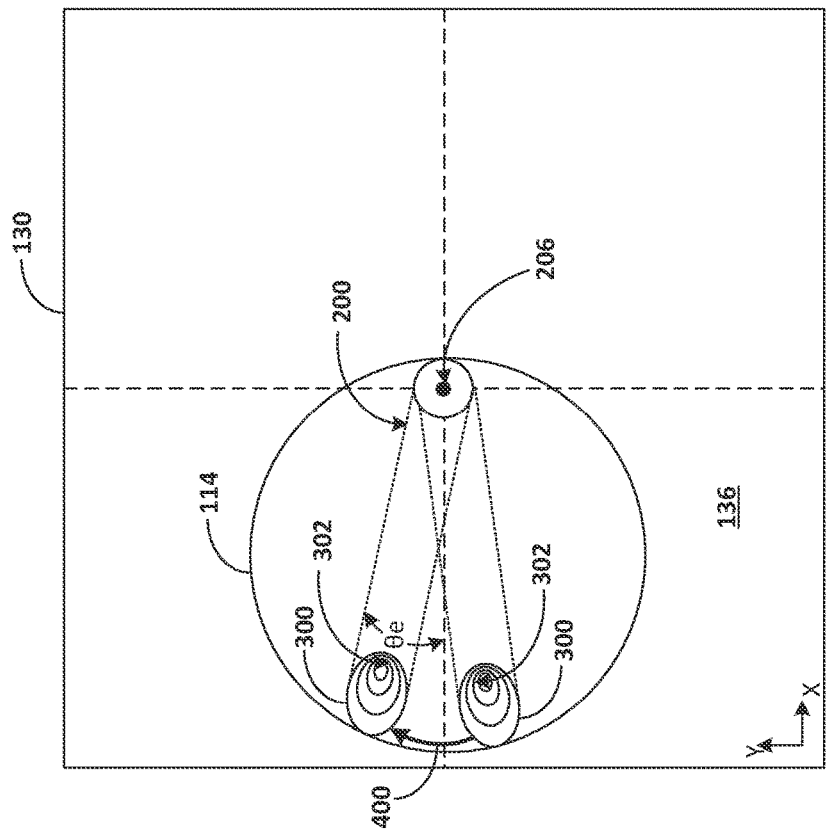
Figure 4E:
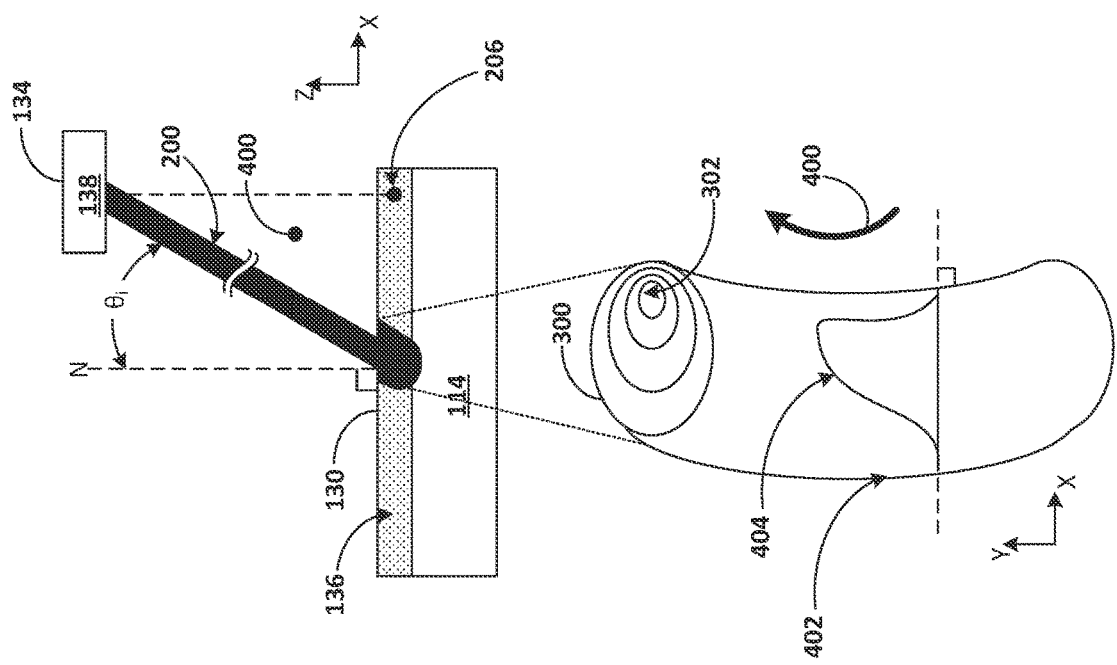

Referring now to FIGS. 4A-4F, exemplary scanning vectors 400 for an energy beam 200 will be described. In some embodiments, the melting and/or sintering behavior of a build plane 130 and/or of a powder bed 136 may depend on an orientation of a scanning vector 400 of an energy beam 200 across the build plane 130 and/or powder bed 136. FIGS. 4A-4F show an energy beam 200 propagating according to a respective scanning vector 400 oriented relative to a normal point 206 and a resulting beam path 402. FIG. 4A shows an energy beam 200 with a scanning vector 400 oriented towards a normal point 206. FIG. 4B shows a build plane 130 with a beam spot 300 from the energy beam 200 of FIG. 4A propagating across a powder bed 136 according to the scanning vector 400 shown in FIG. 4A. With the scanning vector 400 shown in FIGS. 4A and 4B, the angle of incidence $\theta_i$ of the energy beam 200 decreases as the energy beam 200 propagates along the scanning vector 400 and towards the normal point 206. FIG. 4C shows an energy beam with a scanning vector 400 oriented away from a normal point 206. FIG. 4D shows a build plane 130 with a beam spot 300 from the energy beam 200 of FIG. 4C propagating across a powder bed 136 according to the scanning vector 400 shown in FIG. 4C. With the scanning vector 400 shown in FIGS. 4C and 4D, the angle of incidence $\theta_i$ of the energy beam 200 increases as the energy beam 200 propagates along the scanning vector 400 and away from the normal point 206. FIG. 4E shows an energy beam with a scanning vector 400 oriented substantially equidistant from the normal point 206. By way of example, the scanning vector 400 shown in FIG. 4E may be oriented at a tangent or substantially tangent relative to the normal point 206. Additionally, or in the alternative, the scanning vector 400 shown in FIG. 4E may follow an annular or semi-annular path around the normal point. FIG. 4F shows a build plane 130 with a beam spot 300 from the energy beam 200 of FIG. 4E propagating across a powder bed 136 according to the scanning vector 400 shown in FIG. 4E. With the scanning vector 400 shown in FIGS. 4E and 4F, the angle of incidence $\theta_i$ of the energy beam 200 remains substantially constant as the energy beam 200 propagates along the scanning vector 400 substantially equidistant from the normal point 206.

As shown in FIGS. 4A-4F, when the energy beam 200 propagates along a scanning vector 400, the energy density profile 302 of the beam spot 300 may be skewed towards the normal point 206. As the energy beam 200 follows the scanning vector 400, energy may be imparted to the powder bed 136 according to a power density profile 404 oriented perpendicular to the scanning vector 400 that may be described by a nonlinear function. By way of example, the power density profile 404 may have a Gaussian power density profile that may be described by a Gaussian function. Other power density profiles 404 are also contemplated, including super-Gaussian power density profiles, astigmatic power density profiles, "top hat" power density profiles, Laguerre-Gaussian power density profiles, bimodal or multi-modal power density profiles, and so forth, which may be respectively described by corresponding functions.

The power density profile 404 may depend at least in part on to the intensity profile 202 (FIGS. 2A and 3A) of the energy beam 200, the energy density profile 302 of the beam spot 300, the angle of incidence $\theta_i$ of the energy beam 200, the scanning speed of the energy beam 200, and/or the orientation of the scanning vector 400 relative to the normal point 206. and/or. For example, as depicted in FIGS. 4A-4F, energy may be imparted to the powder bed 136 with a power density profile 404 according an elliptical Gaussian function that is askew towards the normal point 206.

When the energy beam 200 propagates along a scanning vector 400 oriented towards the normal point 206, as shown in FIGS. 4A and 4B, the power density profile 404 may be oriented towards the normal point 206. The energy beam 200 following the scanning vector 400 shown in FIGS. 4A and 4B may impart more energy to a central portion of the beam path 402, for example, as a result of the orientation of the scanning vector 400 and/or the power density profile 404 being oriented towards the normal point 206. Additionally, or in the alternative, the energy density profile 302 of the beam spot 300 may be skewed towards the direction of the scanning vector 400. As a result, a leading portion of the beam spot 300 may expose the build plane 130 and/or the powder bed 136 to a relatively higher intensity and/or power density as compared to a trailing portion of the beam spot 300. As shown in FIG. 4B, the ellipticity of the beam spot 300 may decrease with decreasing angle of incidence $\theta_i$ of the energy beam 200, for example, as the energy beam 200 propagates along a scanning vector 400 oriented towards the normal point 206. The skewness of the energy density profile 302 may correspondingly decrease with the decreasing angle of incidence $\theta_i$ of the energy beam 200 and/or decreasing ellipticity of the beam spot 300.

When the energy beam 200 propagates along a scanning vector 400 oriented away from the normal point 206, as shown in FIGS. 4C and 4D, the power density profile 404 may be oriented away from the normal point 206. The energy beam 200 following the scanning vector 400 shown in FIGS. 4C and 4D may impart more energy to a central portion of the beam path 402, for example, as a result of the orientation of the scanning vector 400 and/or the power density profile 404 being oriented away from the normal point 206. Additionally, or in the alternative, the energy density profile 302 of the beam spot 300 may be skewed away from the direction of the scanning vector 400. As a result, a leading portion of the beam spot 300 may expose the build plane 130 and/or the powder bed 136 to a relatively lower intensity and/or power density as compared to a trailing portion of the beam spot 300. Thus, an energy beam 200 following a scanning vector 400 oriented away from the normal point 206, as shown in FIGS. 4C and 4D, may impart a relatively more gradually transitioning intensity and/or power density as the beam spot 300 passes over a point on the build plane 130 and/or powder bed 136, as compared to an energy beam 200 following a scanning vector 400 oriented towards the normal point 206, as shown in FIGS. 4A and 4B. As shown in FIG. 4D, the ellipticity of the beam spot 300 may increase with increasing angle of incidence $\theta_i$ of the energy beam 200, for example, as the energy beam 200 propagates along a scanning vector 400 oriented away from the normal point 206. The skewness of the energy density profile 302 may correspondingly increase with the increasing angle of incidence $\theta_i$ of the energy beam 200 and/or increasing ellipticity of the beam spot 300.

When the energy beam 200 propagates along a scanning vector 400 oriented substantially equidistant from the normal point 206, as shown in FIGS. 4E and 4F, the power density profile 404 may be oriented transverse to the normal point 206 and/or skewed towards the normal point 206. For example, the peak of the power density profile 404 may be oriented transverse to the normal point 206. Additionally, or in the alternative, the median power density of the power density profile 404 may be skewed towards the normal point 206. The energy beam 200 following the scanning vector 400 shown in FIGS. 4E and 4F may impart more energy to an off-center portion of the beam path 402, skewed towards the normal point 206, for example, as a result of the orientation of the scanning vector 400 and/or the power density profile 404 being oriented transverse to the normal point 206. Additionally, or in the alternative, the energy density profile 302 of the beam spot 300 may be skewed towards the direction of the scanning vector 400. As a result, an inward-oriented side of the beam spot 300 may expose the build plane 130 and/or the powder bed 136 to a relatively higher intensity and/or power density as compared to an outward-oriented portion of the beam spot 300. As shown in FIGS. 4E and 4F, the elliptical angle $\theta_e$ of the beam spot 300 may change as a result of changing coordinates of the beam spot 300 relative to the normal point 206 as the energy beam 200 propagates along a scanning vector 400 substantially equidistant to the normal point 206. With the beam spot 300 remaining substantially equidistant from the normal point 206, the angel of incidence $\theta_i$ of the energy beam 200 may remain substantially constant. The skewness of the energy density profile 302 may correspondingly rotate, for example, while the degree of skewness remains substantially constant, such that the energy density profile 302 remains skewed towards the normal point 206. Additionally, or in the alternative, the power density profile 404 may correspondingly rotate, for example, while the skewness of the median power density of the power density profile 404 remains substantially constant, such that the power density profile 404 remains oriented transverse to the normal point 206 and/or such that the median power density of the power density profile 404 remains skewed towards the normal point 206.

Now turning to FIGS. 5A-5G, exemplary hatching vectors 500 (FIGS. 5A-5F) and contour vectors 550 (FIG. 5G) will be described. As will be described, the melting and/or sintering behavior of the build plane 130 and/or powder bed 136 may depend on the orientation of a hatching vector 500 of an energy beam 200 across the build plane 130 and/or powder bed 136. Additionally, or in the alternative, the melting and/or sintering behavior of the build plane 130 and/or powder bed 136 may depend on the orientation of a contour vector 550 of an energy beam 200 across the build plane 130 and/or powder bed 136. One or more hatches 502 respectively formed by a plurality of adjacent and/or partially overlapping beam paths 402 may define a solidified congruent region of a build plane 130, such as a layer of an object 114. The one or more hatches 502 may respectively propagate across the build plane 130, such as the layer of the object 114, in a propagation direction according to a hatching vector 500. Each individual hatch 502 may be applied according to a respective scanning vector 400. In some embodiments, a hatching vector 500 may be transverse to a corresponding plurality of scanning vectors 400 that define a plurality of hatches. In the embodiments depicted, a plurality of hatches 502 may be formed by corresponding scanning vectors 400 oriented, for example, in a series of alternating directions, with a hatching vector 500 propagating transverse to the hatches. It will be appreciated, however, that other hatching methodologies are contemplated with corresponding other scanning vectors 400 and/or hatching vectors 500.

One or more contours 552 respectively formed by one or more beam paths 402 may define a solidified perimeter region around at least a portion of a congruent region of a build plane 130, such as a perimeter of an object 114. For example, one or more contours 552 may define a solidified perimeter surrounding at least a portion of a congruent region of a build plane 130 that has been solidified by a plurality of hatches 502 and/or that is subsequently solidified by a plurality of hatches 502. The one or more contours may respectively propagate across the build plane 130, such as the layer of the object 114, in a propagation direction according to a contour vector 550. Each individual contour 552 may be applied according to a respective scanning vector 400. In some embodiments, a contour vector 550 may be perpendicular (e.g., adjacent and/or overlapping) a corresponding one or more scanning vectors 400 that define one or more contours 552. Additionally, or in the alternative, a contour vector 550 may be transverse to a corresponding plurality of scanning vectors 400 that define a plurality of contours 552. In the embodiments depicted, one or more contours 552 may be formed by a corresponding one or more scanning vectors 400, with a contour vector 550 propagating perpendicular (e.g., adjacent and/or overlapping) to the one or more scanning vectors 400. In the case of a plurality of contours 552, the corresponding plurality of scanning vectors 400 may be oriented, for example, in the same direction or in alternating directions. It will be appreciated, however, that other irradiation methodologies are contemplated with corresponding other scanning vectors 400 and/or contour vectors 550.

In some embodiments, the melting and/or sintering behavior of a powder bed 136 may depend on an orientation of a hatching vector 500 of an energy beam 200 across the build plane 130. Additionally, or in the alternative, the melting and/or sintering behavior of a powder bed 136 may depend on an orientation of a contour vector 550 of an energy beam 200 across the build plane 130. FIGS. 5A-5F show an energy beam 200 propagating according to a scanning vector 400 to apply a series of hatches 502. The series of hatches 502 provide a corresponding hatching vector 500 propagating across a build plane 130 and/or powder bed 136 relative to a normal point 206.

Figure 5A:
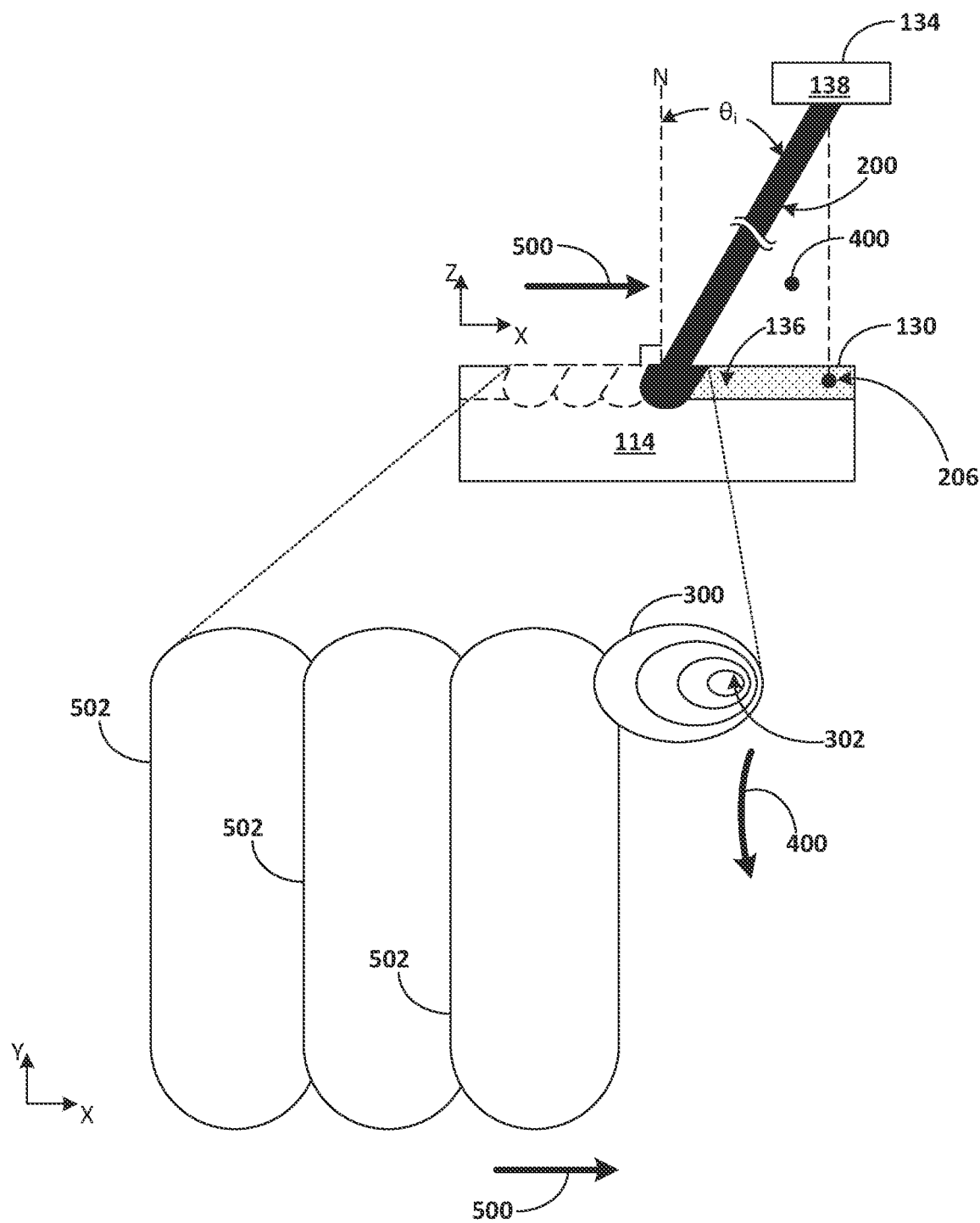
FIGS. 5A-5F schematically depict exemplary hatching vectors corresponding to a plurality of hatches applied to a build plane according to a respective plurality of scanning vectors.
Figure 5B:
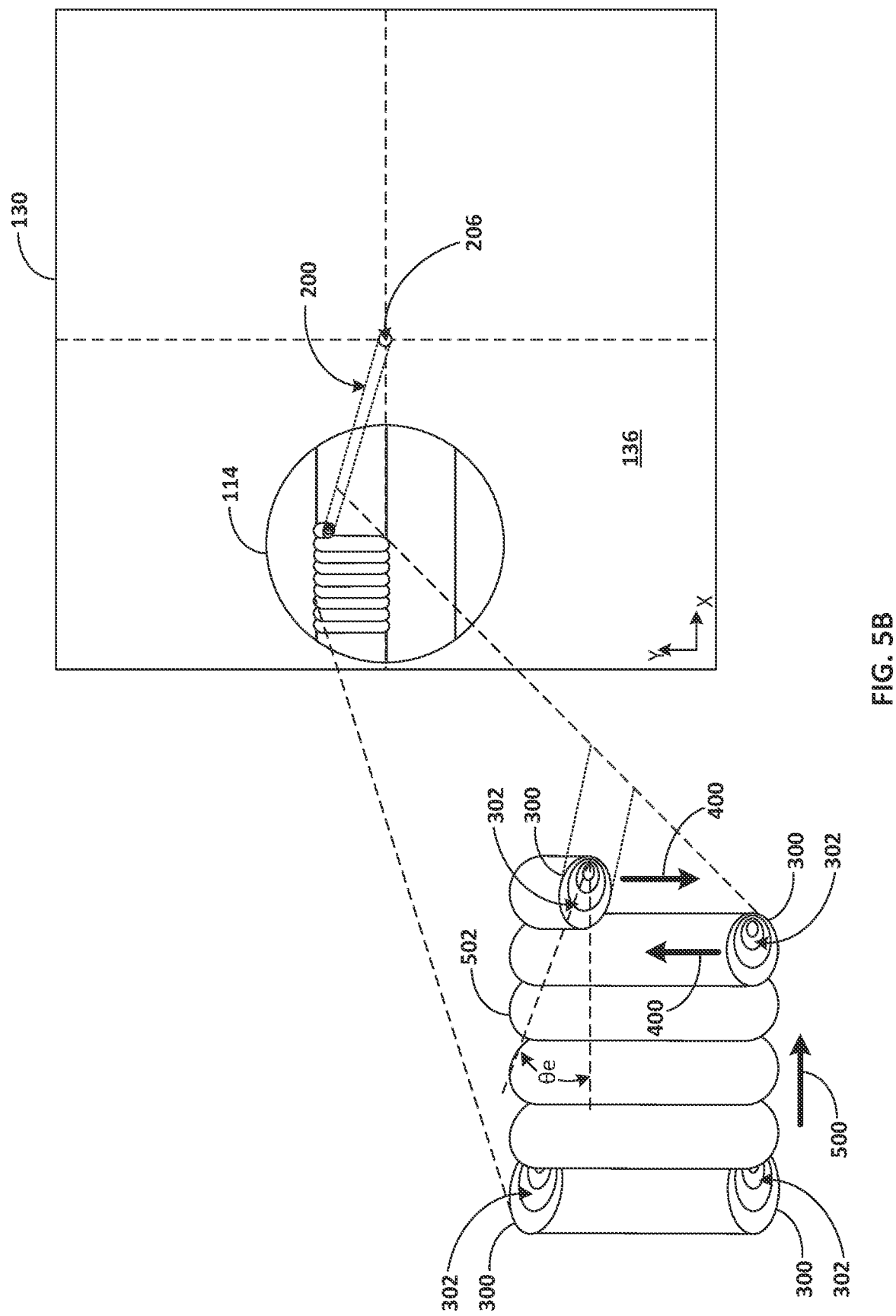

FIGS. 5A and 5B show a hatching vector 500 oriented towards a normal point 206. The hatching vector 500 shown in FIGS. 5A and 5B correspond to a series of hatches 502 applied according to corresponding scanning vectors 400 respectively oriented substantially equidistant from the normal point 206. The scanning vectors 400 and resulting hatches 502 may be linear, indicated by linear hatches 502 as shown, and/or curved, indicated by the scanning vector 400 as shown. By way of example, the scanning vectors 400 corresponding to the series of hatches 502 shown in FIGS. 5A and 5B may be oriented at a tangent or substantially tangent relative to the normal point 206. With the hatching vector 500 shown in FIGS. 5A and 5B, the angle of incidence $\theta_i$ of the energy beam 200 decreases as the hatching vector 500 propagates towards the normal point 206.

Figure 5C:
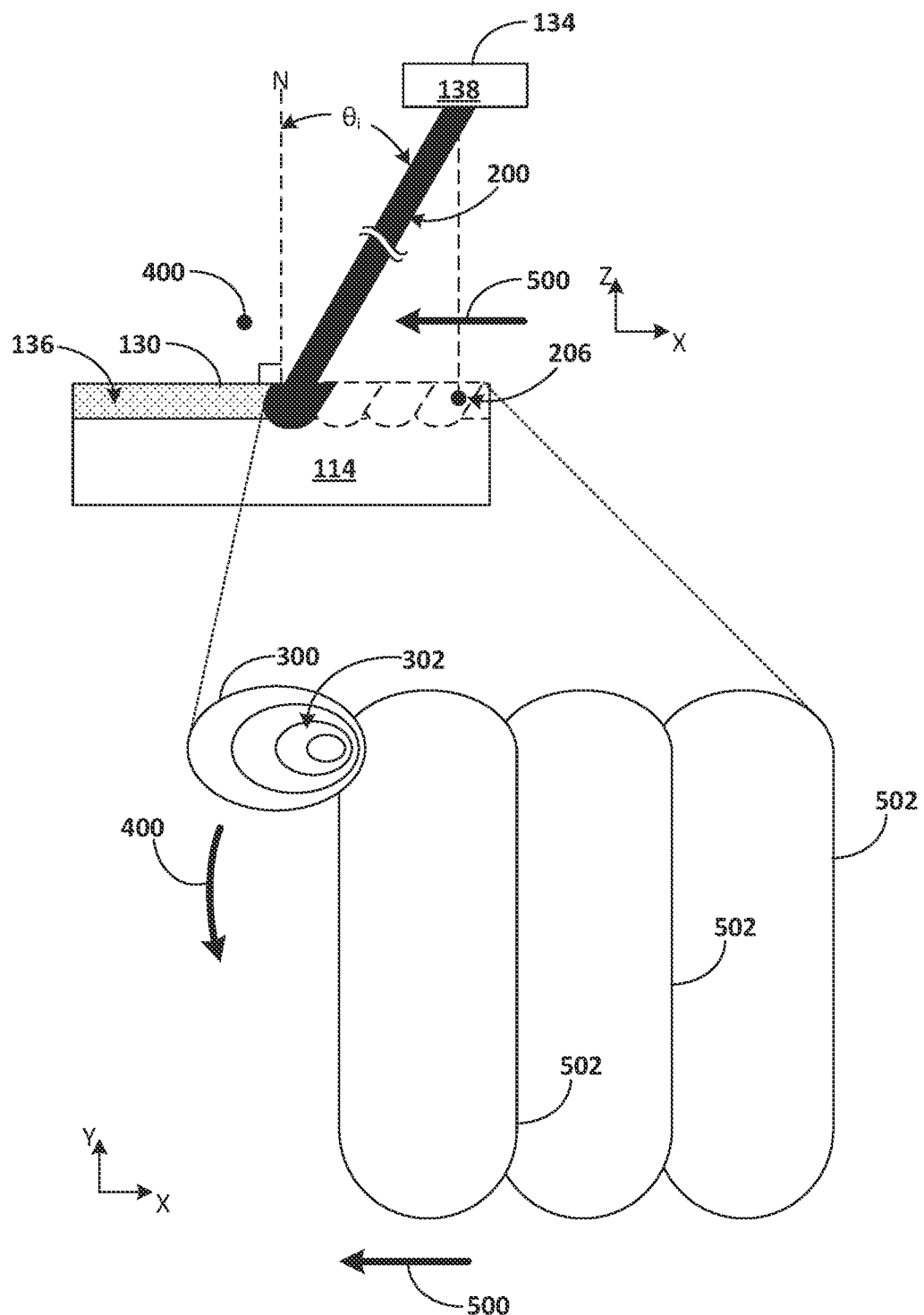
Figure 5D:
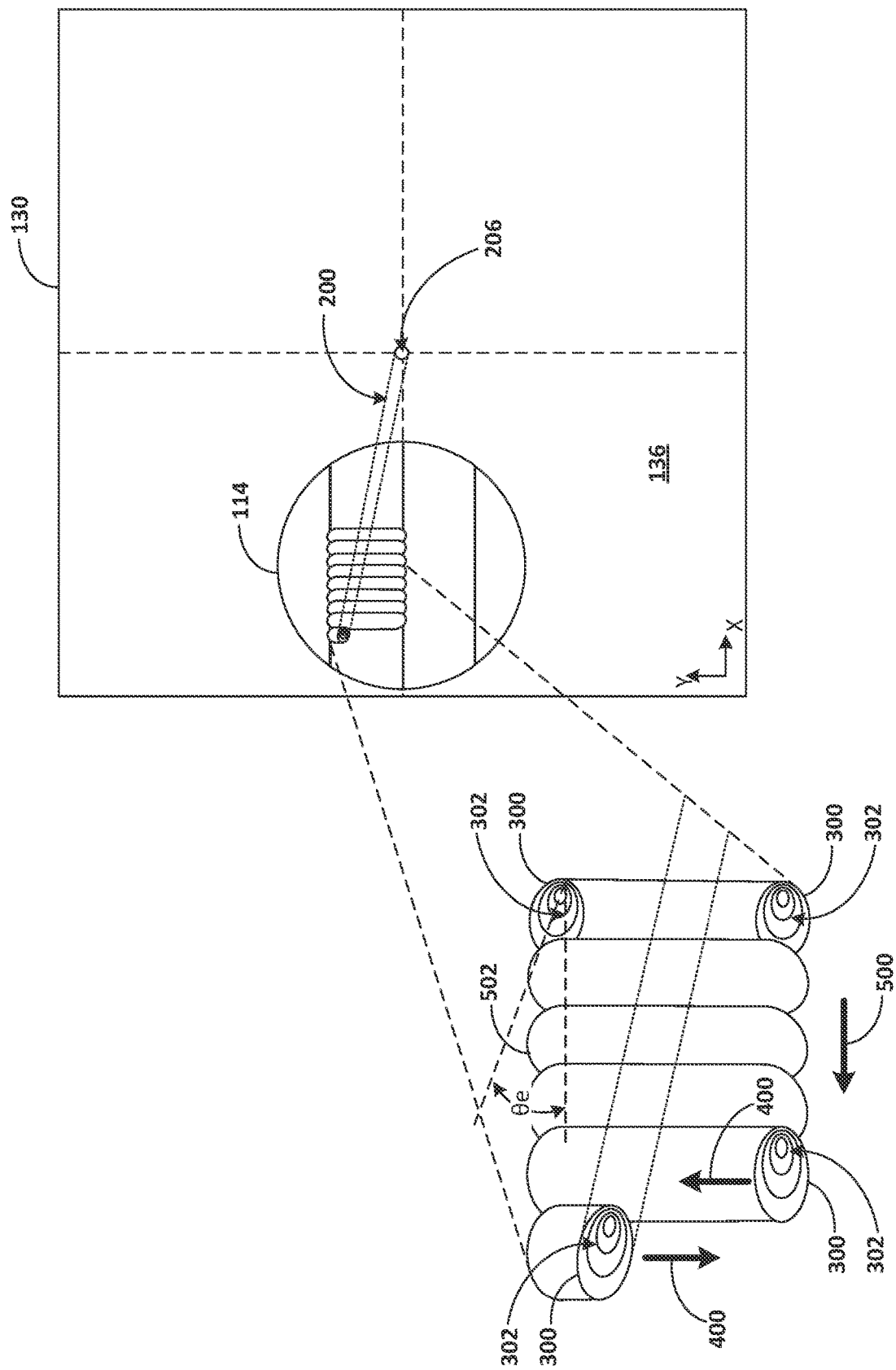

FIGS. 5C and 5D show a hatching vector 500 oriented away from a normal point 206. The hatching vector 500 shown in FIGS. 5C and 5D correspond to a series of hatches 502 applied according to corresponding scanning vectors 400 respectively oriented substantially equidistant from the normal point 206. The scanning vectors 400 and resulting hatches 502 may be linear, indicated by linear hatches 502 as shown, and/or curved, indicated by the scanning vector 400 as shown. By way of example, the scanning vectors 400 corresponding to the series of hatches 502 shown in FIGS. 5C and 5D may be oriented at a tangent or substantially tangent relative to the normal point 206. With the hatching vector 500 shown in FIGS. 5C and 5D, the angle of incidence $\theta_i$ of the energy beam 200 increases as the hatching vector 500 propagates away from the normal point 206.

Figure 5E:
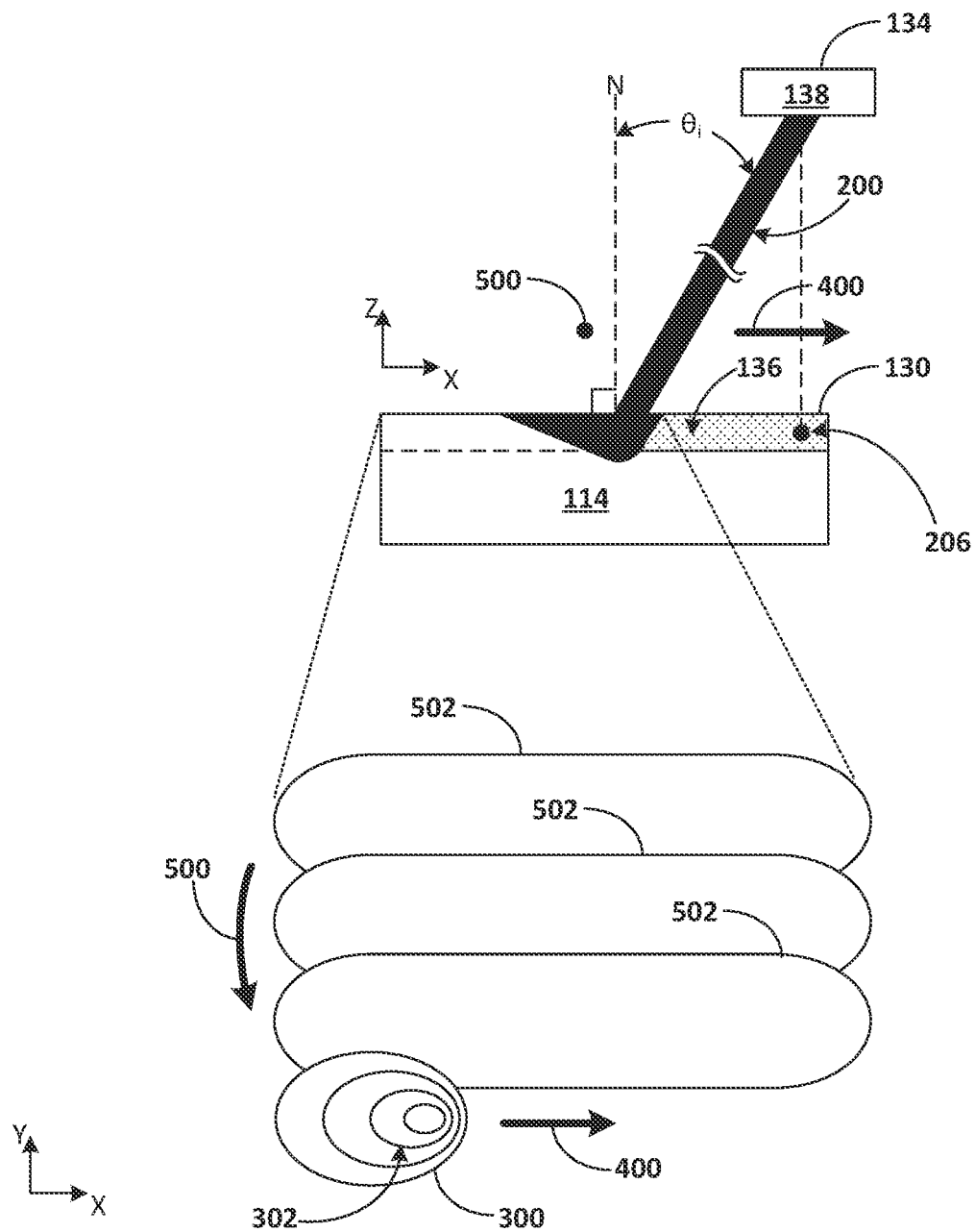
Figure 5F:
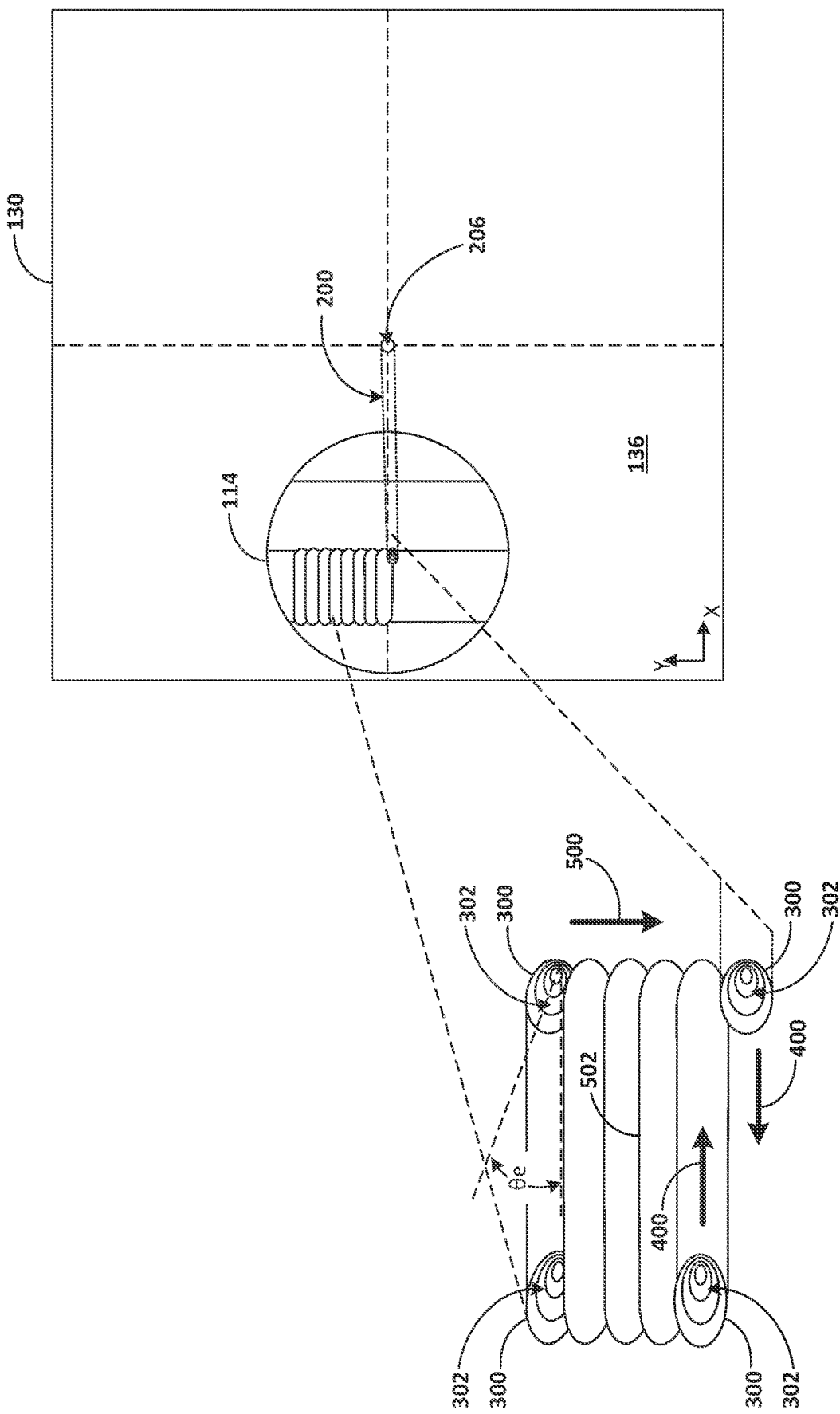

FIGS. 5E and 5F show a hatching vector 500 oriented at substantially equidistant from the normal point 206. By way of example, the hatching vector 500 shown in FIGS. 5E and 5F may be oriented at a tangent or substantially tangent relative to the normal point 206. The scanning vectors 400 and resulting hatches 502 may be oriented towards or substantially towards the normal point 206. In some embodiments, the scanning vectors 400 and resulting hatches 502 may be oriented radially or substantially radially relative to the normal point 206. For example, at least one hatch 502 and corresponding scanning vector 400 may be oriented towards or away from the normal point 206, while adjacent hatches 502 and corresponding scanning vectors 400 may be laterally offset by a distance corresponding to a hatch width, which may include an overlap or an offset. With the hatching vector 500 shown in FIGS. 5E and 5F, the angle of incidence $\theta_i$ of the energy beam 200 remains substantially consistent as the hatching vector 500 propagates along substantially equidistant from the normal point 206.

As shown in FIGS. 5A-5F, the ellipticity of a beam spot 300 may change as a result of changing angle of incidence $\theta_i$ of the energy beam 200 as the energy beam 200 propagates along a scanning vector 400 corresponding to a given hatch 502 and/or as the respective hatches 502 propagate along the hatching vector 500. Additionally, or in the alternative, the elliptical angle $\theta_e$ of the beam spot 300 may change as a result of changing coordinates of the beam spot 300 relative to the normal point 206 as the energy beam 200 propagates along a scanning vector 400 corresponding to a given hatch 502 and/or as the respective hatches 502 propagate along the hatching vector 500. Consequently, the energy density profile 302 and/or the power density profile 404 of a beam spot 300 may change as the energy beam 200 propagates along a scanning vector 400 corresponding to a given hatch 502 and/or as the respective hatches 502 propagate along the hatching vector 500. Additionally, or in the alternative, the melting and/or sintering behavior of the respective hatches 502 and/or the powder bed 136 may change as the energy beam 200 propagates along a scanning vector 400 corresponding to a given hatch 502 and/or as the respective hatches 502 propagate along the hatching vector 500. For example, the melting and/or sintering behavior of the respective hatches 502 and/or the powder bed may depend at least in part on the angle of incidence $\theta_i$ of the energy beam 200 and/or elliptical angle $\theta_e$ of the beam spot 300 corresponding to the current hatch 502 and/or to one or more previous hatches 502, such as the previous hatch 502 being overlapped by the current hatch 502.

With the hatches 502 shown in FIG. 5B, the ellipticity of the beam spot 300 decreases as the hatches 502 propagate along the hatching vector 500 towards the normal point 206, while the elliptical angle $\theta_e$ of the beam spot 300 varies as the respective hatches 502 propagate along the corresponding scanning vector 400. Consequently, the energy density and/or power density imparted by the energy beam 200 may increase as the respective hatches propagate along the hatching vector 500 towards the normal point 206. As shown in FIG. 5B, a portion of the beam spot 300 overlapping a previous hatch 502 may have a lower power density than a portion of the beam spot 300 incident upon the powder bed 136. Additionally, or in the alternative, the energy density imparted to the portion of the previous hatch 502 being overlapped by the beam spot 300 may be greater than the energy density of the portion of the beam spot 300 overlapping the previous hatch 502. As the hatches 502 propagate along the hatching vector 500, and the angle of incidence $\theta_i$ of the energy beam 200 correspondingly decreases, the difference in energy density and/or power density may become less pronounced as between the portion of the previous hatch 502 being overlapped by the beam spot 300 and the portion of the beam spot 300 overlapping the previous hatch 502.

With the hatches 502 shown in FIG. 5D, the ellipticity of the beam spot 300 increases as the hatches 502 propagate along the hatching vector 500 away from the normal point 206, while the elliptical angle $\theta_e$ of the beam spot 300 varies as the respective hatches 502 propagate along the corresponding scanning vector 400. Consequently, the energy density and/or power density imparted by the energy beam 200 may decrease as the respective hatches propagate along the hatching vector 500 away from the normal point 206. As shown in FIG. 5D, a portion of the beam spot 300 overlapping a previous hatch 502 may have a greater power density than a portion of the beam spot 300 incident upon the powder bed 136. Additionally, or in the alternative, the energy density imparted to the portion of the previous hatch 502 being overlapped by the beam spot 300 may be lower than the energy density of the portion of the beam spot 300 overlapping the previous hatch 502. As the hatches 502 propagate along the hatching vector 500, and the angle of incidence $\theta_i$ of the energy beam 200 correspondingly increases, the difference in energy density and/or power density may become more pronounced as between the portion of the previous hatch 502 being overlapped by the beam spot 300 and the portion of the beam spot 300 overlapping the previous hatch 502.

With the hatches 502 shown in FIG. 5F, the elliptical angle $\theta_e$ of the beam spot 300 decreases as the hatches 502 propagate along the hatching vector 500, while the ellipticity of the beam spot 300 varies as the respective hatches 502 propagate along the corresponding scanning vector 400. Consequently, the energy density and/or power density imparted by the energy beam 200 may change (e.g., decrease and/or increase, such as alternatingly decrease and increase) as the respective hatches 502 propagate along the respective scanning vectors 400 away from and/or towards the normal point 206. As shown in FIG. 5F, a portion of the beam spot 300 overlapping a previous hatch 502 may have a greater power density than a portion of the beam spot 300 incident upon the powder bed 136. Additionally, or in the alternative, the energy density imparted to the portion of the previous hatch 502 being overlapped by the beam spot 300 may be lower than the energy density of the portion of the beam spot 300 overlapping the previous hatch 502. As the hatches 502 propagate along the hatching vector 500, and the angle of incidence $\theta_i$ of the energy beam 200 correspondingly increases, the difference in energy density and/or power density may become more pronounced as between the portion of the previous hatch 502 being overlapped by the beam spot 300 and the portion of the beam spot overlapping the previous hatch 502.

Figure 5G:
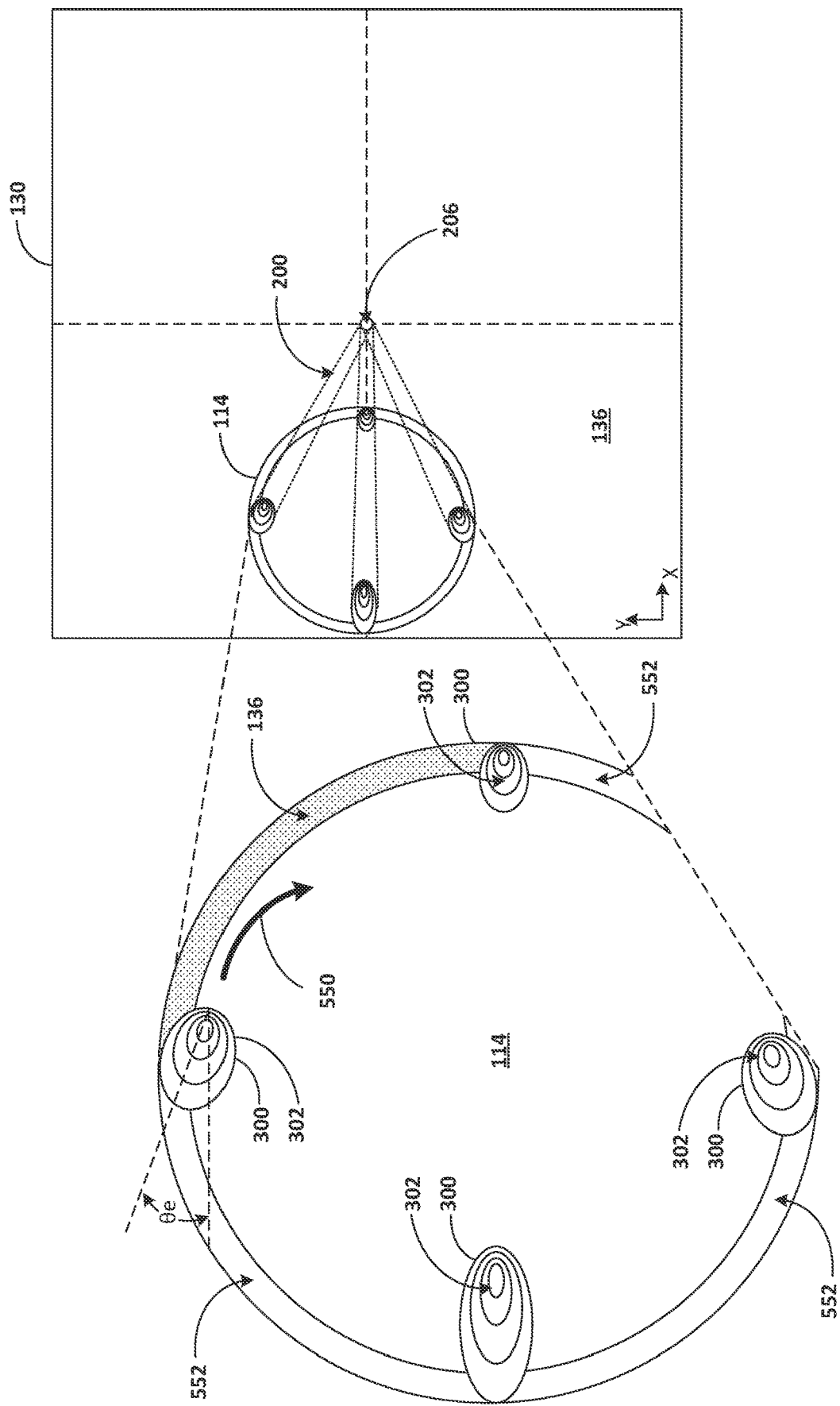
FIG. 5G schematically depicts an exemplary contour vectors corresponding to one or more contours applied to a build plane according to a respective one or more scanning vectors.

FIG. 5G shows a contour vector 550 and corresponding contour 552 at least partially surrounding a perimeter of a layer of an object 114. With the contour vector 550 shown in FIG. 5G, the angle of incidence $\theta_i$ of the energy beam 200 varies continuously as the contour vector 550 propagates around the perimeter of the layer of the object 114. As shown in FIG. 5G, the ellipticity of a beam spot 300 may change as a result of changing angle of incidence $\theta_i$ of the energy beam 200 as the energy beam 200 propagates along a scanning vector 400 corresponding to a given contour 552 and/or as the respective contour 552 propagate along the contour vector 550. Additionally, or in the alternative, the elliptical angle $\theta_e$ of the beam spot 300 may change as a result of changing coordinates of the beam spot 300 relative to the normal point 206 as the energy beam 200 propagates along a scanning vector 400 corresponding to a given contour 552 and/or as the respective contour 552 propagate along the contour vector 550. Consequently, the energy density profile 302 and/or the power density profile 404 of a beam spot 300 may change as the energy beam 200 propagates along a scanning vector 400 corresponding to a given contour 552 and/or as the respective contour 552 propagates along the contour vector 550. Additionally, or in the alternative, the melting and/or sintering behavior of the respective contours 552, the hatches 502 adjacent to the contours 552, and/or the powder bed 136, may change as the energy beam 200 propagates along a scanning vector 400 corresponding to a given contour 552 and/or as the respective contour 552 propagate along the contour vector 550. For example, the melting and/or sintering behavior of the respective contours 552, the hatches 502 adjacent to the contours 552, and/or the powder bed 136, may depend at least in part on the angle of incidence $\theta_i$ of the energy beam 200 and/or elliptical angle $\theta_e$ of the beam spot 300 corresponding to the current contour 552 and/or to one or more previous contours 552 and/or one or more previous hatches 502, such as the previous contour 552 and/or hatch 502 being overlapped by the current contour 552.

Figure 6:
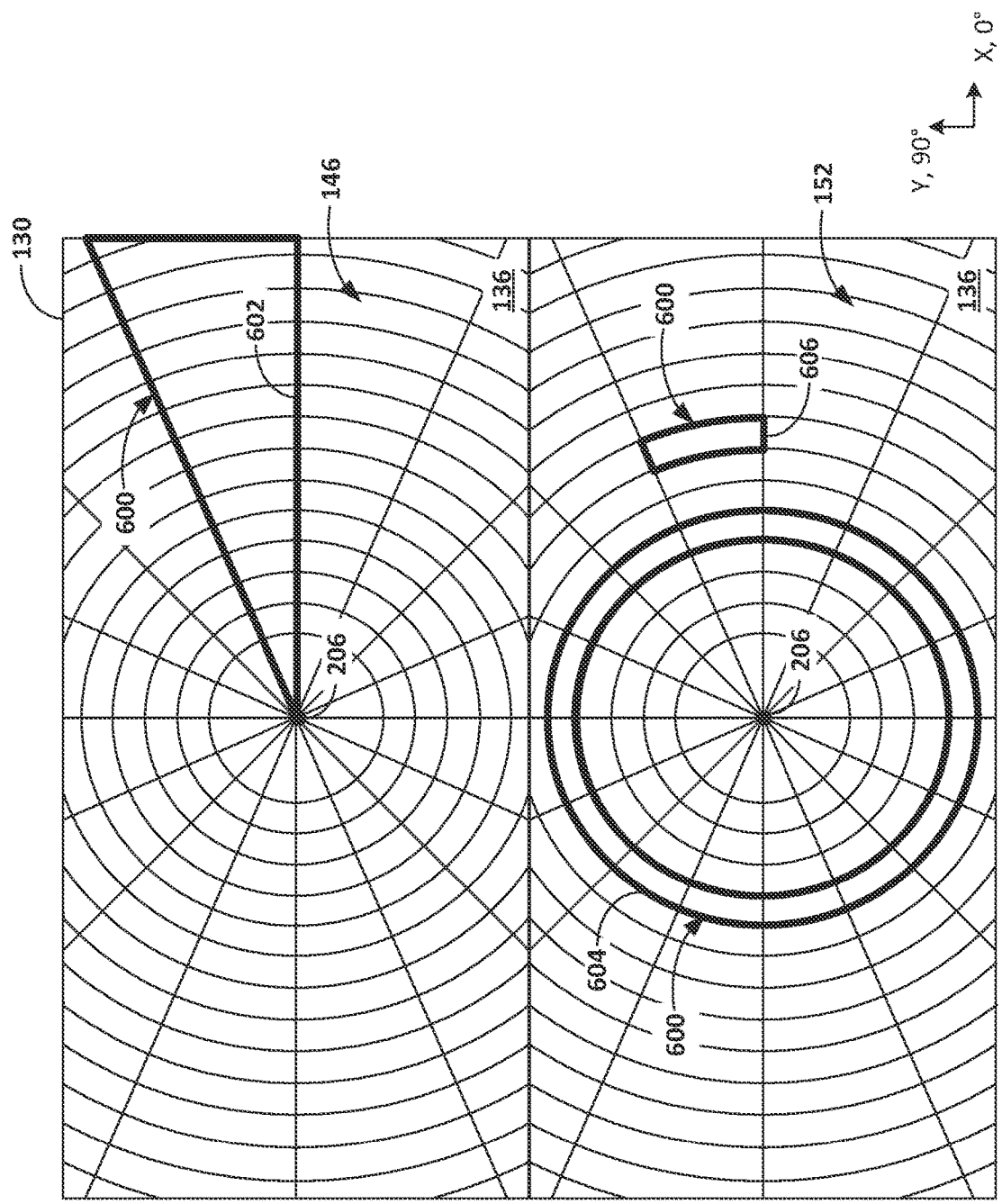
FIG. 6 schematically depicts an exemplary build plane divided into a plurality of scanning segments.
Figure 7:
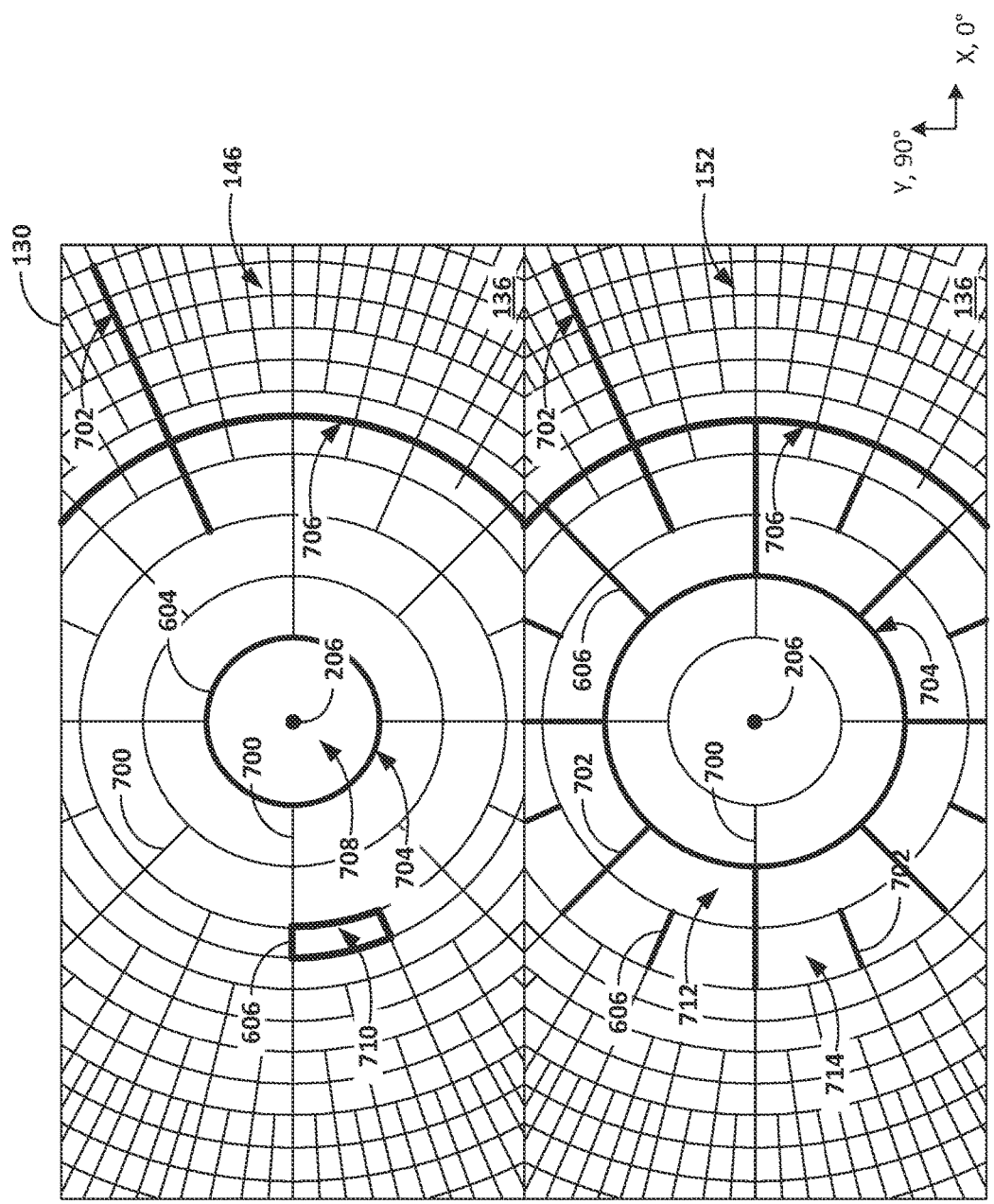
FIG. 7 schematically depicts another exemplary build plane divided into a plurality of scanning segments.
Figure 8A:
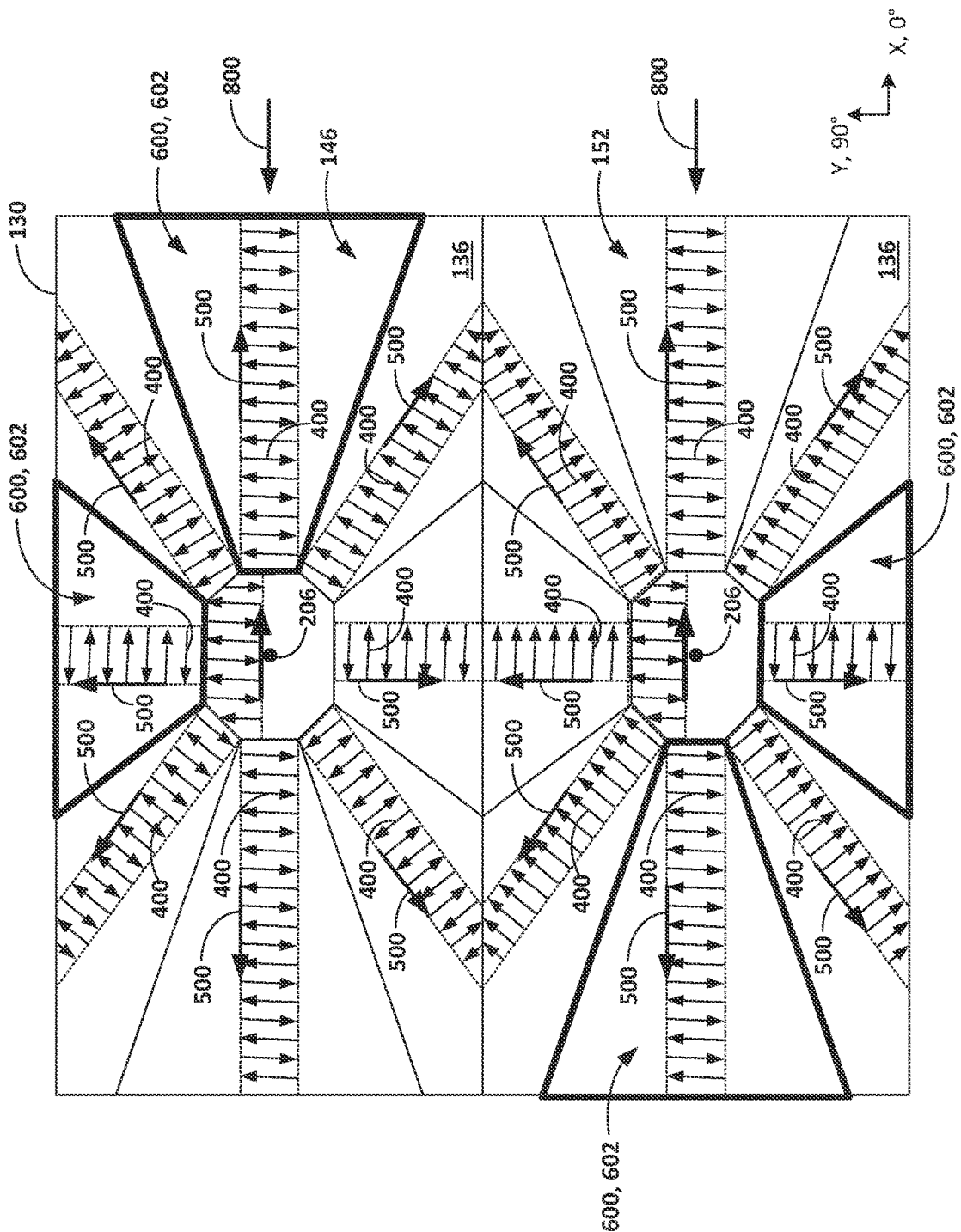
FIGS. 8A-8C schematically depict exemplary irradiation vectors assigned to respective scanning segments.
Figure 8B:
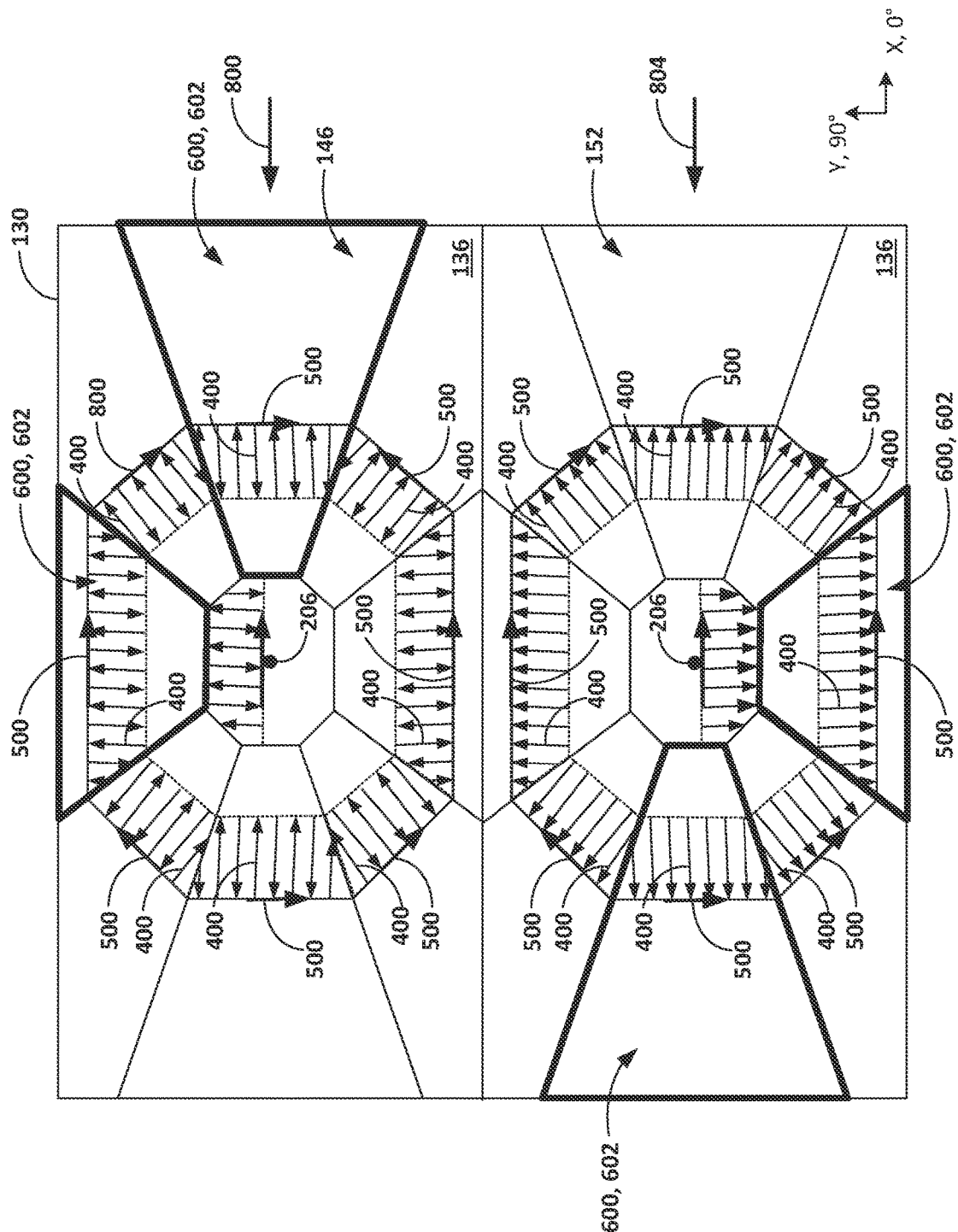
Figure 8C:
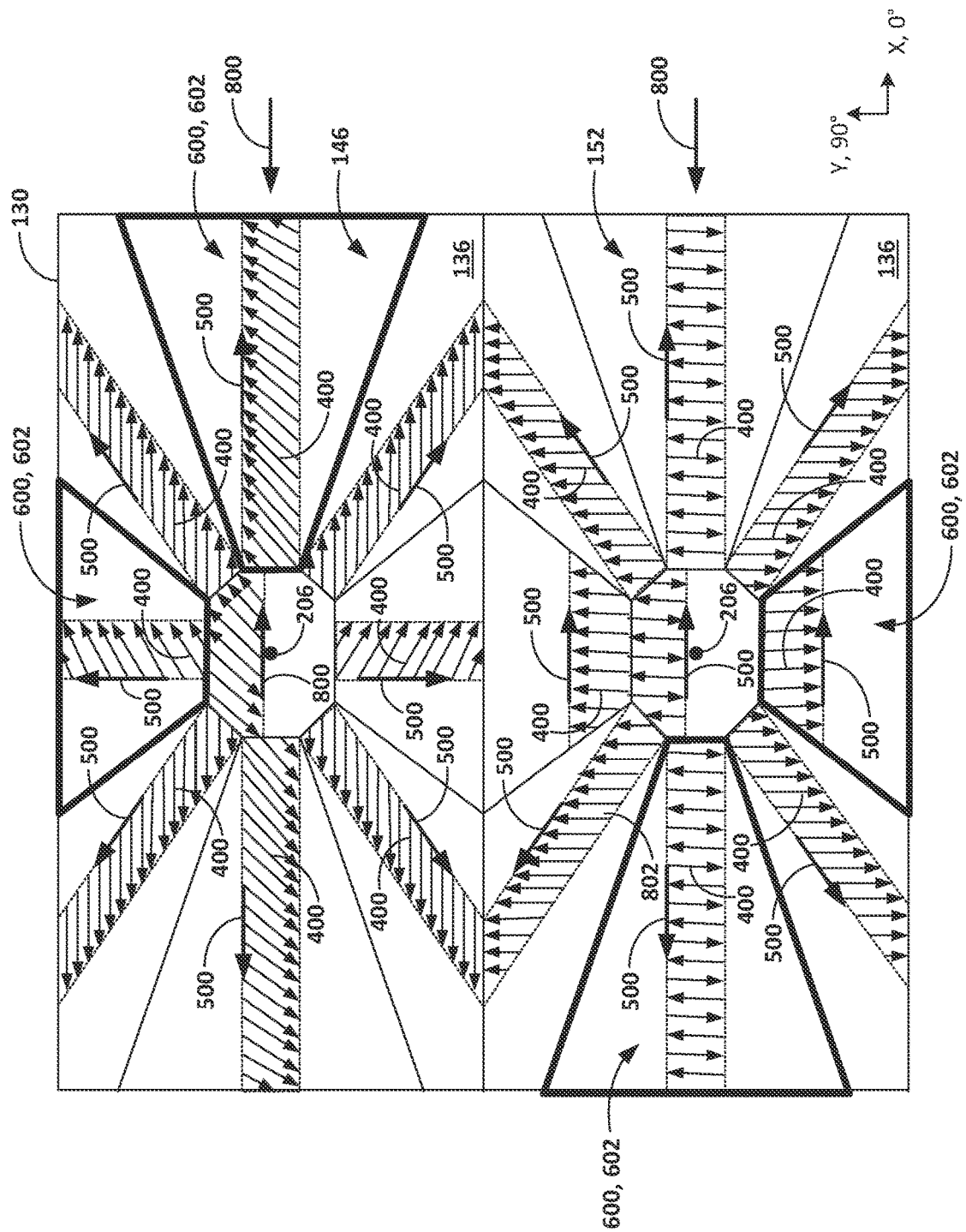
Figure 9A:
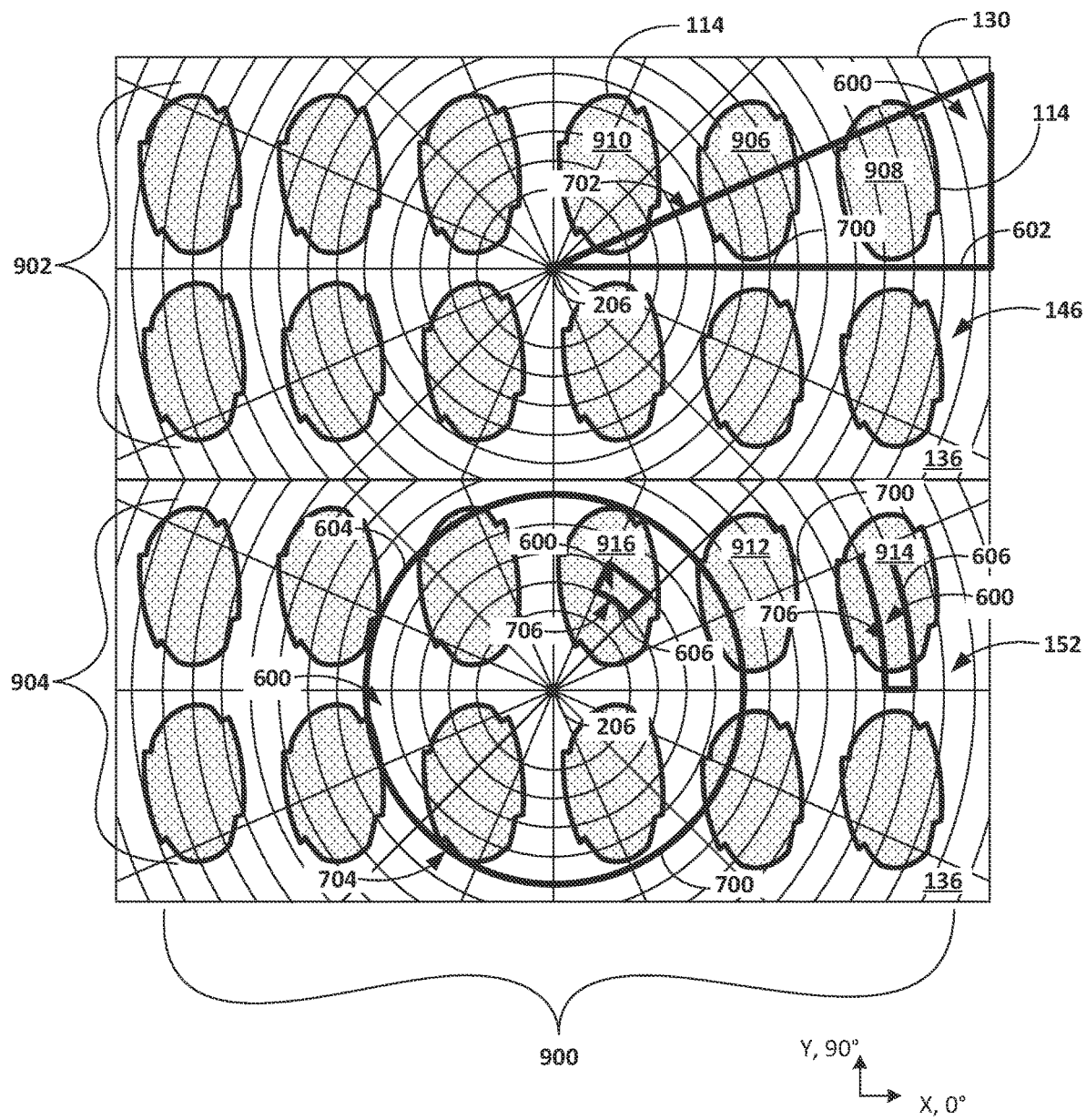
FIGS. 9A and 9B schematically depict exemplary scanning segments corresponding to an object layer.
Figure 9B:
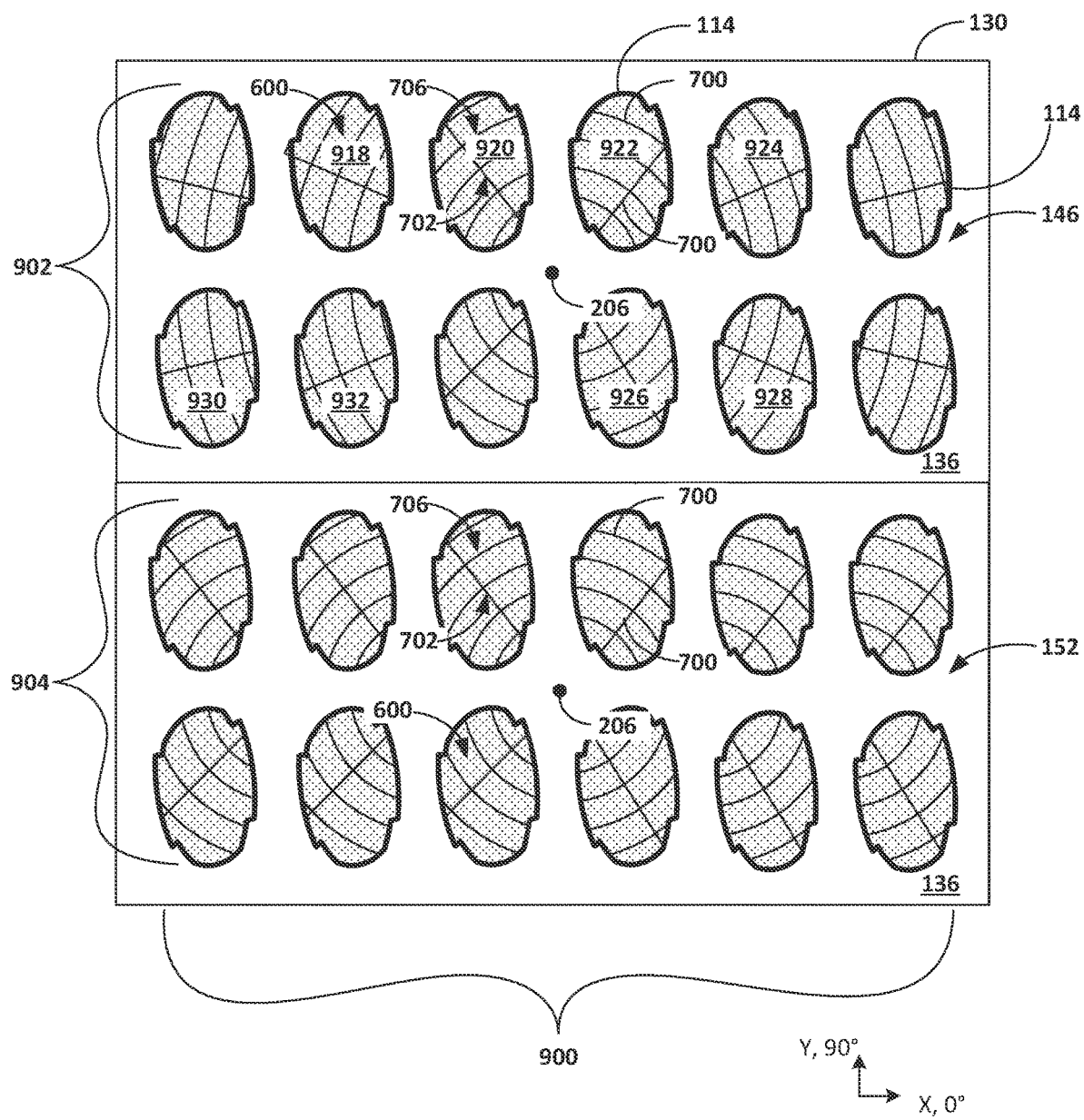

Referring now to FIG. 6, FIG. 7, FIGS. 8A-8C, FIGS. 9A and 9B, FIGS. 10A-10H, and FIG. 11, exemplary scanning segments and exemplary irradiation vectors corresponding to such scanning segments will be described. FIGS. 6 and 7 respectively show a build plane 130 divided into a plurality of scanning segments. FIGS. 8A-8C show exemplary irradiation vectors that may be utilized for to respective scanning segments. FIGS. 9A and 9B show exemplary scanning segments superimposed upon a layer of a plurality of objects 114 to be irradiated. FIGS. 10A-10H show exemplary irradiation vectors that may be utilized to irradiate a layer of respective ones of the plurality of objects 114, such as in accordance with respective scanning segments corresponding to such layer. One or more scanning segments and/or one or more irradiation vectors may be determined for one or more layers of an object 114 based at least in part on a location of at least a portion of the layer of the object 114 on the build plane. Additionally, or in the alternative, one or more irradiation parameters for at least a portion of the layer of the object 114 may be determined based at least in part on such a location on the build plane 130, and/or based at least in part on a scanning segment and/or an irradiation vector respectively corresponding to such location on the build plane 130.

FIG. 6 shows an exemplary build plane 130, such as the build plane 130 corresponding to the additive manufacturing machine 102 shown in FIG. 1. The build plane 130 may include a first build plane-region 146 corresponding to a first energy beam 142, and/or a second build plane-region 152 corresponding to a second energy beam 148. As shown, a plurality of scanning segments 600 of the build plane 130 may be defined. The plurality of scanning segments 600 may be defined in relation to a normal point 206 corresponding to a respective energy beam 200 and/or in relation to an angle of incidence $\theta_i$ of an energy beam 200 corresponding to the normal point 206. For example, as illustrated with respect to the first build-plane region 146, a plurality of segments may extend radially from the normal point 206. The plurality of scanning segments 600 may be arranged radially adjacent to one another. In some embodiments, the build plane 130 may be divided into a plurality of radial segments 602, for example, with respective ones of the plurality of radial segments 602 being radially adjacent to one another.

Additionally, or in the alternative, as illustrated with respect to the second build-plane region 152, a plurality of scanning segments 600 may extend annularly or semi-annularly from the normal point 206. In some embodiments, the build plane 130 may be divided into a plurality of annular segments 604, for example, with respective ones of the plurality of annular segments 604 being circumferentially adjacent to one another. Additionally, or in the alternative, the build plane 130 may be divided into a plurality of semi-annular segments 606, for example, with respective ones of the plurality of semi-annular segments 606 being circumferentially adjacent to one another and/or radially adjacent to one another. In some embodiments, the build plane may be divided radially and annularly, thereby defining a plurality of semi-annular segments 606 bounded radially and semi-annularly relative to the normal point 206. The boundaries of the respective scanning segments 600 may be determined by reference to coordinates of the build plane, such as X and Y coordinates in relation to a normal point 206. Additionally, or in the alternative, the boundaries of respective scanning segments 600 may be determined by reference to an angle of incidence $\theta_i$ of an energy beam 200 corresponding to the normal point 206.

FIG. 7 shows another exemplary build plane 130 divided into a plurality of scanning segments 600, such as the build plane 130 corresponding to the additive manufacturing machine 102 shown in FIG. 1. As shown in FIG. 7, in some embodiments, the number of scanning segments 600 per unit area of the build plane 130, and/or per unit area of a layer of one or more objects 114 to be irradiated, may depend at least in part on a distance from the normal point 206 and/or on an angle of incidence $\theta_i$ of an energy beam 200 corresponding to the normal point 206. For example, as shown, the number of scanning segments 600 per unit area may increase with increasing distance from the normal point 206 and/or with increasing angle of incidence $\theta_i$ of the energy beam 200 corresponding to the normal point 206. Additionally, or in the alternative, the area of a given segment may depend at least in part on a distance from the normal point 206 and/or on an angle of incidence $\theta_i$ of an energy beam 200 corresponding to the normal point 206. For example, the area of respective scanning segments 600 may decrease with increasing distance from the normal point 206 and/or with increasing angle of incidence $\theta_i$ of the energy beam 200 corresponding to the normal point 206. Such a decrease in the area of respective scanning segments 600 may be determined with reference to an average area of respective scanning segments within radially inward and radially outward co-annular portions of the build plane 130 disposed about the normal point 206.

As shown in FIG. 7, one or more segment boundaries 700 corresponding to a given scanning segment 600 may be determined based at least in part on an angle of incidence $\theta_i$ of an energy beam 200 when incident upon the respective scanning segment 600. Exemplary segments may include radial boundaries 702, annular boundaries 704, and/or semi-annular boundaries 706. In some embodiments, the number of segment boundaries 700, including radial boundaries 702 and/or annular boundaries 704, may increase with increasing distance from the normal point 206 and/or with increasing angle of incidence $\theta_i$ of the energy beam 200 corresponding to the normal point 206.

One or more segment boundaries 700 may be determined for a corresponding one or more scanning segments 600 based at least in part on one or more beam parameters that may depend at least in part on an angle of incidence $\theta_i$ of the energy. For example, one or more segment boundaries 700 may be determined based at least in part on one or more beam parameters the may influence the melting and/or sintering behavior of the powder bed depending on an angle of incidence $\theta_i$ of the energy beam 200. In some embodiments, one or more segment boundaries 700 may be determined for a corresponding one or more scanning segments 600 such that the angle of incidence $\theta_i$ of the energy beam 200 incident upon a respective scanning segment 600 remains within a defined range at all points within the respective scanning segment 600 and/or at all points along the one or more segment boundaries 700 defining the respective scanning segment 600.

The defined range for the angle of incidence $\theta_i$ of the energy beam 200 and/or the number of segment boundaries 700 (e.g., the number of annular boundaries 704 and/or radial boundaries 702) may be determined based at least in part on an actual or potential influence on one or more beam parameters that may depend on an angle of incidence $\theta_i$ of the energy beam 200, such as an actual or potential influence on melting and/or sintering behavior attributable to the angle of incidence $\theta_i$ of the energy beam 200.

For example, one or more annular boundaries 704 may be determined for a corresponding one or more scanning segments 600 such that the angle of incidence $\theta_i$ remains within a defined range from an inward annular boundary 704 to an outward annular boundary 704. By way of example, in some embodiments, a plurality of scanning segments 600 may be configured and arranged relative to a normal point 206 such that the angle of incidence $\theta_i$ of an energy beam 200 corresponding to the normal point 206 incident upon a respective scanning segment 600 differs as between any two points within the respective scanning segment 600, and/or as between any two points along any one or more of the segment boundaries 700 corresponding to the segment, by a defined range of 20 degrees or less, such as 15 degrees or less, such as 10 degrees or less, such as 5 degrees or less, or such as 2.5 degrees or less. In some embodiments, the defined range for the angle of incidence $\theta_i$ of the energy beam 200 may decrease with increasing angle of incidence $\theta_i$. By way of example, in some embodiments, a defined range for a radially inward segment 600 may exceed a defined range for a radially outward segment 600 by at least 5%, such as at least 10%, such as at least 20%, such as at least 25%, such as at least 35%, such as at least 50%, such as at least 75%, such as at least 100%, such as at least 150%, such as at least 200%.

Additionally, or in the alternative, in some embodiments, the number of radial boundaries 702 and/or the number of annular or semi-annular scanning segments 600 may be determined based at least in part on the angle of incidence $\theta_i$ of the energy beam 200 incident upon a respective scanning segment 600. For example, the number of radial boundaries 702 and/or the number of annular or semi-annular scanning segments 600 may increase with increasing angle of incidence $\theta_i$. By way of example, in some embodiments, the number of radial boundaries 702 for a radially outward portion of the build plane 130 may exceed the number of radial boundaries 702 for a radially inward portion of the build plane 130, and/or the number of annular or semi-annular scanning segments 600 for a radially outward portion of the build plane 130 may exceed the number of annular or semi-annular scanning segments 600 for a radially inward portion of the build plane 130, by a factor of at least 3:2, such as at least 2:1, such as at least 3:1, such as at least 4:1, such as at least 8:1, such as at least 16:1, such as at least 32:1, such as at least 64:1. As illustrated in FIG. 7, with respect to the first build plane-region 146, a first radially inward portion 708 of the build plane 130 may have one annular segment 604, and a first radially outward portion 710 of the build plane 130 may have 16 semi-annular segments 606. As another example, with respect to the second build plane-region 152, a second radially inward portion 712 may have a plurality of radial boundaries 702 distributed about the normal point 206 in 45-degree increments, and a second radially outward portion 714 may have a plurality of radial boundaries 702 distributed about the normal point 206 in 22.5-degree increments. The plurality of radial boundaries 702 at the second radially inward portion 712 may define eight (8) semi-annular segments 606. The plurality of radial boundaries 702 at the second radially outward portion 714 may define sixteen (16) semi-annular segments 606.

Now referring to FIGS. 8A-8C, exemplary irradiation vectors will be described. The irradiation vectors may be assigned to respective scanning segments 600. The scanning segments 600 may correspond to a build plane 130, a powder bed 136 defining the build plane 130, an object layer that includes one or more objects to be irradiated by an energy beam 200. As shown in FIGS. 8A-8C, a build plane 130 may be divided into a plurality scanning segments 600, such as a plurality of radial segments 602. By way of illustration, the build planes 130 shown in FIGS. 8A-8C are divided into eight (8) radial segments; however, it will be appreciated that a build plane 130 may be divided into any number of scanning segments 600, including radial segments 602, annular segments 604, and/or semi-annular segments 606. In some embodiments, an annular segment 604 may surround the normal point 206. The annular segment 604 surrounding the normal point 206 may have a radius corresponding to an angle of incidence $\theta_i$ of the respective energy beam. For example, the angle of incidence $\theta_i$ may be at least less than a threshold below which the angle of incidence $\theta_i$ has a nominal effect on melting and/or sintering behavior. One or more irradiation vectors (e.g., one or more scanning vectors, one or more hatching vectors, and/or one or more contour vectors) may be assigned to at least some of the plurality of scanning segments 600 based at least in part on a location of the segment 600 on the build plane 130, such as based at least in part on the location of the segment 600 relative to the normal point 206. At least some of the one or more irradiation vectors (e.g., one or more scanning vectors, one or more hatching vectors, and/or one or more contour vectors) assigned to a respective scanning segment 600 may be oriented away from the normal point 206.

As shown in FIGS. 8A-8C, one or more hatching vectors 500 may be assigned to a corresponding to one or more scanning segments 600 of the build plane 130, such as to one or more radial segments 602 of the build plane 130. The one or more hatching vectors 500 assigned to the corresponding scanning segments 600 may be oriented away from the normal point 206. An object 114 and/or a portion of an object 114 located within a given scanning segment 600, such as a radial segment 602, may be irradiated at least in part according to such a hatching vector 500 assigned to the given segment. In some embodiments, each segment 600, such as each radial segment 602, may include one or more hatching vectors 500 oriented away from the normal point 206. The one or more hatching vectors 500 may be determined based at least in part on the location of the corresponding scanning segments 600 on the build plane 130, for example, such that the respective hatching vectors 500 may be oriented away from the normal point 206. The respective hatching vectors 500 may include at least a directional component oriented away from the normal point 206, such as at least an X-directional component and/or at least a Y-directional component oriented away from the normal point 206. The respective hatching vectors 500 may be defined by a corresponding plurality of scanning vectors 400. In some embodiments, at least some of the scanning vectors 400 may be oriented away from the normal point 206. For example, a hatching vector 500 may be assigned to a segment 600 of the build plane 130, and both the hatching vector 500 and the plurality of scanning vectors 400 that define the hatching vector 500 may be oriented away from the normal point 206.

As shown in FIG. 8A, in some embodiments, a plurality of scanning vectors 400 may be oriented away from the normal point 206 in a substantially radial direction relative to the normal point 206. Such hatching vectors 500 may have a directional component oriented away from the normal point 206 in a substantially radial direction. The plurality of scanning vectors 400 that define a respective hatching vector 500 may be oriented perpendicular to a radial line extending from the normal point 206, such as perpendicular to the respective hatching vector 500. As shown in FIG. 8A with respect to first build plane-region 146, at least some of the scanning vectors 400 defining the hatching vectors 500 may be oriented in alternating directions. Additionally, or in the alternative, as shown in FIG. 8B with respect to the second build plane-region 152, at least some of the scanning vectors 400 defining the hatching vectors 500 may be oriented in a common direction. For example, at least some of the scanning vectors 400 may be oriented counter-current to a gas flow direction 800.

As shown in FIG. 8B, in some embodiments, a plurality of scanning vectors 400 may be oriented away from the normal point 206 in a substantially radial direction relative to the normal point 206. Such scanning vectors 400 may have a directional component oriented away from the normal point 206 in a substantially radial direction. The plurality of scanning vectors 400 in a respective scanning segment 600, such as a radial segment 602, may define a hatching vector 500 that may be oriented perpendicular to a radial line extending from the normal point 206, such as perpendicular to the respective scanning vectors 400 that define the hatching vector 500. As shown in FIG. 8B with respect to first build plane-region 146, at least some of the scanning vectors 400 defining the hatching vectors 500 may be oriented in alternating directions. At least some of the hatching vectors 500 defined by the scanning vectors 400 may be oriented counter-current to a gas flow direction 800. Additionally, or in the alternative, as shown in FIG. 8B with respect to the second build plane-region 152, at least some of the scanning vectors 400 defining the hatching vectors 500 may be oriented in a common direction. For example, at least some of the hatching vectors 500 may be defined by a plurality of scanning vectors 400 that are oriented parallel to a radial line extending from the normal point 206, such as perpendicular to the respective hatching vector 500.

Any number of orientations for hatching vectors 500 and corresponding scanning vectors 400 may be provided. By way of another example, as shown in FIG. 8C with respect to first build plane-region 146, a plurality of scanning vectors 400 may be oriented away from the normal point 206 in a substantially radial direction relative to the normal point 206 and the plurality of scanning vectors 400 that define a respective hatching vector 500 may be oriented non-perpendicular to a radial line extending from the normal point 206, such as non-perpendicular to the respective hatching vector 500. The hatching vectors 500 defined by such scanning vectors 400 may be oriented away from the normal point 206 in a substantially radial direction. At least some of the scanning vectors 400 may be oriented counter-current to a gas flow direction 800. In some embodiments, scanning vectors located upstream from the normal point relative to the gas flow direction 800 may have at least one directional component oriented counter-current to the gas flow direction. Additionally, or in the alternative, scanning vectors located downstream from the normal point 206 may have at least one directional component oriented co-current to the gas flow direction 800.

As shown in FIG. 8C with respect to second build plane-region 152, a plurality of scanning vectors 400 may be oriented away from the normal point 206 in a substantially perpendicular direction relative to a gas flow direction 800. At least some of the hatching vectors 500 defined by such scanning vectors 400 may be oriented away from the normal point 206 in a substantially radial direction. Additionally, or in the alternative, at least some of the hatching vectors 500 defined by such scanning vectors 400 may be oriented counter-current to a gas flow direction 800. For example, in some embodiments, one or more scanning segments 600, such as one or more radial segments 602, located upstream of the normal point 206 relative to the gas flow direction 800 may include a hatching vector 500 with at least one directional component oriented counter-current to the gas flow direction 800. One or more scanning segments 600, such as one or more radial segments 602, located downstream of the normal point 206 relative to the gas flow direction 800 may include a hatching vector 500 with at least one with directional component oriented co-current to the gas flow direction 800. One or more scanning segments 600, such as one or more radial segments 602, located ad a midward portion of build plane 130 relative to the gas flow direction 800 may include a plurality of scanning vectors 400 with at least one directional component oriented transverse to the gas flow direction 800. The hatching vectors 500 defined by such scanning vectors 400 may include at least one directional component oriented counter-current to the gas flow direction 800.

Now turning to FIGS. 9A and 9B, exemplary scanning segments corresponding to an object layer that includes a plurality of objects 114 to be irradiated will be described. FIG. 9A shows a build plane 130 defining an object layer 900 for a plurality of objects 114 to be irradiated by one or more energy beams. The object layer 900 may include a first object layer 902 at a first build plane-region 146 to be irradiated by a first energy beam 142 and/or a second object layer 904 at a second build plane-region 152 to be irradiated by a second energy beam 148 (FIG. 1). The build plane 130 has been segmented into a plurality of scanning segments 600. By way of example, as shown in FIG. 9A, the plurality of scanning segments 600 may include a plurality of radial segments 602, a plurality of annular segments 604 and/or a plurality of semi-annular segments 606.

As shown in FIG. 9A, a build plane 130 may be segmented into a plurality of scanning segments 600, such as a plurality of radial segments 602, a plurality of annular segments 604 and/or a plurality of semi-annular segments 606. The plurality of scanning segments 600 may intersect respective ones of the plurality of objects 114 in the object layer 900 at different locations of the respective object 114 depending on the position of the respective objects 114 on the build plane 130. By way of example, as shown in FIG. 9A, a radial segment 602 shown in the first build plane-region 146 includes a radial boundary 702 that intersects a first object 906 at or about a midward region of the first object 906, whereas the same radial boundary 702 intersects a second object 908 at or about an edgeward region of the second object 908. Additionally, or in the alternative, for the scanning segments 600 shown in FIG. 9A, the first object 906 and the second object 908 may be intersected by one radial boundary 702, whereas a third object 910 may be intersected by three radial boundaries 702. The slope of the radial boundaries 702 intersecting respective objects 114 may differ depending on the location of the respective objects 114. For example, the radial boundary 702 intersecting the first object 906 and/or the second object 908 may have a slope of about 11.25 degrees, whereas a radial boundary intersecting the third object 910 may have a slope of about 22.5 degrees and/or 33.75 degrees.

As another example, an annular segment 604 shown in the second build plane-region 152 of FIG. 9A may include an annular boundary 704 that intersects a fourth object 912 at or about a radially inward region of the fourth object 912, whereas the same annular boundary 704 may not intersect a fifth object 914. Additionally, or in the alternative, for the scanning segments 600 shown in FIG. 9A, an annular boundary 704 may intersect the fourth object 912 but may not intersect the fifth object 914. The arc length of an annular boundary 704 and/or of a semi-annular boundary 706 intersecting respective objects 114 may differ depending on the location of the respective objects 114. For example, the portion of an annular boundary 704 that intersects the fifth object 914 may have an arc length of from about 11.25 degrees to less than 22.5 degrees, whereas the portion of an annular boundary 704 that intersects a sixth object 916 may have an arc length of from about 22.5 degrees to less than 33.75 degrees.

In some embodiments, one or more irradiation parameters may be determined based at least in part on a location of an object 114, such as a location of a layer of an object 114 in an object layer 900. The one or more irradiation parameters may be determined based, at least in part, on angle of incidence $\theta_i$ of an energy beam 200 and/or elliptical angle $\theta_e$ of the beam spot 300, and/or based at least in part on a relationship between melting and/or sintering behavior and angle of incidence $\theta_i$ of the energy beam 200 and/or elliptical angle $\theta_e$ of the beam spot 300. The one or more irradiation parameters may be determined with respect to one or more scanning segments 600, such as with respect to one or more scanning segments 600 corresponding to an object layer 900. The one or more irradiation parameters may differ as between at least some of the scanning segments 600 and/or as between at least some of the objects 114 in an object layer 900.

In some embodiments, the configuration and/or arrangement of one or more scanning segments 600 may be determined based at least in part on a location of a layer of an object 114 in an object layer 900 on the build plane 130. By way of example, FIG. 9B shows an object layer 900 for a plurality of objects 114 that respectively include one or more scanning segments 600 with a configuration and/or arrangement determined based at least in part on a location of the respective object 114. The configuration and/or arrangement of one or more scanning segments 600 corresponding to respective objects 114 in an object layer 900 may be determined based, at least in part, on angle of incidence $\theta_i$ of an energy beam 200 and/or elliptical angle $\theta_e$ of the beam spot 300 at one or more locations of a respective object 114 in the object layer 900. Additionally, or in the alternative, a configuration and/or arrangement of one or more scanning segments 600 may be determined based at least in part on a relationship between melting and/or sintering behavior and angle of incidence $\theta_i$ of the energy beam 200 and/or elliptical angle $\theta_e$ of the beam spot 300 corresponding to such one or more locations of the rejective object 114 in the object layer 900. The configuration and/or arrangement of one or more scanning segments 600 may be determined with respect to one or more objects 114 in an object layer 900. The configuration and/or arrangement of one or more scanning segments 600 may differ as between at least some of the scanning segments 600 and/or as between at least some of the objects 114 in an object layer 900.

As shown in FIG. 9B with respect to the first build plane-region 146, in some embodiments, a configuration and/or arrangement of one or more segment boundaries 700, such as one or more radial boundaries 702, may be determined for one or more objects 114 in an object layer 900 based at least in part on a location of the object 114 in the object layer 900 on the build plane 130. For example, as shown, a position and/or slope of a radial boundary 702 may be determined for one or more objects 114 in the object layer 900 based at least in part on a location of the respective object 114 in the object layer 900 on the build plane 130. In some embodiments, as shown with respect to the first build plane-region 146, the position and/or slope of the radial boundary 702 may be determined so as to coincided substantially with a midward portion of the object. As shown with respect to the second build plane-region 152, the position and/or slope of the radial boundary 702 may be determined so as to be substantially identical as between respective ones of a plurality of objects 114 in the object layer 900. For example, a radial boundary 702 intersecting an object 114 located at a radially inward portion of the object layer 900 may have a position and/or slope that coincides with the normal point 206, whereas a radial boundary 702 intersecting an object 114 located at a radially outward portion of the object layer 900 may have a position and/or slope offset from the normal point 206.

Additionally, or in the alternative, as shown in FIG. 9B with respect to the second build plane-region 152, in some embodiments, a configuration and/or arrangement of one or more annular boundaries 704 and/or one or more semi-annular boundaries 706 may be determined for one or more objects 114 in an object layer 900 based at least in part on a location of the object 114 in the object layer 900 on the build plane 130. For example, as shown, a position, radius of curvature, and/or slope of an annular boundary 704 and/or semi-annular boundary 706 may be determined for one or more objects 114 in the object layer 900 based at least in part on a location of the respective object 114 in the object layer 900 on the build plane 130. In some embodiments, as shown with respect to the second build plane-region 152, the position and/or slope of the annular boundary 704 and/or semi-annular boundary 706 may be determined so as to be substantially identical as between respective ones of a plurality of objects 114 in the object layer 900. For example, an annular boundary 704 and/or semi-annular boundary 706 intersecting an object 114 located at a radially inward portion of the object layer 900 may have a position, radius of curvature, and/or slope that coincides with the normal point 206, whereas an annular boundary 704 and/or semi-annular boundary 706 intersecting an object 114 located at a radially outward portion of the object layer 900 may have a position, radius of curvature, and/or slope offset from the normal point 206.

Now referring to FIGS. 10A-10H, exemplary irradiation vectors corresponding to respective objects 114 in an object layer 900 will be described. FIGS. 10A-10H respectively show a slice of an individual object 114 from an object layer 900 with exemplary irradiation vectors that may be utilized. The exemplary irradiation vectors for the respective individual objects 114 shown in FIGS. 10A-10H may be utilized for one or more objects 114 in an object layer 900. Such exemplary irradiation vectors may be utilized individually or in combination for one or more objects 114 in an object layer 900. For example, the irradiation vectors shown in FIG. 10A may be utilized for a plurality of objects 114 in an object layer 900, such as all of the objects 114 in the object layer 900 shown in FIG. 9A or FIG. 9B. Additionally, or in the alternative, such exemplary irradiation vectors may be utilized in any combination for a plurality of objects in an object layer 900. For example, the irradiation vectors shown in FIG. 10A may be utilized for a first plurality of objects 114 in an object layer 900, and the irradiation vectors shown in FIG. 10B may be utilized for a second plurality of objects 114 in the object layer 900, such as for a first and second plurality of objects 114 in the object layer 900 shown in FIG. 9A or FIG. 9B. The irradiation vectors shown in FIGS. 10C-10H may similarly be utilized individually or in combination with any of the irradiation vectors shown in FIGS. 10A-10H.

Figure 10A:
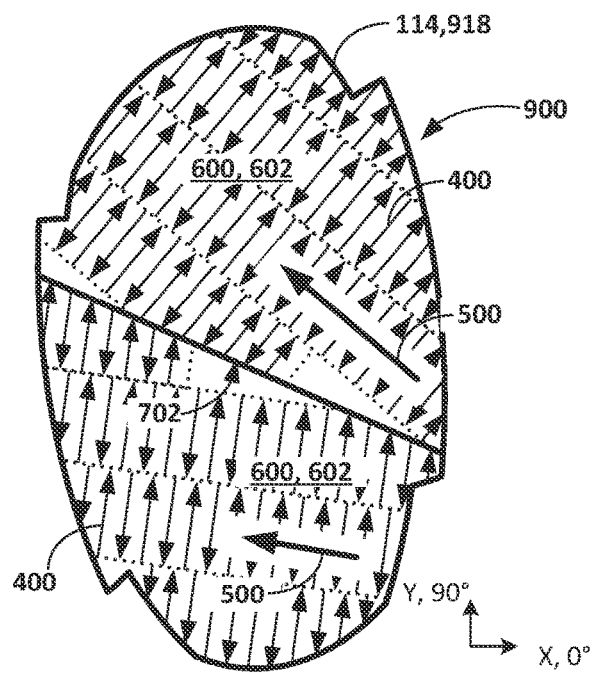
FIGS. 10A-10H schematically depict exemplary irradiation vectors corresponding to respective objects in an object layer.
Figure 10B:
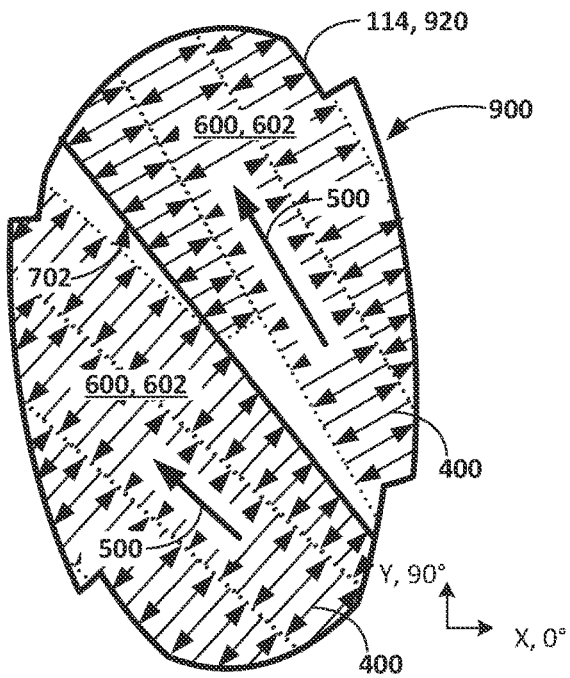

FIGS. 10A and 10B respectively show an object 114 from an object layer 900 that includes a radial boundary 702 intersecting the respective object 114. The object 114 shown in FIG. 10A may correspond to a seventh object 918 shown in FIG. 9B. The object 114 shown in FIG. 10B may correspond to an eighth object 920 shown in FIG. 9B. As shown in FIGS. 10A and 10B, with reference to FIG. 9B, in some embodiments, an object 114 may be irradiated according to a hatching vector 500 oriented substantially radially relative to a normal point 206. The substantially radial orientation of the hatching vectors 500 shown in FIGS. 10A and 10B are illustrated by the hatching vectors 500 and the radial boundaries 702 respectively aligned with radial lines that intersect at a point, such as at the normal point 206.

As shown in FIGS. 10A and 10B, an object 114 from an object layer 900 may include a first portion and a second portion separated by a radial boundary 702. A first hatching vector 500 traversing a first portion of the object 114 may have a first orientation, such as a first directional component and/or magnitude component. For example, the first hatching vector 500 traversing the first portion of the object 114 may have a first slope. A second hatching vector 500 traversing a second portion of the object 114 may have a second orientation, such as a second directional component and/or magnitude component. For example, the second hatching vector 500 traversing the second portion of the object 114 may have a second slope. The orientation of the first hatching vector 500 traversing the first portion of the object 114 may differ from the orientation of the second hatching vector 500 traversing the second portion of the object 114. For example, the first hatching vector 500 and/or the second hatching vector 500 may differ in respect of a directional component, a magnitude component, and/or slope.

Figure 10C:
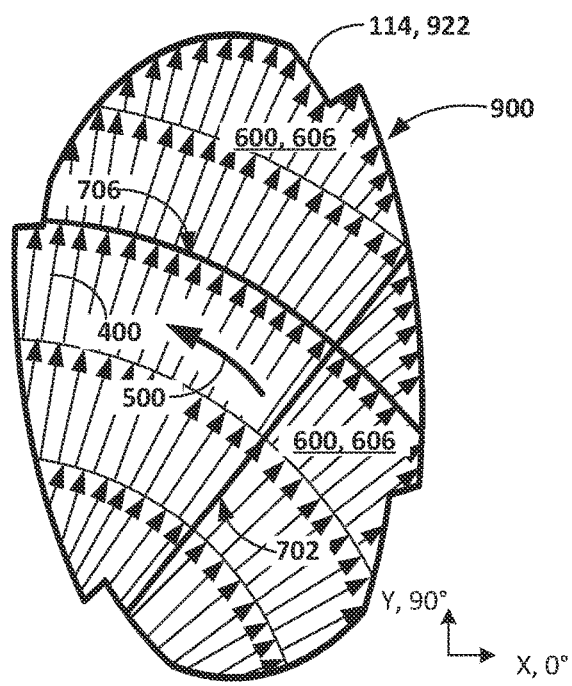
Figure 10D:
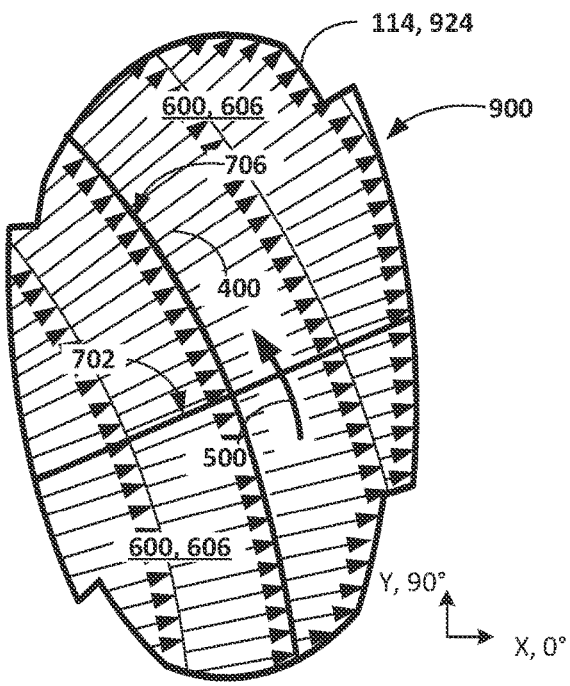

FIGS. 10C and 10D respectively show an object 114 from an object layer 900 that includes a semi-annular boundary 706 intersecting the respective object 114. An object 114 from an object layer 900 may additionally or alternatively include an annular boundary 704. The object 114 shown in FIG. 10C may correspond to a ninth object 922 shown in FIG. 9B. The object 114 shown in FIG. 10D may correspond to a tenth object 924 shown in FIG. 9B. As shown in FIGS. 10C and 10D, with reference to FIG. 9B, in some embodiments, an object 114 may be irradiated according to a hatching vector 500 oriented substantially annularly or semi-annularly relative to a normal point 206. For example, a hatching vector 500 may traverse an arc length relative to the normal point. The substantially annular or semi-annular orientation of the hatching vectors 500 shown in FIGS. 10A and 10B are illustrated by the respective hatching vectors 500 oriented co-annularly with the respective semi-annular boundaries 706. The semi-annular boundaries 706 and the hatching vectors 500 may additionally or alternatively be oriented co-annularly relative to a point, such as the normal point 206.

As shown in FIGS. 10C and 10D, an object 114 from an object layer 900 may include a first portion and a second portion separated by a semi-annular boundary 706. A first hatching vector 500 traversing a first portion of the object 114 may have a first orientation, such as a first directional component and/or magnitude component. For example, the first hatching vector 500 traversing the first portion of the object 114 may have a first slope and/or radius of curvature. A second hatching vector 500 traversing a second portion of the object 114 may have a second orientation, such as a second directional component and/or magnitude component. For example, the second hatching vector 500 traversing the second portion of the object 114 may have a second slope and/or radius of curvature. The orientation of the first hatching vector 500 traversing the first portion of the object 114 may differ from the orientation of the second hatching vector 500 traversing the second portion of the object 114. For example, the first hatching vector 500 and/or the second hatching vector 500 may differ in respect of a directional component, a magnitude component, radius of curvature, and/or slope.

Referring again to FIGS. 10A and 10B, and still referring to FIGS. 10C and 10D, in some embodiments, respective objects 114 in an object layer 900 may be irradiated according to respective hatching vectors 500 that have an orientation that differs as between respective objects 114. For example, at least a portion of a first object 114, such as the object 114 shown in FIG. 10A, may be irradiated according to a first hatching vector 500 that has a first orientation, such as a first directional component and/or magnitude component. For example, the first hatching vector 500 traversing the at least a portion of the first object 114 may have a first slope and/or radius of curvature. At least a portion of a second object 114, such as the object 114 shown in FIG. 10B, may be irradiated according to a second hatching vector 500 that has a second orientation, such as a second directional component and/or magnitude component. For example, the second hatching vector 500 traversing the at least a portion of the second object 114 may have a second slope and/or radius of curvature. The orientation of the first hatching vector 500 traversing the at least a portion of the first object 114 may differ from the orientation of the second hatching vector 500 traversing the at least a portion of the second object 114. For example, the first hatching vector 500 and/or the second hatching vector 500 may differ in respect of a directional component, a magnitude component, and/or slope. In some embodiments, at least a portion of a first object may be irradiated according to a hatching vector 500 oriented substantially radially relative to a normal point 206 (FIGS. 10A and 10B), and at least a portion of a second object may be irradiated according to a hatching vector 500 oriented substantially annularly or semi-annularly relative to a normal point 206 (FIGS. 10C and 10D).

Referring now to FIGS. 10E-10H, further exemplary slices of an objects 114 from an object layer 900 are shown. The object 114 shown in FIG. 10E may correspond to an eleventh object 926 shown in FIG. 9B. The object 114 shown in FIG. 10F may correspond to a twelfth object 928 shown in FIG. 9B. The object 114 shown in FIG. 10G may correspond to an thirteenth object 930 shown in FIG. 9B. The object 114 shown in FIG. 10H may correspond to a fourteenth object 932 shown in FIG. 9B. As shown in FIGS. 10E-10H, with reference to FIG. 9B, in some embodiments, an object 114 may be irradiated according to a plurality of hatching vector 500 oriented substantially parallel to one another. For example, the plurality of hatching vectors 500 corresponding to a respective object 114 may be oriented substantially parallel to an orientation line 1000 intersecting the respective object 114. In some embodiments, the orientation line 1000 may correspond to a radial boundary 702. The substantially parallel hatching vectors 500 corresponding to a respective object 114 may include one or more hatching vector 500 adjacent to the orientation line 1000 and/or one or more hatching vectors adjacent to the orientation line 1000. The substantially parallel orientation of the hatching vectors 500 shown in FIGS. 10E-10H are illustrated by the hatching vectors 500 being oriented substantially parallel to an orientation line 1000 intersecting the respective object 114.

As shown in FIGS. 10E-10H, an object 114 from an object layer 900 may include a first portion and a second portion intersected by an orientation line 1000, such as a radial boundary 702. The orientation line 1000 corresponding to an object may be determined based at least in part on a radial line that intersects a midward portion of the object. The orientation line may extend from a point, such as the normal point 206. The orientation line 1000 may be used to determine all or a portion of the hatching vectors 500 corresponding to an object 114 from an object layer 900. In some embodiments, the orientation line 1000 may differs as between respective ones of a plurality of objects 114 from an object layer 900. Respective objects 114 in an object layer 900 may be irradiated according to a respective plurality of hatching vectors 500 that have an orientation that differs as between respective objects 114. For example, the hatching vectors 500 corresponding to a respective object 114 may have an orientation that is parallel to an orientation line 1000 that differs as between respective objects 114.

Figure 10E:
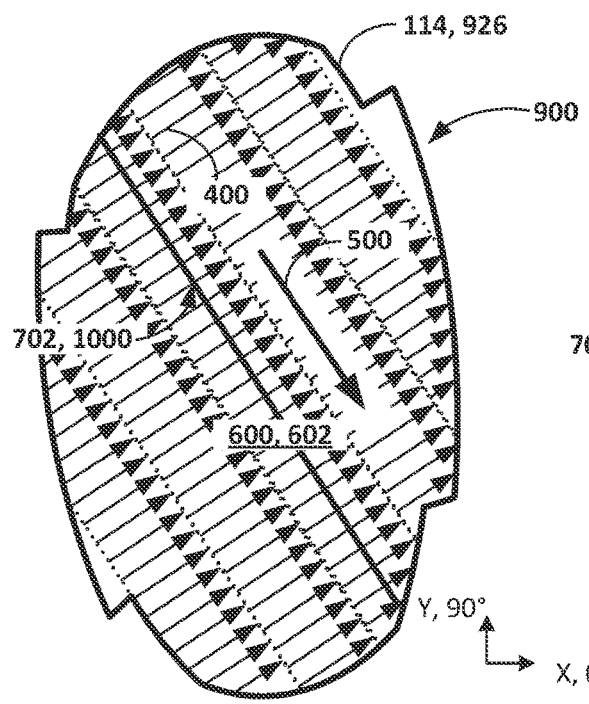

By way of example, at least a portion of a first object 114, such as the object 114 shown in FIG. 10E, may be irradiated according to a first hatching vector 500 that has a first orientation, such as a first directional component and/or magnitude component. The first hatching vector 500 traversing the at least a portion of the first object 114 may be parallel to a first orientation line 1000. At least a portion of a second object 114, such as the object 114 shown in FIG. 10F, may be irradiated according to a second hatching vector 500 that has a second orientation, such as a second directional component and/or magnitude component. The second hatching vector 500 traversing the at least a portion of the second object 114 may be parallel to a second orientation line 1000. The orientation of the first hatching vector 500 traversing the at least a portion of the first object 114 may differ from the orientation of the second hatching vector 500 traversing the at least a portion of the second object 114. For example, the first hatching vector 500 and/or the second hatching vector 500 may differ in respect of a directional component, a magnitude component, and/or slope.

Figure 10F:
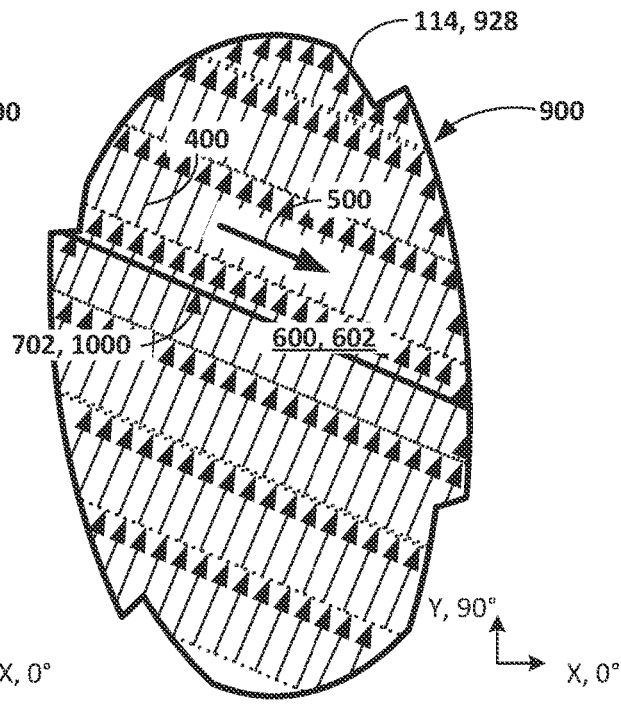

Referring to FIGS. 10E and 10F, in some embodiments, the scanning vectors 400 respectively defining a hatching vector 500 may be oriented in a common direction. For example, the scanning vectors 400 may be oriented away from the normal point 206, such as with at least one directional component oriented away from the normal point 206. Additionally, or in the alternative, the scanning vectors 400 that respectively define a hatching vector 500 may be oriented counter-current to a gas flow direction 800, such as with at least one directional component oriented counter-current to the gas flow direction 800. The hatching vector 500 defined by the scanning vectors 400 may, additionally or alternatively, be oriented away from the normal point 206, such as with at least one directional component oriented away from the normal point 206. In some embodiments, both the scanning vectors 400 that respectively define a hatching vector 500 and the hatching vector 500 defined by such scanning vectors 400 may be oriented away from the normal point 206, such as with at least one respective directional component oriented away from the normal point 206.

Figure 10G:
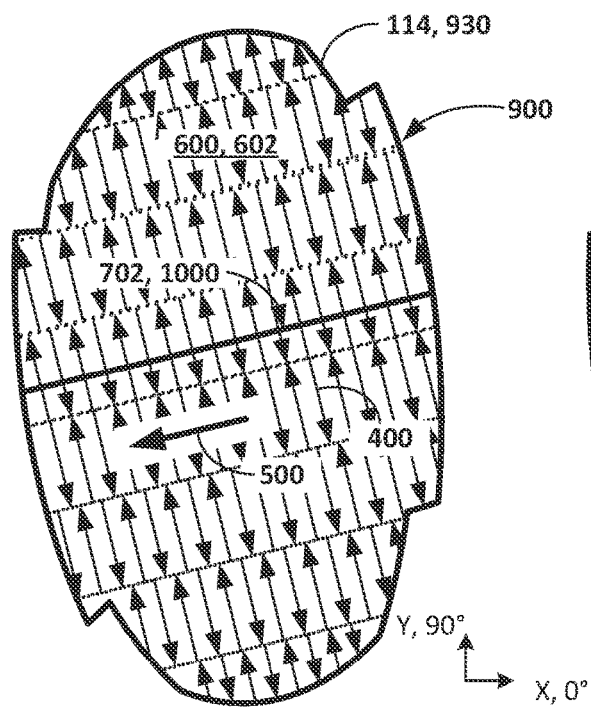
Figure 10H:
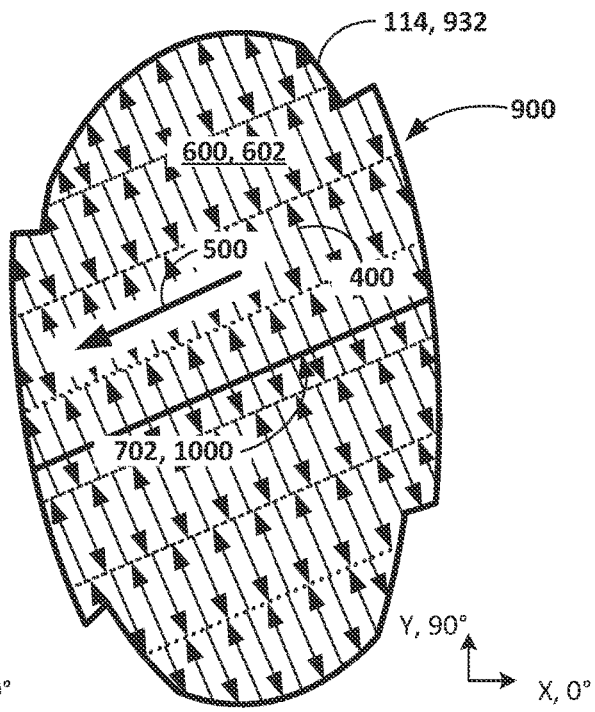

Referring to FIGS. 10G and 10H, in some embodiments, the scanning vectors 400 respectively defining a hatching vector 500 may be oriented in alternating directions. With the scanning vectors 400 oriented in alternating directions, in some embodiments, the scanning vectors 400 oriented in one or both of the alternating directions may be oriented away from the normal point 206, such as with at least one directional component oriented away from the normal point 206. Additionally, or in the alternative, with the scanning vectors 400 oriented in alternating directions, in some embodiments, the scanning vectors 400 oriented in one or both of the alternating directions may be oriented counter-current to a gas flow direction 800, such as with at least one directional component oriented counter-current to the gas flow direction 800. A hatching vector 500 defined by the respective scanning vectors 400 may, additionally or alternatively, be oriented away from the normal point 206, such as with at least one directional component oriented away from the normal point 206. In some embodiments, with the scanning vectors 400 oriented in alternating directions, both the scanning vectors 400 that respectively define a hatching vector 500 and the hatching vector 500 defined by such scanning vectors 400 may be oriented away from the normal point 206, such as with at least one respective directional component oriented away from the normal point 206.

Figure 11:
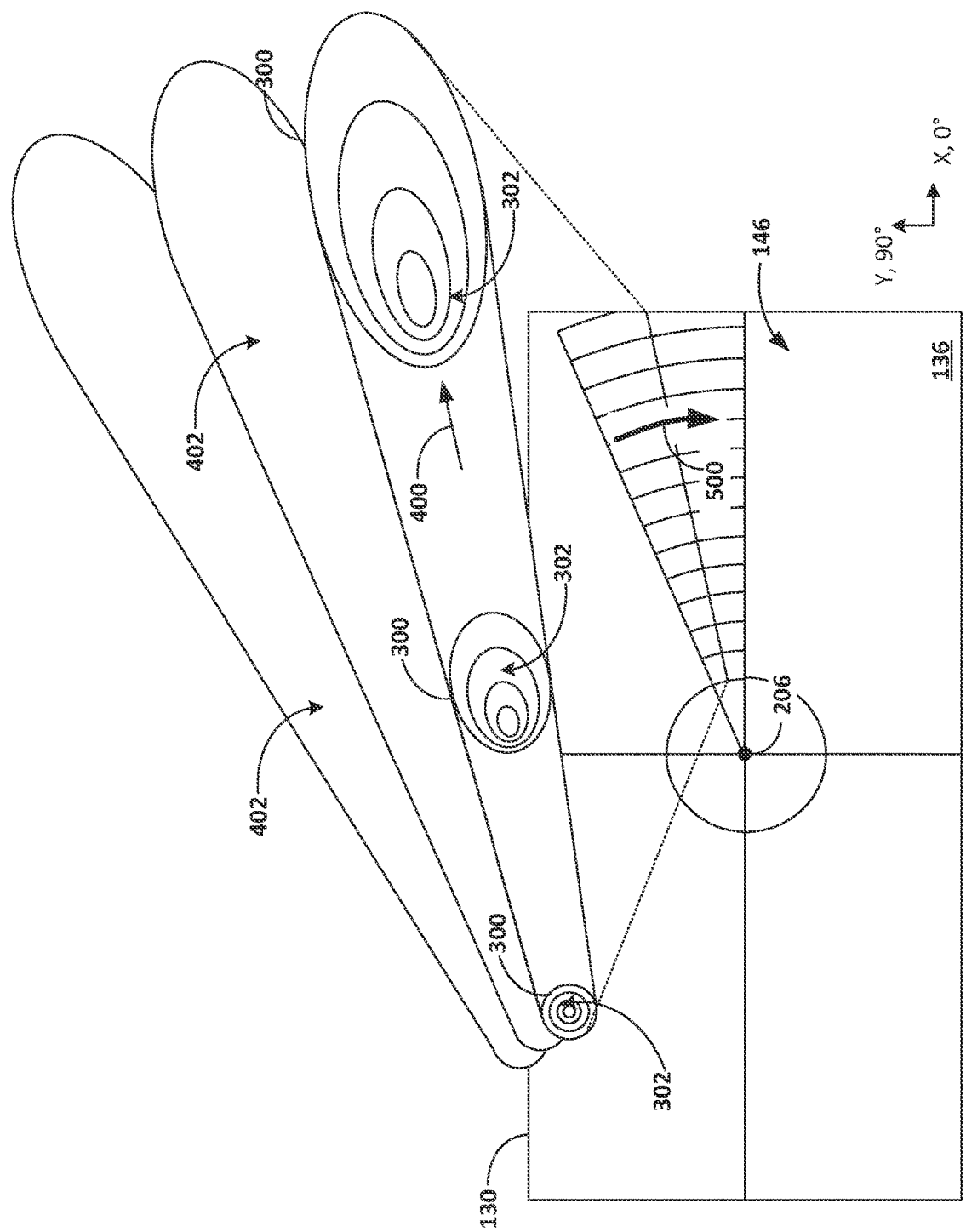
FIG. 11 schematically depicts irradiation vectors corresponding to a beam spot with increasing size and/or ellipticity with increasing distance from a normal point on the build plane.

Now referring to FIG. 11, in some embodiments, a beam spot 300 may increase in size and/or ellipticity with increasing distance from the normal point 206. In some embodiments, a plurality of scanning vectors 400 may be oriented radially relative to a point, such as a normal point 206. The plurality of scanning vectors 400 may define a hatching vector 500 oriented substantially annularly or semi-annularly relative to a point, such as the normal point 206. A plurality of beam paths 402 may be irradiated according to the scanning vectors 400. The orientation of the scanning vectors 400 and corresponding position of the beam paths 402 may be determined based at least in part on a size and/or ellipticity of the beam spot 300 at one or more locations along the beam path 402, such as a size and/or ellipticity of the beam spot 300 at a radially inward location along the beam path 402, a size and/or ellipticity of the beam spot 300 at a radially outward location along the beam path 402, and/or a difference between a size and/or ellipticity of the beam spot 300 at a radially inward location and a radially outward location along the beam path 402. For example, a directional component and/or a magnitude component of a plurality of scanning vectors 400 may be determined based at least in part on such size and/or ellipticity of a beam spot 300 and/or such difference in size and/or ellipticity of a beam spot 300.

In some embodiments, a hatching vector 500 defined by a plurality of radially oriented scanning vectors 400 may have an orientation determined based at least in part on a size and/or ellipticity of the beam spot 300 corresponding to one or more of the plurality of scanning vectors 400 at one or more locations along the corresponding beam path 402, such as a size and/or ellipticity of the beam spot 300 at a radially inward location along the beam path 402, a size and/or ellipticity of the beam spot 300 at a radially outward location along the beam path 402, and/or a difference between a size and/or ellipticity of the beam spot 300 at a radially inward location and a radially outward location along the beam path 402. For example, a hatching vector 500 may have at least one directional component and/or at least one magnitude component determined based at least in part on such size and/or ellipticity of a beam spot 300 and/or such difference in size and/or ellipticity of a beam spot 300. Additionally, or in the alternative, a hatching vector 500 may have a radius of curvature determined based at least in part on such size and/or ellipticity of a beam spot 300 and/or such difference in size and/or ellipticity of a beam spot 300.

Referring still to FIGS. 6-11, in some embodiments, one or more irradiation parameters may be determined based at least in part on a scanning segment 600 and/or an irradiation vector corresponding to such scanning segments. For example, one or more irradiation parameters may be determined based at least in part on a location, configuration, and/or orientation of a scanning segment 600. Additionally, or in the alternative, one or more irradiation parameters may be determined based at least in part on an orientation of an irradiation vector, such as a scanning vector 400, a hatching vector 500, and/or a contour vector 550. For example, one or more irradiation parameters may be determined based at least in part on a directional component and/or a magnitude component of an irrational vector (e.g., a scanning vector 400, a hatching vector 500, and/or a contour vector 550). Further additionally or in the alternative, one or more scanning segments 600 and/or one or more irradiation vectors (e.g., a scanning vector 400, a hatching vector 500, and/or a contour vector 550) may be determined based at least in part on one or more irradiation parameters. For example, one or more scanning segments 600 may be determined based at least in part on one or more beam parameters and/or one or more scanning parameters. Additionally, or in the alternative, one or more irradiation vectors may be determined based at least in part on one or more beam parameters and/or one or more scanning parameters. The one or more irradiation parameters, scanning segments, and/or irradiation vectors may be determined using a control system 104.

Now turning to FIG. 12, and exemplary control system 104 will be described. In some embodiments, a control system 104 may be configured to output one or more control commands associated with an additive manufacturing machine 102. The control commands may include irradiation control commands. An irradiation control command may be configured to control one or more irradiation parameters, including one or more beam parameters and/or one or more scanning parameters. The one or more irradiation parameters may be controlled, for example, based at least in part on one or more model inputs. The irradiation control commands may be configured to impart a desired melting and/or sintering behavior. In some embodiments, the irradiation control commands may be based, at least in part, a location on the build plane 130 where an object 114 or a portion of the object 114 is located, on angle of incidence $\theta_i$ of the energy beam 200, and/or on an elliptical angle $\theta_e$ of the beam spot 300, and/or based at least in part on a relationship between melting and/or sintering behavior and location on the build plane 130, angle of incidence $\theta_i$ of the energy beam 200, and/or elliptical angle $\theta_e$ of the beam spot 300.

Figure 12:
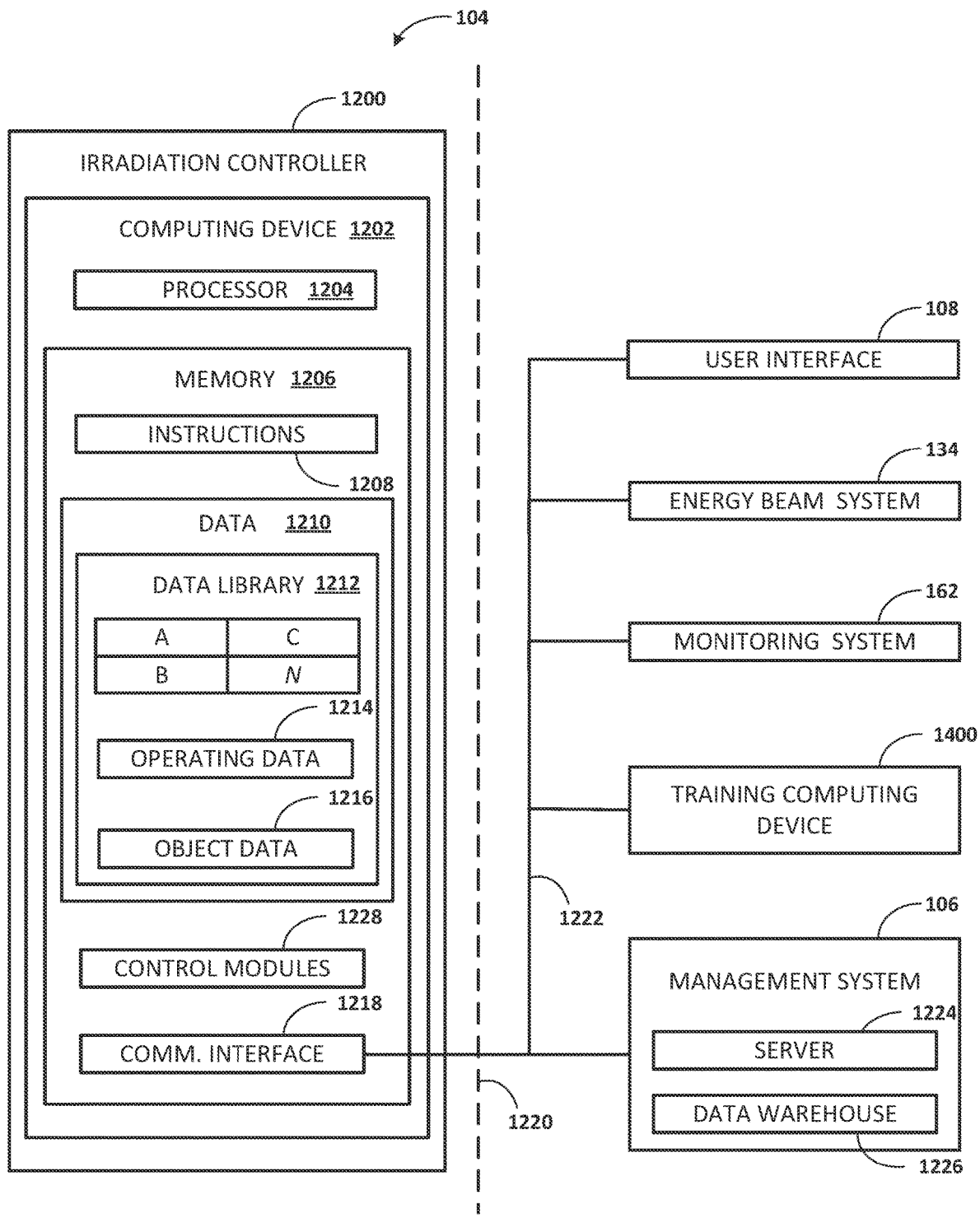
FIG. 12 schematically depicts an exemplary control system that includes an irradiation controller configured to control one or more irradiation parameters.

As shown in FIG. 12, an exemplary control system 104 includes an irradiation controller 1200 configured to control one or more irradiation parameters associated with an additive manufacturing machine 102. An irradiation controller 1200 may be communicatively coupled with an additive manufacturing machine 102. In some embodiments, the irradiation controller 1200 may be communicatively coupled with one or more components of an additive manufacturing machine 102, such as an energy beam system 134 and/or a monitoring system 162. The irradiation controller 1200 may also be communicatively coupled with a management system 106 and/or a user interface 108.

The irradiation controller 1200 may include one or more computing devices 1202, which may be located locally or remotely relative to the additive manufacturing machine 102 and/or a calibration system 250. The one or more computing devices 1202 may include one or more processors 1204 and one or more memory devices 1206. The one or more processors 1204 may include any suitable processing device, such as a microprocessor, microcontroller, integrated circuit, logic device, and/or other suitable processing device. The one or more memory devices 1206 may include one or more computer-readable media, including but not limited to non-transitory computer-readable media, RAM, ROM, hard drives, flash drives, and/or other memory devices 1206.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 1206 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 1206 may store information accessible by the one or more processors 1204, including machine-executable instructions 1208 that can be executed by the one or more processors 1204. The instructions 1208 may include any set of instructions which when executed by the one or more processors 1204 cause the one or more processors 1204 to perform operations, including additive manufacturing operations, such as controlling and/or monitoring build operations. In some embodiments, the instructions 1208 may be configured to cause the one or more processors 1204 to perform operations for which the irradiation controller 1200 and/or the one or more computing devices 1202 are configured, such as controlling and/or monitoring additive manufacturing operations.

The memory devices 1206 may store data 1210 accessible by the one or more processors 1204. The data 1210 can include current or real-time data 1210, past data 1210, or a combination thereof. The data 1210 may be stored in a data library 1212. As examples, the data 1210 may include data 1210 associated with or generated by an additive manufacturing system 100 and/or an additive manufacturing machine 102, including data 1210 associated with or generated by an irradiation controller 1200, an additive manufacturing machine 102, an energy beam system 134, a monitoring system 162, a management system 106, a user interface 108, and/or a computing device 1202. Such data 1210 may include operating data 1214 and/or object data 1216. Such operating data 1214 may include data 1210 associated with operating an additive manufacturing machine 102, such as control commands for operating an additive manufacturing machine 102, including model inputs and/or irradiation control commands for an energy beam system 134, and so forth. Such object data 1216 may include data 1210 associated with an object or objects 114 to be additively manufactured, such as build files, object slice data, and so forth. The data 1210 may also include other data sets, parameters, outputs, information, associated with an additive manufacturing system 100 and/or an additive manufacturing machine 102.

The one or more computing devices 1202 may also include a communication interface 1218, which may be used for communications with a communication network 1220 via wired or wireless communication lines 1222. The communication interface 1218 may include any suitable components for interfacing with one or more network(s), including for example, transmitters, receivers, ports, controllers, antennas, and/or other suitable components. The communication interface 1218 may allow the computing device 1202 to communicate with various nodes on the communication network 1220, such as nodes associated with the additive manufacturing machine 102, the energy beam system 134, the monitoring system 162, the management system 106, and/or a user interface 108. The communication network 1220 may include, for example, a local area network (LAN), a wide area network (WAN), SATCOM network, VHF network, a HF network, a Wi-Fi network, a WiMAX network, a gatelink network, and/or any other suitable communication network 1220 for transmitting messages to and/or from the irradiation controller 1200 across the communication lines 1222. The communication lines 1222 of communication network 1220 may include a data bus or a combination of wired and/or wireless communication links.

The communication interface 1218 may allow the computing device 1202 to communicate with various components of an additive manufacturing system 100 and/or an additive manufacturing machine 102 communicatively coupled with the communication interface 1218 and/or communicatively coupled with one another, including the energy beam system 134 and/or the monitoring system 162. The communication interface 1218 may additionally or alternatively allow the computing device 1202 to communicate with the management system 106 and/or the user interface 108. The management system 106 may include a server 1224 and/or a data warehouse 1226. As an example, at least a portion of the data 1210 may be stored in the data warehouse 1226, and the server 1224 may be configured to transmit data 1210 from the data warehouse 1226 to the computing device 1202, and/or to receive data 1210 from the computing device 1202 and to store the received data 1210 in the data warehouse 1226 for further purposes. The server 1224 and/or the data warehouse 1226 may be implemented as part of a control system 104 and/or as part of the management system 106.

The irradiation controller 1200 may include one or more control modules 1228, which may utilize the data 1210, including the data library 1212, and/or other data sets, parameters, outputs, information, associated with the additive manufacturing system 100, such as those associated with the additive manufacturing machine 102, the user interface 108, and/or the management system 106. The one or more control modules 1228 may additionally or alternatively utilize data 210 from the data warehouse 1226, which may be transmitted to the irradiation controller 1200 from the server 1224. The control system 104 may be configured to perform operations such as additive manufacturing calibrations and/or control operations. For example, the control system 104 may include one or more control modules 1228 to perform control operations, such as those presently disclosed herein. In some embodiments, an irradiation controller 1200 may include one or more irradiation parameter control modules. Such an irradiation parameter control module may be configured to determine one or more irradiation control commands, for example, based at least in part on one or more model inputs.

Figure 13A:
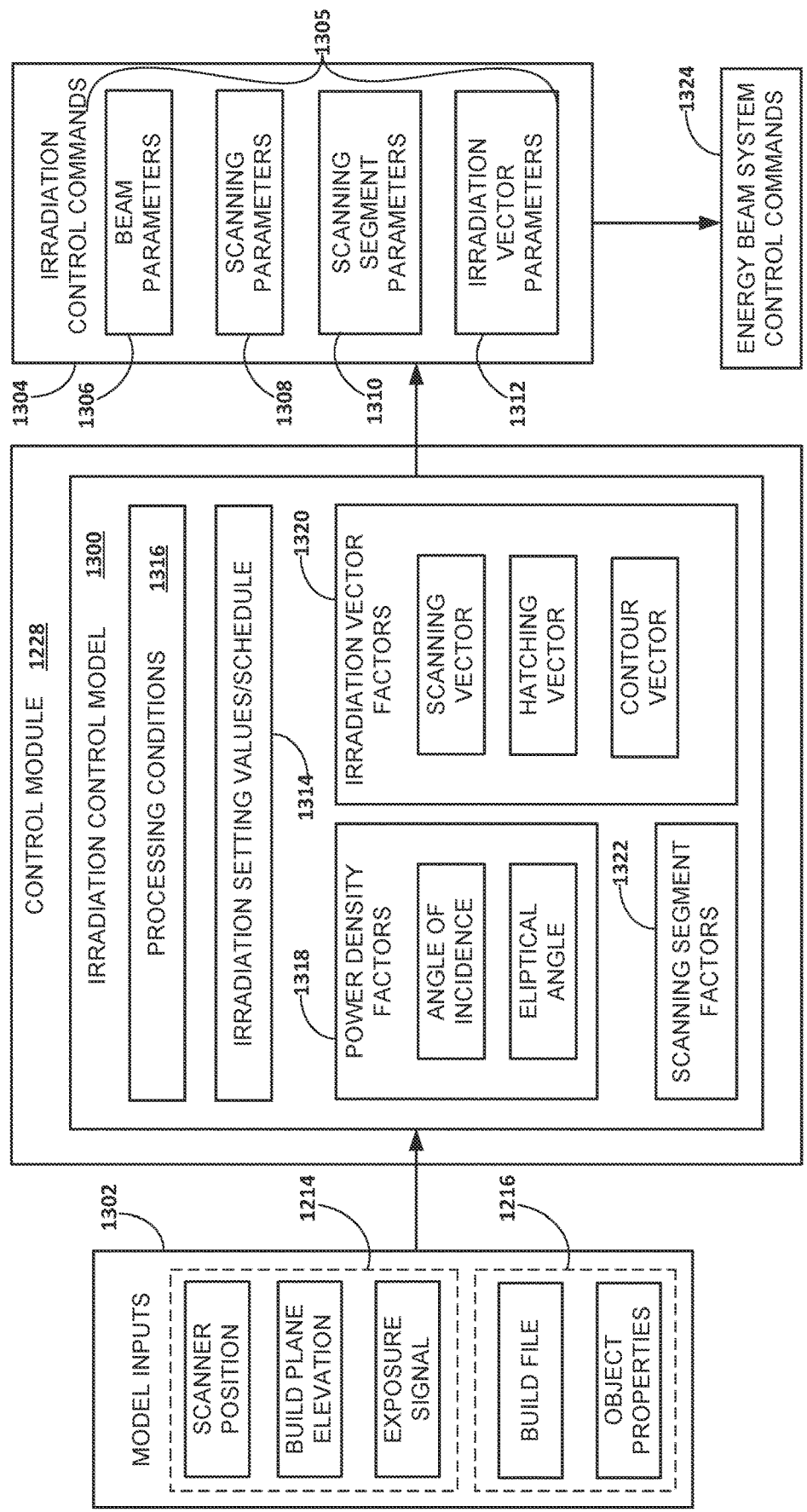
FIGS. 13A and 13B schematically depict exemplary control modules that include an irradiation control model.
Figure 13B:
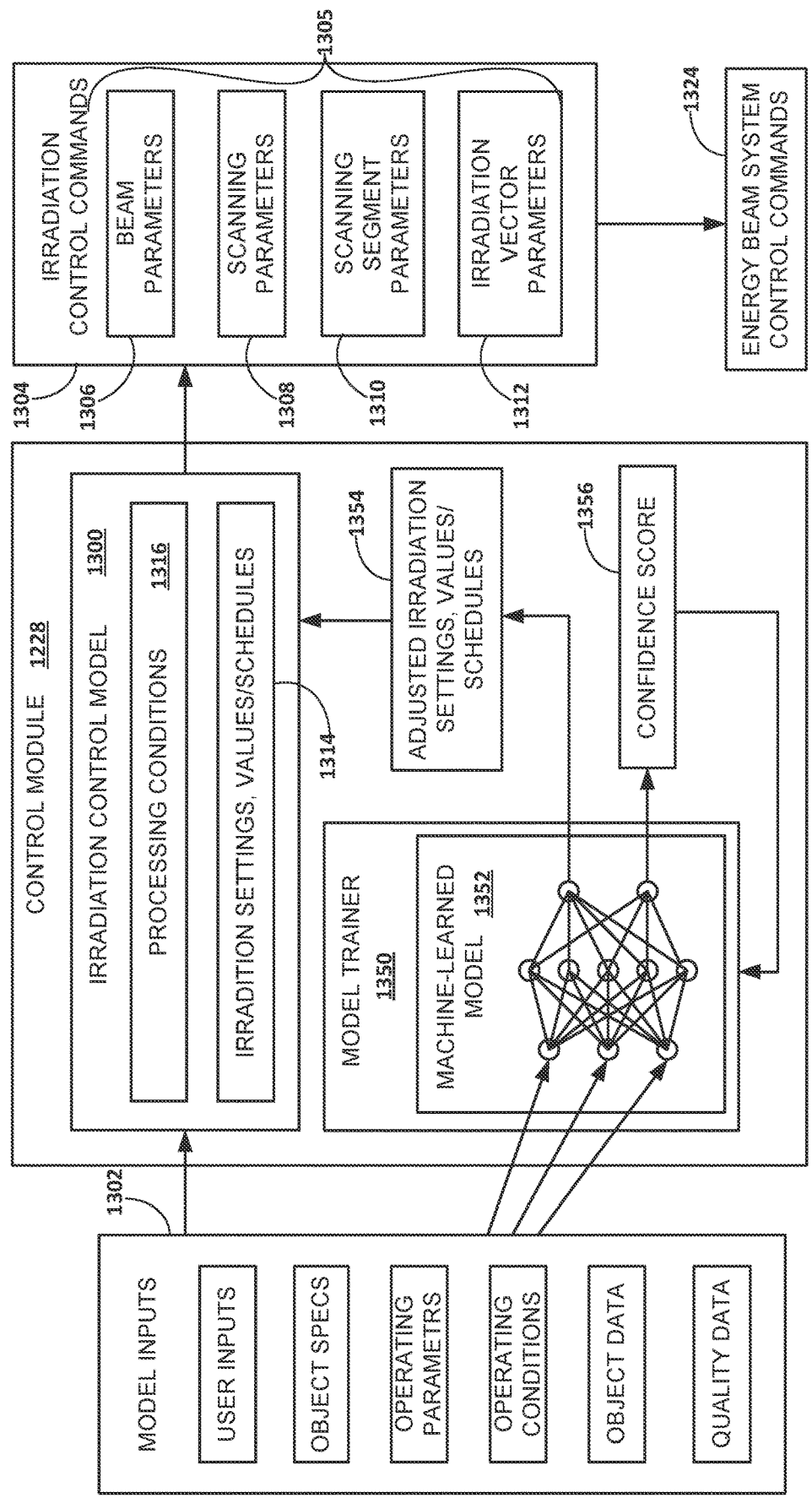

Referring now to FIGS. 13A and 13B, exemplary control modules 1228 will be described. An exemplary control module 1228 may include one or more irradiation control models 1300. The one or more irradiation control models 1300 may be configured to control one or more beam parameters, for example, based at least in part on one or more model inputs 1302 and/or one or more irradiation control commands 1304. The one or more irradiation control commands 1304 may include a command configured to change one or more operating parameters of the additive manufacturing machine 102. As shown, an exemplary irradiation parameter control module 1300 may be configured to receive one or more model inputs 1302. As shown in FIG. 13A, exemplary model inputs 1302 include operating data 1214 and/or object data 1216. One or more irradiation control commands 1304 may be determined based at least in part on an irradiation control model 1300. The one or more irradiation control commands 1304 determined by the irradiation control model 1300 may be based at least in part on one or more model inputs 1302. Exemplary irradiation control commands 1304 may include control commands pertaining to irradiation parameters 1305, including beam parameters 1306 and/or scanning parameters 1308, scanning segments parameters 1310, and/or irradiation vector parameters 1312.

Exemplary beam parameters 1306 include beam power or intensity, spot size, focal point, beam profile (e.g., intensity profile 202, power density profile 404), and so forth. Beam power parameters may include one or more parameters pertaining to a beam generation device of an energy beam system 134, including one or more parameters configured to impart a desired beam power, beam intensity, and so forth. Spot size parameters may include one or more parameters pertaining to one or more optics devices of an energy beam system 134, including one or more parameters configured to impart a desired spot shape, spot cross-section, and so forth. Scan velocity parameters may include one or more parameters pertaining to a scanner device of an energy beam system 134, including one or more parameters pertaining to position, orientation, and/or movement speed configured to impart a desired beam velocity, hatching velocity, contour velocity, and so forth. Focal point parameters may include one or more parameters pertaining to a beam focusing device of an energy beam system 134, including one or more parameters configured to impart a desired focal point, focal point offset, and so forth. Beam profile parameters may include one or more parameters pertaining to a beam generation device and/or an optics device of an energy beam system 134, including one or more parameters configured to impart a desired energy density profile 302 and/or power density profile 404, and so forth.

Exemplary scanning parameters 1308 include beam offset, beam path, scan velocity, and so forth. Beam offset parameters may include one or more parameters pertaining to a scanner device of an energy beam system 134, including one or more parameters pertaining to position, orientation, and/or movement speed configured to impart a desired hatching offset or overlap distance, contour offset or overlap distance, and so forth. Beam path parameters may include one or more parameters pertaining to a scanner device of an energy beam system 134, including one or more parameters pertaining to position and/or orientation configured to impart one or more desired irradiation vectors, such as scanning vectors 400, hatching vectors 500, and/or contour vectors 550, and/or a desired scan length for such scanning vectors 400, a hatch length for such hatching vectors 500, and/or a contour length for such contour vectors 550, and so forth. Scan velocity parameters may include one or more parameters pertaining to a scanner device of an energy beam system 134, including one or more parameters pertaining to movements of a scanner device configured to impart a desired scanning velocity, including a desire magnitude component of one or more irradiation vectors, such as a magnitude component for one or more scanning vectors 400, one or more hatching vectors 500, and/or one or more contour vectors 550.

Exemplary scanning segment parameters 1310 may include parameters pertaining to determining a configuration, orientation, size, shape, and/or location of one or more scanning segments 600, such as a configuration, orientation, size, shape, and/or location of one or more radial segments 602, annular segments 604, and/or semi-annular segments 606. Scanning segment parameters 1310 may include one or more parameters pertaining to determining a configuration, orientation, size, shape, and/or location of one or more scanning segments 600, such as based at least in part on object data 1216 such as a CAD file for an object 114 to be additively manufactured and/or a build file or object properties corresponding to and/or determined using the object data 1216. Scanning segment parameters 1310 may include parameters pertaining to dividing a build plane 130 into a plurality of scanning segments 600 and/or dividing one or more object 114 from an object layer 900 into a plurality of scanning segments 600. In some embodiments, one or more scanning segment parameters 1310 may be utilized to determine one or more beam parameters 1306 and/or one or more scanning parameters 1308. For example, one or more scanning segment parameters 1310 may be configured to provide a desired melting and/or sintering behavior resulting from an energy beam 200 scanning across the powder bed 136 in accordance with one or more scanning segments 600, and/or beam parameters 1306 and/or scanning parameters 1308 corresponding thereto, determined based at least in part on the one or more scanning segment parameters 1310.

Exemplary irradiation vector parameters 1312 may include parameters pertaining to determining an orientation of one or more irradiation vectors, such as an orientation of scanning vectors 400, hatching vectors 500, and/or contour vectors 550. Irradiation vector parameters 1312 may include parameters pertaining to determining a directional component and/or a magnitude component of one or more irradiation vectors. For example, one or more irradiation vector parameters 1312 may be based at least in part on object data 1216 such as a CAD file for an object 114 to be additively manufactured and/or a build file or object properties corresponding to and/or determined using the object data 1216. Irradiation vector parameters 1312 may include parameters pertaining to determining one or more irradiation vectors (e.g., one or more scanning vectors 400, hatching vectors 500, and/or contour vectors 550) corresponding to one or more locations on a build plane 130. Additionally, or in the alternative, irradiation vector parameters 1312 may include parameters pertaining to determining one or more irradiation vectors corresponding to one or more object layers 900, one or more objects 114 from an object layer 900, and/or one or more scanning segments 600 corresponding to such objects 114. In some embodiments, one or more irradiation vector parameters 1312 may be utilized to determine one or more beam parameters 1306 and/or one or more scanning parameters 1308. For example, one or more irradiation vector parameters 1312 may be configured to provide a desired melting and/or sintering behavior resulting from an energy beam 200 scanning across the powder bed 136 in accordance with one or more irradiation vectors (e.g., one or more scanning vectors 400, hatching vectors 500, and/or contour vectors 550), and/or beam parameters 1306 and/or scanning parameters 1308 corresponding thereto, determined based at least in part on the one or more irradiation vector parameters 1312.

Any number of model inputs 1302 may be used by an irradiation control model 1300, including current or real-time data 1210, past data 1210, or a combination thereof. The one or more model inputs 1302 may include data 1210 associated with or generated by an additive manufacturing system 100, including data 1210 associated with or generated by an additive manufacturing machine 102 and/or an additive manufacturing machine 102. Such data 1210 associated with an additive manufacturing system 100 may additionally or alternatively including data 1210 associated with or generated by a control system 104, a computing device 1202, and/or an irradiation control model 1300. The model inputs 1302 may include data 1210 associated with, comprising, or generated by a control system 104, data 1210 associated with, comprising, or generated by a computing device 1202, and/or data 1210 associated with, comprising, or generated by an irradiation control model 1300. As shown in FIG. 13A, exemplary model inputs 1302 may include scanner position, build plane elevation, and/or a beam exposure signal (e.g., whether the energy beam generation device is currently emitting an energy beam). As shown in FIG. 13B, exemplary model inputs 1302 may additionally or alternatively include user inputs; object specifications (e.g., quality specifications, material specifications, composition specifications, etc.); operating data 1214 including, for example, operating parameters (e.g., additive manufacturing machine parameters, etc.) and/or operating conditions (e.g., temperatures, gas flow parameters, etc.); object data 1216 (e.g., data pertaining to a data file or build file for an object 114 that has been additively manufactured or partially additively manufactured); and/or quality data (e.g., measured and/or calculated martial properties of an object 114, melt-pool monitoring parameters, etc.). The model inputs 1302 may themselves be regarded as data 1210, which may be stored in the data library 1212 and/or the data warehouse 1226, and which may be included in subsequent model inputs 1302. The model inputs 1302 may additionally include other data sets, parameters, outputs, information, etc. shown and/or described herein.

The irradiation control commands 1304 may be configured to adjust an irradiation parameter 1305 according to one or more irradiation settings 1314. A determined irradiation setting 1314 may include one or more values, including a current or real-time value, an average, a maximum, a minimum, and/or a range. The determined irradiation setting 1314 may additional include one or more statistical parameters, such as a distribution value (e.g., a variance, a standard deviation) and/or a regression coefficient value. The values and/or schedules for the one or more irradiation settings 1314 may be derived or determined from one or more model inputs 1302 and/or from the irradiation control model 1300.

An irradiation control model 1300 may be configured to determine whether an irradiation parameter 1305 (e.g., a beam parameter 1306, a scanning parameter 1308, a scanning segment parameter 1310, and/or an irradiation vector parameter 1312) differs from one or more irradiation settings 1314, such as by at least a threshold level. When the irradiation parameter 1305 differs from an irradiation settings 1314, such as by at least a threshold level, the irradiation control model 1300 may determine an irradiation control command 1304 configured to adjust the irradiation parameter 1305 towards the irradiation setting 1314. In some embodiments, an irradiation control model 1300 may perform a compare operation. The compare operation may include one or more operations configured to compare the determined irradiation parameters 1305 (e.g., beam parameters 1306, scanning parameters 1308, scanning segment parameters 1310, and/or irradiation vector parameters 1312) to one or more irradiation settings 1314. The compare operation may include a PID controller or any other suitable controller. The compare operation may utilize linear or non-linear control algorithms, and any analytical technique including frequency domain and/or time-domain state space representation techniques. Additionally, or in the alternative, when the irradiation parameter 1305 differs from an irradiation settings 1314, such as by at least a threshold level, the irradiation control model 1300 may determine an irradiation control command 1304 configured to adjust one or more scanning segment parameters 1310 and/or one or more irradiation vector parameters 1312. Such adjustment to the one or more scanning segment parameters 1310 and/or one or more irradiation vector parameters 1312 may be configured to impart a change to one or more irradiation parameters 1305 (e.g., one or more beam parameters 1306, one or more scanning parameters 1308, one or more scanning segment parameters 1310, and/or one or more irradiation vector parameters 1312), for example, to reduce a difference between such one or more irradiation parameters and a corresponding one or more irradiation settings 1314.

In some embodiments, one or more irradiation control commands 1304 may be determined prior to irradiating a layer of the powder bed 136. For example, beam parameters 1306 may be determined prior to commencing additively manufacturing an object 114, and/or prior to irradiating a particular layer of the object 114. Additionally, or in the alternative, one or more irradiation control commands 1304 may be determined in real-time, such as while an energy beam 200 is irradiating a respective layer of an object. Such irradiation control commands 1304 determined in real-time may be based at least in part on one or more model inputs 1302 determined during a time when the energy beam is irradiating a respective layer of an object. Additionally, or in the alternative, such irradiation control commands 1304 may be carried out, such as by an energy beam system 134, during a time when the energy beam is irradiating the respective layer of the object. For example, an irradiation control command 1304 may be determined based at least in part on one or more model inputs 1302 determined during a time when the energy beam is irradiating a respective layer of an object, and carried out during such time when the energy beam is irradiating the respective layer of the object.

Exemplary irradiation control commands 1304 that may be determined prior to irradiating a layer of the powder bed 136 and/or prior to commencing additively manufacturing an object 114 include irradiation control commands 1304 pertaining to scanning parameters 1308, such as irradiation control commands 1304 pertaining to beam offset parameters, beam path parameters, or scan velocity parameters, as well as combinations of these. Additionally, or in the alternative, exemplary irradiation control commands 1304 that may be determined prior to irradiating a layer of a powder bed 136 and/or prior to commencing additively manufacturing an object 114 include scanning segment parameters 1310 and/or irradiation vector parameters 1312. In some embodiments, however, irradiation control commands 1304 for any one or more scanning parameters 1308, scanning segment parameters 1310, and/or irradiation vector parameters 1312, may be determined in real-time, such as in addition or as an alternative to determining such scanning parameters 1308, scanning segment parameters 1310, and/or irradiation vector parameters 1312, in advance.

Exemplary irradiation control commands 1304 that may be determined in real-time include irradiation control commands 1304 pertaining to beam parameters 1306, such as irradiation control commands 1304 pertaining to beam power parameters, spot size parameters, focal point parameters, beam profile parameters, as well as combinations of these. In some embodiments, however, irradiation control commands 1304 for any one or more beam parameters 1306 may be determined prior to irradiating a layer of the powder bed 136 and/or prior to commencing additively manufacturing an object 114, such as in addition or as an alternative to determining such scanning parameters 1308 in real-time.

In some embodiments, an irradiation control model 1300 may utilize one or more processing conditions 1316. Exemplary processing conditions 1316 may include data 1210 associated with or comprising one or more operating modes of an additive manufacturing machine 102, as well as sensed, measured, calculated, or predicted conditions internal or external to the additive manufacturing machine 102 which may affect the operation thereof. Such internal conditions include temperatures, pressures, heat transfer rates, gas flow rates, vibration levels, powder types, and so forth. Such external conditions include ambient temperature, pressure, humidity, and so forth. An irradiation control model 1300 may additionally or alternatively include one or more irradiation settings 1314, which may include setting values and/or setting schedules for one or more irradiation parameters 1305, such as beam parameters 1306, scanning parameters 1308, scanning segment parameters 1310, and/or irradiation vector parameters 1312.

Referring to FIG. 13A, in some embodiments, an exemplary control module 1228 may include an irradiation control model 1300 that includes one or more power density factors 1318, one or more irradiation vector factors 1320, and/or one or more scanning segment factors 1322. The irradiation control model 1300 may be based at least in part on such one or more power density factors 1318, irradiation vector factors 1320, and/or scanning segment factors 1322. The irradiation control model 1300 may be configured to determine one or more irradiation control commands 1304 based at least in part on the one or more power density factors 1318, irradiation vector factors 1320, and/or scanning segment factors 1322. Such power density factors 1318 may include angle of incidence $\theta_i$ of an energy beam 200 and/or elliptical angle $\theta_e$ of a beam spot 300. The irradiation control model 1300 may be configured to determine one or more power density factors 1318 based at least in part on one or more model inputs 1302. The one or more model inputs 1302 may include operating data 1214, such as scanner position, build plane elevation, and/or beam exposure signal (e.g., a signal indicating that a beam generation device is emitting an energy beam). The one or more model inputs 1302 may additionally or alternatively include object data 1216, such as data associated with a build file and/or object properties such as material composition and/or desired physical properties. In some embodiments, an irradiation control model 1300 may be configured to output one or more irradiation control commands 1304 based at least in part on one or more model inputs 1302 that pertain to operating data 1214, such as scanner position, build plane elevation, and beam exposure signal. The one or more irradiation control commands 1304 may include one or more beam parameters 1306, such as one or more parameters pertaining to beam power, spot size, scan velocity, and/or focal point. The one or more irradiation control commands 1304 may additionally or alternatively include one or more scanning parameters 1308, such as beam offset, beam path, and/or scan velocity. Additionally, or in the alternative, the one or more irradiation control commands 1304 may include one or more scanning segment parameters 1310, such as one or more scanning segments 600 corresponding to one or more objects 114 in one or more object layers 900. The one or more irradiation control commands 1304 may additionally or alternatively include one or more irradiation vector parameters 1312, such as an orientation of one or more scanning vectors 400, hatching vectors 500, and/or contour vectors 550, such as a directional component and/or a magnitude component thereof.

The irradiation control model 1300 may be configured to determine one or more irradiation control commands 1304 configured to adjust an energy density and/or a power density of an energy beam 200 based at least in part on the one or more power density factors 1318. For example, the irradiation control model 1300 may determine an irradiation control command 1304 pertaining to a beam power parameter, a spot size parameter, a scan velocity parameter, and/or a focal point parameter. Such irradiation control command 1304 may be output to the energy beam system 134, for example, by way of one or more energy beam system control commands 1324. The irradiation control commands 1304 and/or the energy beam system control command 1324 may effect an adjustment to an energy density and/or a power density of an energy beam 200.

In some embodiments, the irradiation control model 1300 may be additionally or alternatively configured to determine one or more irradiation control commands 1304 based at least in part on one or more irradiation vector factors 1320. Such irradiation vector factors 1320 may include one or more factors pertaining to an irradiation vector, such as a scanning vector 400, a hatching vector 500, and/or a contour vector 550. The irradiation control model 1300 may be configured to determine one or more irradiation vector factors 1320 based at least in part on one or more model inputs 1302, such as an orientation and/or magnitude of an irradiation vector, such as a scanning vector 400, a hatching vector 500, and/or a contour vector 550, and/or whether the one or more model input 1302 and/or the one or more irradiation control commands 1304 correspond to an irradiation vector, such as a scanning vector 400, a hatching vector 500, and/or a contour vector 550. In some embodiments, an irradiation control model 1300 may be configured to output one or more irradiation control commands 1304 based at least in part on one or more model inputs 1302 that pertain to an irradiation vector, such as a scanning vector 400, a hatching vector 500, and/or a contour vector 550. Additionally, or in the alternative, the irradiation control model 1300 may be configured to determine an irradiation control command 1304 based at least in part on whether the one or more model inputs 1302 correspond to an irradiation vector, such as a scanning vector 400, a hatching vector 500, and/or a contour vector 550. The one or more irradiation control commands 1304 may include one or more scanning parameters 1308, such as one or more parameters pertaining to beam power, spot size, scan velocity, and/or focal point.

In some embodiments, the irradiation control model 1300 may be additionally or alternatively configured to determine one or more irradiation control commands 1304 based at least in part on one or more scanning segment factors 1322. Such scanning segment factors 1322 may include one or more factors pertaining to configuration, orientation, and/or location of one or more objects 114 in an object layer 900, such as relative to a normal point 206 and/or relative to a gas flow direction 800. The irradiation control model 1300 may be configured to determine one or more scanning segment factors 1322 based at least in part on one or more model inputs 1302, such as operating data 1214 and/or object data 1216. For example, the one or more scanning segment factors 1322 may be determined based at least in part on a CAD file for an object 114 to be additively manufactured and/or a build file or object properties corresponding to and/or determined using the object data 1216. In some embodiments, an irradiation control model 1300 may be configured to output one or more irradiation control commands 1304 based at least in part on one or more scanning segment factors 1322.

In some embodiments, an irradiation control model 1300 may be additionally or alternatively configured to determine one or more irradiation control command 1304 that that pertain to one or more scanning segment parameters 1310 and/or one or more irradiation vector parameters 1312. Exemplary scanning segment parameters 1310 may include one or more parameters pertaining to dividing a build plane 130 and/or one or more object layers 900 into a plurality of scanning segments 600, such as one or more radial segments 602, one or more annular segments 604, and/or one or more semi-annular segments 606. Such scanning segment parameters 1310 may include parameters such as configuration, arrangement, orientation, size, shape, and so forth for one or more scanning segments 600. An irradiation control command 1304 pertaining to a scanning segment parameter 1310 may be configured to determine and/or change a scanning segment parameter 1310, such as a configuration, arrangement, orientation, size, shape, and so forth for one or more scanning segments 600. In some embodiments, a build plane 130 and/or one or more object layers 900 may be divided into a plurality of scanning segments 600 based at least in part on one or more scanning segment parameters 1310. One or more beam parameters 1306 and/or one or more scanning parameters 1308 may be determined based at least in part on one or more one or more scanning segment parameters 1310. Additionally, or in the alternative, one or more control commands pertaining to a beam parameter 1306 and/or a scanning parameter 1308 may be determined based at least in part on a scanning segment parameter 1310 and/or a control command pertaining to a scanning segment parameter 1310.

Exemplary irradiation vector parameters 1312 may include one or more parameters pertaining to one or more irradiation vectors, such as one or more scanning vectors 400, one or more hatching vectors 500, and/or one or more contour vector 550. For example, an irradiation control command 1304 may be configured to control an orientation, such as a directional component and/or a magnitude component, of an irradiation vector, such as a scanning vector 400, a hatching vector 500, and/or a contour vector 550. One or more irradiation vector parameters 1312 may include one or more parameters pertaining to assigning one or more irradiation vectors (e.g., scanning vectors 400, hatching vectors 500, and/or contour vectors 550) to one or more scanning segments 600. Such irradiation vector parameters 1312 may include a directional component and/or a magnitude component for one or more irradiation vectors (e.g., scanning vectors 400, hatching vectors 500, and/or contour vectors 550). In some embodiments, one or more irradiation vectors (e.g., one or more scanning vectors 400, one or more hatching vectors 500, and/or one or more contour vectors 550) may be assigned to respective ones of a plurality of scanning segments 600 based at least in part on one or more irradiation vector parameters 1312. One or more beam parameters 1306 and/or one or more scanning parameters 1308 may be determined based at least in part on one or more one or more irradiation vector parameters 1312. Additionally, or in the alternative, one or more control commands pertaining to a beam parameter 1306 and/or a scanning parameter 1308 may be determined based at least in part on an irradiation vector parameter 1312 and/or a control command pertaining to an irradiation vector parameter 1312.

In some embodiments, the orientation of an irradiation vector (e.g., a scanning vector 400, a hatching vector 500, and/or a contour vector 550), such as a directional component and/or a magnitude component, may be determined based at least in part on one or more beam parameters 1306 and/or to one or more scanning parameters 1308. The orientation of the irradiation vector (e.g., the scanning vector 400, the hatching vector 500, and/or the contour vector 550) may be implemented by one or more irradiation control commands 1304 corresponding to one or more beam parameters 1306 and/or to one or more scanning parameters 1308. An irradiation control command 1304 may be configured to be implemented specifically and/or exclusively during one or more periods corresponding to a scanning vector 400, a hatching vector 500, and/or a contour vector 550. For example, an irradiation control command 1304 may be based at least in part on whether an energy beam 200 is propagating along a scanning vector 400 corresponding to a hatching vector 500 and/or a scanning vector 400 corresponding to a contour vector 550. In some embodiments, one or more irradiation control commands 1304 pertaining to one or more beam parameters 1306 and/or to one or more scanning parameters 1308 may be based at least in part on whether an energy beam 200 is propagating along a scanning vector 400 corresponding to a hatching vector 500 and/or a scanning vector 400 corresponding to a contour vector 550.

The control module 1228 may be configured to output the one or more irradiation control commands 1304 to an energy beam system 134. For example, the control module 1228 may output energy beam system control commands 1324 based at least in part on the irradiation control commands 1304. The energy beam system control commands 1324 may be additionally or alternatively based at least in part on object data 1216 such as a CAD file for an object 114 to be additively manufactured and/or a build file or object properties corresponding to and/or determined using the object data 1216. In some embodiments, an energy beam system control command 1324 may be based on both an irradiation control command 1304 and build data from a build file. Additionally or in the alternative, some energy beam system control commands 1324 may be based on the build data from a build file and some energy beam system control commands 1324 may be based on an irradiation control command 1304.

Referring now to FIG. 13B, further aspects of an exemplary control module 1228 will be described. As shown in FIG. 13B, in some embodiments, an irradiation control model 1300 may include a model trainer 1350. The model trainer 1350 may use any one or more various training or learning techniques such as backwards propagation of errors, which may include performing truncated backpropagation through time. In some embodiments, supervised training techniques may be used on a set of labeled training data. The model trainer 1350 may perform a number of generalization techniques (e.g., weight decays, dropouts, etc.) to improve the generalization capability of the irradiation control model 1300 being trained.

An exemplary model trainer 1350 may include a machine-learned model 1352. The model trainer 1350 may utilize one or more model inputs 1302 as inputs, including, for example, as inputs to a machine-learned model 1352. The model trainer 1350 may output one or more adjusted irradiation settings 1354. The adjusted irradiation settings 1354 may include updates or adjustments to settings, values, and/or schedules already included in the irradiation settings 1314. Additionally, or in the alternative, the adjusted irradiation settings 1354 may include new settings, values, and/or schedules to be included with or substituted for those already included in the irradiation settings 1314. In some embodiments, the machine-learned model 1352 may include and/or may be based at least in part on one or more power density factors 1318, one or more irradiation vector factors 1320, and/or one or more scanning segment factors 1322. The machine-learned model 1352 may be configured to determine one or more irradiation control commands 1304 based at least in part on the one or more power density factors 1318, irradiation vector factors 1320, and/or scanning segment factors 1322.

A machine-learned model 1352 may use any suitable machine learning technique, operating regime, or algorithm. A machine-learned model 1352 may be configured to use pattern recognition, computational learning, artificial intelligence, or the like to derive algorithms that allow the machine-learned model 1352 to determine one or more irradiation settings 1314. A machine-learned model 1352 may include an unsupervised or a supervised learning regime, including a semi-supervised learning regime, an active learning regime, a reinforcement learning regime, and/or a representation learning regime. A machine-learned model 1352 may utilize neural networks, decision trees, association rules, inductive logic algorithms, cluster analysis algorithms, and the like. In some embodiments, the model inputs 1302 may include data 1210 associated with or generated by a machine-learned model 1352.

By way of example, the machine-learned model 1352 shown in FIG. 13B includes a neural network. However, an exemplary machine-learned model 1352 may include any other suitable model, including a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, and combinations thereof. Even further additional suitable types of machine or statistical learning models are also contemplated. It will also be appreciated that the machine-learned model 1352 can use certain mathematical methods alone or in combination with one or more machine or statistical learning models.

In addition to outputting an adjusted irradiation settings 1354, in some embodiments an irradiation control model 1300 (e.g., a machine-learned model 1352) may output a confidence score 1356, which may provide an indication as to a level of confidence attributable to one or more outputs of the machine-learned model 1352. The confidence score 1356 can be used, for example, to set a margin of error to be used by the irradiation control model 1300 in determining an adjusted irradiation settings 1354. For example, in the event of a low confidence score 1356 the irradiation control model 1300 may account for a more conservative or wide margin for error when determining an adjusted irradiation settings 1354, whereas in the event of a high confidence score 1356 the irradiation control model 1300 may allow for a more aggressive or narrow margin for error when determining an adjusted irradiation settings 1354. In some embodiments, the model inputs 1302 may include data 1210 associated with or comprising a confidence score 1356.

Figure 14:
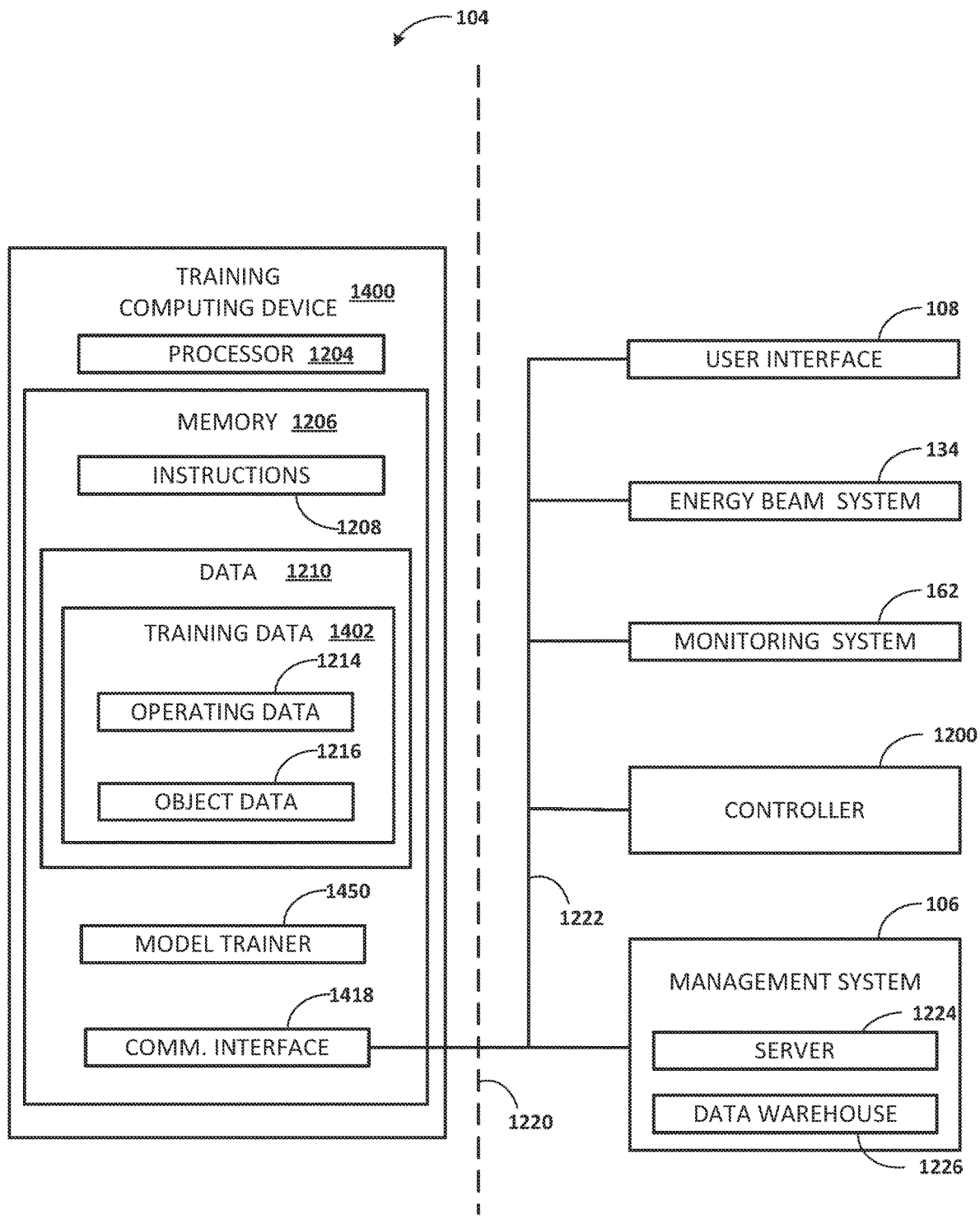
FIG. 14 schematically depicts an exemplary training computing device for training a machine-learned model.

Now referring to FIG. 14, an exemplary training computing device 1400 will be described. In some embodiments, a training computing device 1400 may be used to train an irradiation control model 1300, such as to train a machine-learned model 1352. The training computing device 1400 may be communicatively coupled with the irradiation controller 1200 via the communication network 1220. Alternatively, the training computing device 1400 may be included as a part of the irradiation controller 1200. For example, the training computing device 1400 may be part of the computing device 1202 included as part of the irradiation controller 1200. The training computing device 1400 may include one or more processors 1204 and one or more memory devices 1206. The one or more memory devices 1206 may store information accessible by the one or more processors 1204, including computer-readable instructions 1208 that may be executed by the one or more processors 1204. The memory devices 1206 may additionally or alternatively store data 1210 that may be accessed by the one or more processors 1204. The training computing device 1400 can also include a communication interface 1418 configured to communicate with resources on the communication network 1220. The hardware, implementation, and functionality of the components of the training computing device 1400 may operate, function, and include the same or similar components as those described with respect to the one or more computing devices 1202 of the irradiation controller 1200.

The training computing device 1400 may include a model trainer 1350 configured to train one or more irradiation control models 1300, such as a machine-learned model 1352. In some embodiments, the model trainer 1350 can train one or more irradiation control models 1300 based on a set of training data 1402. The training data 1402 may include past operating data 1214 and/or object data 1216 for objects previously additively manufactured. In some embodiments, the training data 1402 may include at least a portion of the data library 1212. Alternatively, the data library 1212 may include the training data 1402 or at least a portion thereof.

The model trainer 1350 may utilize past operating data 1214 to train one or more irradiation control models 1300 with respect to how the additive manufacturing machine 102 has been actually and/or uniquely operated in the past with respect to object specifications and/or operating parameters, such as under particular operating conditions and/or such as in relation to the objects 114 additively manufactured and/or resulting quality data. Additionally, or in the alternative, the model trainer 1350 may utilize past operating data 1214 to validate or test an irradiation control model 1300, including a machine-learned model 1352.

Figure 15:
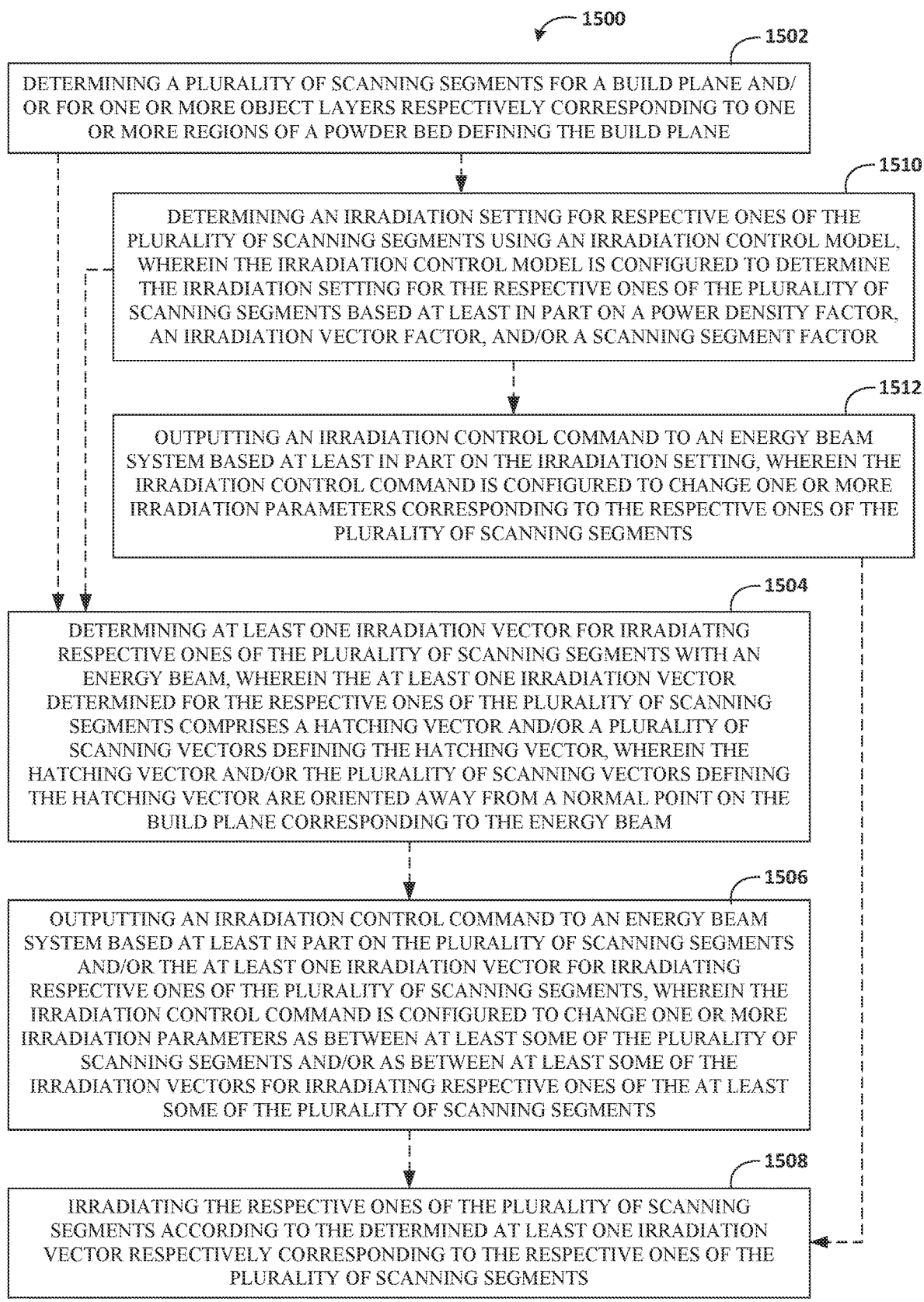
FIG. 15 shows a flow chart depicting an exemplary method of additively manufacturing a three-dimensional object.

Now turning to FIG. 15, exemplary methods of additively manufacturing a three-dimensional object 114 will be described, including methods of determining an irradiation control command 1304, and/or methods of controlling an irradiation parameter 1305, such as a beam parameter 1306, a scanning parameter 1308, a scanning segment parameters 1310 and/or an irradiation vector parameter 1312. As shown in FIG. 15, an exemplary method 1500 may include, at block, 1502, determining a plurality of scanning segments 600 for a build plane 130 and/or for one or more object layers 900 respectively corresponding to one or more regions of a powder bed 136 defining the build plane 130. The plurality of scanning segments 600 may be determined based at least in part by an irradiation control model 1300. The irradiation control model 1300 may be configured to determine the plurality of scanning segments 600 based at least in part on one or more model inputs 1302. The one or more model inputs may include object data 1216 and/or operating data 1214. Additionally, or in the alternative, the irradiation control model 1300 may be configured to determine the plurality of scanning segments 600 based at least in part on a power density factor, an irradiation vector factor, and/or a scanning segment factor.

At block 1504, an exemplary method 1500 may additionally or alternatively include determining at least one irradiation vector for irradiating respective ones of the plurality of scanning segments 600 with an energy beam 200. The at least one irradiation vector determined for the respective ones of the plurality of scanning segments 600 may include a hatching vector 500 and/or a plurality of scanning vectors 400 defining the hatching vector 500. The hatching vector 500 and/or the plurality of scanning vectors 400 defining the hatching vector 500 may be oriented away from a normal point 206 on the build plane 130 corresponding to the energy beam 200. The irradiation control model 1300 may be configured to determine the at least one irradiation vector based at least in part on one or more model inputs 1302. The one or more model inputs may include object data 1216 and/or operating data 1214. Additionally, or in the alternative, the irradiation control model 1300 may be configured to determine the at least one irradiation vector based at least in part on a power density factor 1318, an irradiation vector factor 1320, and/or a scanning segment factor 1322. The power density factor 1318, the irradiation vector factor 1320, and/or the scanning segment factor 1322 may be based at least in part on a location of a respective scanning segment 600 relative to a normal point 206 on the build plane 130, and/or at least in part on a position of a beam spot 300 from the energy beam 200 relative to the normal point 206 on the build plane 130.

In some embodiments, an exemplary method 1500 may include, at block 1506, outputting an irradiation control command 1304 to an energy beam system 134 based at least in part on the plurality of scanning segments 600 and/or the at least one irradiation vector for irradiating respective ones of the plurality of scanning segments 600. The irradiation control command 1304 may be configured to change one or more irradiation parameters 1305 as between at least some of the plurality of scanning segments 600 and/or as between at least some of the irradiation vectors for irradiating respective ones of the at least some of the plurality of scanning segments 600. An exemplary method 1500 may additionally or alternatively include, at block 1508, irradiating the respective ones of the plurality of scanning segments 600 according to the determined at least one irradiation vector respectively corresponding to the respective ones of the plurality of scanning segments 600. In some embodiments, at block 1508, an exemplary method 1500 may include directing an energy beam 200 onto a build plane 130 according to an irradiation vector (e.g., a scanning vector 400, a hatching vector 500, and/or a contour vector 550) based at least in part on the irradiation control command 1304.

In some embodiments, an exemplary method 1500 may include, at block 1510, determining an irradiation setting 1314 for respective ones of the plurality of scanning segments 600 using an irradiation control model 1300. The irradiation control model 1300 may be configured to determine the irradiation setting 1314 for the respective ones of the plurality of scanning segments 600 based at least in part on a power density factor 1318, an irradiation vector factor 1320, and/or a scanning segment factor 1322. An exemplary method 1500 may additionally or alternatively include, at block 1512, outputting an irradiation control command 1304 to an energy beam system 134 based at least in part on the irradiation setting 1314. The irradiation control command 1304 may be configured to change one or more irradiation parameters 1305 corresponding to the respective ones of the plurality of scanning segments 600.

Further aspects of the invention are provided by the subject matter of the following clauses:

1. A method of additively manufacturing a three-dimensional object, the method comprising: determining a plurality of scanning segments for a build plane and/or for one or more object layers respectively corresponding to one or more regions of a powder bed defining the build plane; determining at least one irradiation vector for irradiating respective ones of the plurality of scanning segments with an energy beam, wherein the at least one irradiation vector determined for the respective ones of the plurality of scanning segments comprises a hatching vector and/or a plurality of scanning vectors defining the hatching vector, wherein the hatching vector and/or the plurality of scanning vectors defining the hatching vector are oriented away from a normal point on the build plane corresponding to the energy beam; and outputting an irradiation control command to an energy beam system based at least in part on the plurality of scanning segments and/or the at least one irradiation vector for irradiating respective ones of the plurality of scanning segments.

2. The method of any preceding clause, comprising: determining, with an irradiation control model, the plurality of scanning segments and/or the at least one irradiation vector for irradiating respective ones of the plurality of scanning segments, wherein the irradiation control model is configured to determine the plurality of scanning segments and/or the at least one irradiation vector for irradiating respective ones of the plurality of scanning segments based at least in part on one or more model inputs, the one or more model inputs comprising object data and/or operating data.

3. The method of any preceding clause, comprising: determining, with an irradiation control model, the plurality of scanning segments and/or the at least one irradiation vector for irradiating respective ones of the plurality of scanning segments, wherein the irradiation control model is configured to determine the plurality of scanning segments and/or the at least one irradiation vector for irradiating respective ones of the plurality of scanning segments based at least in part on a power density factor, an irradiation vector factor, and/or a scanning segment factor.

4. The method of any preceding clause, wherein the irradiation control command is configured to change one or more irradiation parameters as between at least some of the plurality of scanning segments and/or as between at least some of the irradiation vectors for irradiating respective ones of the at least some of the plurality of scanning segments.

5. The method of any preceding clause, comprising: irradiating the respective ones of the plurality of scanning segments according to the determined at least one irradiation vector respectively corresponding to the respective ones of the plurality of scanning segments.

6. The method of any preceding clause, wherein the plurality of scanning segments comprises one or more radial segments, one or more annular segments, and/or one or more semi-annular segments.

7. The method of any preceding clause, wherein the number of scanning segments per unit area of the build plane and/or per unit area of the one or more object layers depends at least in part on a distance from the normal point and/or on an angle of incidence of the energy beam.

8. The method of any preceding clause, wherein the area of respective scanning segments decreases with increasing distance from the normal point and/or with increasing angle of incidence of the energy beam.

9. The method of any preceding clause, wherein one or more segment boundaries corresponding to respective ones of the plurality of scanning segments are determined based at least in part on an angle of incidence of the energy beam when incident upon the respective scanning segment and/or based at least in part on one or more beam parameters that depend at least in part on angle of incidence of the energy beam.

10. The method of any preceding clause, wherein the plurality of scanning segments comprise a plurality of radial segments, and wherein the at least one determined irradiation vector corresponding to the plurality of radial segments comprises a hatching vector oriented away from the normal point.

11. The method of any preceding clause, wherein the plurality of scanning segments comprise a plurality of radial segments, and wherein the at least one determined irradiation vector corresponding to the plurality of radial segments comprises a plurality of scanning vectors oriented away from the normal point.

12. The method of any preceding clause, wherein the plurality of scanning segments intersect respective ones of a plurality of objects in the one or more object layers at different locations depending on the position of the respective ones of the plurality of objects on the build plane and/or on the one or more object layers.

13. The method of any preceding clause, wherein the plurality of scanning segments respectively comprise one or more segment boundaries, and wherein a configuration and/or arrangement of the respective one or more segment boundaries is determined for one or more objects in the one or more object layers based at least in part on a location of the respective object in the respective object layer.

14. The method of any preceding clause, wherein the at least one irradiation vector determined for the respective ones of the plurality of scanning segments comprises a hatching vector oriented substantially radially relative to the normal point.

15. The method of any preceding clause, wherein the at least one irradiation vector determined for the respective ones of the plurality of scanning segments comprises a hatching vector oriented substantially annularly or semi-annularly relative to the normal point.

16. The method of any preceding clause, wherein the at least one irradiation vector determined for the respective ones of the plurality of scanning segments comprises a plurality of hatching vectors, and wherein the plurality of hatching vectors corresponding to a respective one of the plurality of scanning segments are oriented substantially parallel to one another.

17. The method of any preceding clause, comprising: determining an irradiation setting for respective ones of the plurality of scanning segments using an irradiation control model, wherein the irradiation control model is configured to determine the irradiation setting for the respective ones of the plurality of scanning segments based at least in part on a power density factor, an irradiation vector factor, and/or a scanning segment factor.

18. The method of any preceding clause, comprising: outputting an irradiation control command to an energy beam system based at least in part on the irradiation setting, wherein the irradiation control command is configured to change one or more irradiation parameters corresponding to the respective ones of the plurality of scanning segments.

19. An additive manufacturing system, comprising: an energy beam system; and a control system comprising an irradiation controller; wherein the irradiation controller comprises a control module configured to perform a method, the method comprising: determining a plurality of scanning segments for a build plane and/or for one or more object layers respectively corresponding to one or more regions of a powder bed defining the build plane; determining at least one irradiation vector for irradiating respective ones of the plurality of scanning segments with an energy beam, wherein the at least one irradiation vector determined for the respective ones of the plurality of scanning segments comprises a hatching vector and/or a plurality of scanning vectors defining the hatching vector, wherein the hatching vector and/or the plurality of scanning vectors defining the hatching vector are oriented away from a normal point on the build plane corresponding to the energy beam; and outputting an irradiation control command to an energy beam system based at least in part on the plurality of scanning segments and/or the at least one irradiation vector for irradiating respective ones of the plurality of scanning segments.

20. The additive manufacturing system of any preceding clause, wherein the additive manufacturing system is configured to perform the method of any preceding clause.

21. A computer-readable medium comprising computer-executable instructions, which when executed by a processor, cause the processor to perform a method comprising: determining a plurality of scanning segments for a build plane and/or for one or more object layers respectively corresponding to one or more regions of a powder bed defining the build plane; determining at least one irradiation vector for irradiating respective ones of the plurality of scanning segments with an energy beam, wherein the at least one irradiation vector determined for the respective ones of the plurality of scanning segments comprises a hatching vector and/or a plurality of scanning vectors defining the hatching vector, wherein the hatching vector and/or the plurality of scanning vectors defining the hatching vector are oriented away from a normal point on the build plane corresponding to the energy beam; and outputting an irradiation control command to an energy beam system based at least in part on the plurality of scanning segments and/or the at least one irradiation vector for irradiating respective ones of the plurality of scanning segments.

22. The computer-readable medium of any preceding clause, wherein the computer-readable medium comprises computer-executable instructions, which when executed by a processor, cause the processor to perform the method of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A non-transitory computer-readable medium comprising computer-executable instructions, which when executed by a processor, cause the processor to perform a method of additively manufacturing a three-dimensional object, the method comprising:
   determining a plurality of scanning segments for a build plane and/or for one or more object layers respectively corresponding to one or more regions of a powder bed defining the build plane;
   determining at least one irradiation vector for irradiating respective ones of the plurality of scanning segments with an energy beam, wherein the at least one irradiation vector determined for the respective ones of the plurality of scanning segments comprises a hatching vector and/or a plurality of scanning vectors defining the hatching vector, wherein the hatching vector and/or the plurality of scanning vectors defining the hatching vector are oriented away from a normal point on the build plane corresponding to the energy beam; and
   outputting an irradiation control command to an energy beam system based at least in part on the plurality of scanning segments and/or the at least one irradiation vector for irradiating respective ones of the plurality of scanning segments; and
   wherein a number of scanning segments per unit area of the build plane and/or per unit area of the one or more object layers depends at least in part on a distance from the normal point and/or on an angle of incidence of the energy beam.

2. The non-transitory computer-readable medium of claim 1, wherein the computer-executable instructions, when executed by a processor, cause the processor to further perform the method of additively manufacturing a three-dimensional object, the method further comprising:
   determining, with an irradiation control model, the plurality of scanning segments and/or the at least one irradiation vector for irradiating respective ones of the plurality of scanning segments, wherein the irradiation control model is configured to determine the plurality of scanning segments and/or the at least one irradiation vector for irradiating respective ones of the plurality of scanning segments based at least in part on one or more model inputs, the one or more model inputs comprising object data and/or operating data.

3. The non-transitory computer-readable medium of claim 1, wherein the computer-executable instructions, when executed by a processor, cause the processor to further perform the method of additively manufacturing a three-dimensional object, the method further comprising:
   determining, with an irradiation control model, the plurality of scanning segments and/or the at least one irradiation vector for irradiating respective ones of the plurality of scanning segments, wherein the irradiation control model is configured to determine the plurality of scanning segments and/or the at least one irradiation vector for irradiating respective ones of the plurality of scanning segments based at least in part on a power density factor, an irradiation vector factor, and/or a scanning segment factor.

4. The non-transitory computer-readable medium of claim 1, wherein the irradiation control command is configured to change one or more irradiation parameters as between at least some of the plurality of scanning segments and/or as between at least some of the irradiation vectors for irradiating respective ones of the at least some of the plurality of scanning segments.

5. The non-transitory computer-readable medium of claim 1, wherein the computer-executable instructions, when executed by a processor, cause the processor to further perform the method of additively manufacturing a three-dimensional object, the method further comprising:
   irradiating the respective ones of the plurality of scanning segments according to the determined at least one irradiation vector respectively corresponding to the respective ones of the plurality of scanning segments.

6. The non-transitory computer-readable medium of claim 1, wherein the plurality of scanning segments comprises one or more radial segments, one or more annular segments, and/or one or more semi-annular segments.

7. The non-transitory computer-readable medium of claim 1, wherein the area of respective scanning segments decreases with increasing distance from the normal point and/or with increasing angle of incidence of the energy beam.

8. The non-transitory computer-readable medium of claim 1, wherein one or more segment boundaries corresponding to respective ones of the plurality of scanning segments are determined based at least in part on the angle of incidence of the energy beam when incident upon the respective scanning segment and/or based at least in part on one or more beam parameters that depend at least in part on the angle of incidence of the energy beam.

9. The non-transitory computer-readable medium of claim 1, wherein the plurality of scanning segments comprise a plurality of radial segments, and wherein the at least one determined irradiation vector corresponding to the plurality of radial segments comprises a hatching vector oriented away from the normal point.

10. The non-transitory computer-readable medium of claim 1, wherein the plurality of scanning segments comprise a plurality of radial segments, and wherein the at least one determined irradiation vector corresponding to the plurality of radial segments comprises a plurality of scanning vectors oriented away from the normal point.

11. The non-transitory computer-readable medium of claim 1, wherein the plurality of scanning segments intersect respective ones of a plurality of objects in the one or more object layers at different locations depending on a position of the respective ones of the plurality of objects on the build plane and/or on the one or more object layers.

12. The non-transitory computer-readable medium of claim 1, wherein the plurality of scanning segments respectively comprise one or more segment boundaries, and wherein a configuration and/or arrangement of the respective one or more segment boundaries is determined for one or more objects in the one or more object layers based at least in part on a location of the respective object in the respective object layer.

13. The non-transitory computer-readable medium of claim 1, wherein the at least one irradiation vector determined for the respective ones of the plurality of scanning segments comprises a hatching vector oriented substantially radially relative to the normal point.

14. The non-transitory computer-readable medium of claim 1, wherein the at least one irradiation vector determined for the respective ones of the plurality of scanning segments comprises a hatching vector oriented substantially annularly or semi-annularly relative to the normal point.

15. The non-transitory computer-readable medium of claim 1, wherein the at least one irradiation vector determined for the respective ones of the plurality of scanning segments comprises a plurality of hatching vectors, and wherein the plurality of hatching vectors corresponding to a respective one of the plurality of scanning segments are oriented substantially parallel to one another.

16. The non-transitory computer-readable medium of claim 1, wherein the computer-executable instructions, when executed by a processor, cause the processor to further perform the method of additively manufacturing a three-dimensional object, the method further comprising:
    determining an irradiation setting for respective ones of the plurality of scanning segments using an irradiation control model, wherein the irradiation control model is configured to determine the irradiation setting for the respective ones of the plurality of scanning segments based at least in part on a power density factor, an irradiation vector factor, and/or a scanning segment factor.

17. The non-transitory computer-readable medium of claim 16, wherein the computer-executable instructions, when executed by a processor, cause the processor to further perform the method of additively manufacturing a three-dimensional object, the method further comprising:
    outputting an irradiation control command to an energy beam system based at least in part on the irradiation setting, wherein the irradiation control command is configured to change one or more irradiation parameters corresponding to the respective ones of the plurality of scanning segments.

18. An additive manufacturing system, comprising:
an energy beam system; and
a control system comprising an irradiation controller;
wherein the irradiation controller comprises a control module configured to perform a method of additively manufacturing a three-dimensional object, the method comprising:
    determining a plurality of scanning segments for a build plane and/or for one or more object layers respectively corresponding to one or more regions of a powder bed defining the build plane;
    determining at least one irradiation vector for irradiating respective ones of the plurality of scanning segments with an energy beam, wherein the at least one irradiation vector determined for the respective ones of the plurality of scanning segments comprises a hatching vector and/or a plurality of scanning vectors defining the hatching vector, wherein the hatching vector and/or the plurality of scanning vectors defining the hatching vector are oriented away from a normal point on the build plane corresponding to the energy beam; and
    outputting an irradiation control command to an energy beam system based at least in part on the plurality of scanning segments and/or the at least one irradiation vector for irradiating respective ones of the plurality of scanning segments, wherein a number of scanning segments per unit area of the build plane and/or per unit area of the one or more object layers depends at least in part on a distance from the normal point and/or on an angle of incidence of the energy beam.

19. A method of additively manufacturing a three-dimensional object, the method comprising:
    determining a plurality of scanning segments for a build plane and/or for one or more object layers respectively corresponding to one or more regions of a powder bed defining the build plane;
    determining at least one irradiation vector for irradiating respective ones of the plurality of scanning segments with an energy beam, wherein the at least one irradiation vector determined for the respective ones of the plurality of scanning segments comprises a hatching vector and/or a plurality of scanning vectors defining the hatching vector, wherein the hatching vector and/or the plurality of scanning vectors defining the hatching vector are oriented away from a normal point on the build plane corresponding to the energy beam; and
    outputting an irradiation control command to an energy beam system based at least in part on the plurality of scanning segments and/or the at least one irradiation vector for irradiating respective ones of the plurality of scanning segments, wherein a number of scanning segments per unit area of the build plane and/or per unit area of the one or more object layers depends at least in part on a distance from the normal point and/or on an angle of incidence of the energy beam.

* * * * *